US012574808B2

(12) United States Patent
Qiao et al.

(10) Patent No.: US 12,574,808 B2
(45) Date of Patent: Mar. 10, 2026

(54) HANDOVER FOR COMMUNICATION NETWORKS

(71) Applicant: Ofinno, LLC, Reston, VA (US)

(72) Inventors: Weihua Qiao, Herndon, VA (US); Esmael Hejazi Dinan, McLean, VA (US); Kyungmin Park, Vienna, VA (US); Peyman Talebi Fard, Vienna, VA (US); Jinsook Ryu, Oakton, VA (US); Taehun Kim, Fairfax, VA (US); Hua Zhou, Vienna, VA (US); Yunjung Yi, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 261 days.

(21) Appl. No.: 18/199,647

(22) Filed: May 19, 2023

(65) Prior Publication Data

US 2023/0328596 A1     Oct. 12, 2023

Related U.S. Application Data

(63) Continuation of application No. PCT/US2021/060012, filed on Nov. 19, 2021.

(60) Provisional application No. 63/116,517, filed on Nov. 20, 2020.

(51) Int. Cl.
*H04W 36/00* (2009.01)

(52) U.S. Cl.
CPC .... *H04W 36/0033* (2013.01); *H04W 36/0011* (2013.01)

(58) Field of Classification Search
CPC ......... H04W 36/0033; H04W 36/0011; H04W 36/10; H04W 36/12; H04W 36/14; H04W 36/32; H04W 88/085; H04W 92/20; H04W 76/12; H04W 76/16; H04W 76/22
See application file for complete search history.

(56) References Cited

U.S. PATENT DOCUMENTS

| | | |
|---|---|---|
| 6,937,589 B2 | 8/2005 | Taketsugu |
| 7,610,363 B2 | 10/2009 | Kim et al. |
| 8,325,626 B2 | 12/2012 | Toth et al. |
| 9,713,069 B2 | 7/2017 | Jung et al. |

(Continued)

FOREIGN PATENT DOCUMENTS

| WO | WO-2018059043 A1 * | 4/2018 | ........... H04L 67/563 |
|---|---|---|---|
| WO | 2019/027742 A1 | 2/2019 | |
| WO | 2020/048479 A1 | 3/2020 | |

OTHER PUBLICATIONS

3GPP TS 23.501 V16.4.0 (Mar. 2020); Technical Specification; 3rd Generation Partnership Project; Technical Specification Group Services and System Aspects; System architecture for the 5G System (5GS); Stage 2; (Release 16).

(Continued)

*Primary Examiner* — Mohamed A Kamara
(74) *Attorney, Agent, or Firm* — Xin Gao; Kavon Nasabzadeh; Jacob L. Mangan

(57) ABSTRACT

A second control plane function (CPF) receives, from a first CPF, a request for a handover for a session of a wireless device. The handover request indicates an internet protocol (IP) address, of the wireless device, used by a first user plane function (UPF). The handover request indicates to maintain the IP address of the wireless device. The second CPF sends, to a second UPF, a user plane session request message comprising the IP address.

20 Claims, 29 Drawing Sheets

(56) References Cited

U.S. PATENT DOCUMENTS

| | | | |
|---|---|---|---|
| 9,717,024 | B2 | 7/2017 | Shirota et al. |
| 10,397,892 | B2 | 8/2019 | Vrzic et al. |
| 2019/0020617 | A1 | 1/2019 | Truchan et al. |
| 2019/0215735 | A1* | 7/2019 | Wang ................ H04W 36/0044 |
| 2019/0313479 | A1* | 10/2019 | Myhre ................ H04L 41/5051 |
| 2019/0373520 | A1* | 12/2019 | Sillanpää .............. H04W 36/14 |
| 2020/0314701 | A1 | 10/2020 | Talebi Fard et al. |
| 2022/0377826 | A1* | 11/2022 | He ......................... H04W 76/12 |
| 2023/0224272 | A1* | 7/2023 | Zhang ................ H04L 61/2514 |
| | | | 709/226 |

OTHER PUBLICATIONS

3GPP TS 23.502 V16.4.0 (Mar. 2020); Technical Specification; 3rd Generation Partnership Project; Technical Specification Group Services and System Aspects; Procedures for the 5G System (5GS); Stage 2; (Release 16).
3GPP TR 23.725 V16.2.0 (Jun. 2019); Technical Report; 3rd Generation Partnership Project; Technical Specification Group Services and System Aspects; Study on enhancement of Ultra-Reliable Low-Latency Communication (URLLC) support in the 5G Core network (5GC); (Release 16).
3GPP TR 23.726 V16.0.0 (Dec. 2018); Technical Report; 3rd Generation Partnership Project; Technical Specification Group Services and System Aspects; Study on Enhancing Topology of SMF and UPF in 5G Networks; (Release 16).
3GPP TS 29.244 V16.5.0 (Sep. 2020); Technical Specification; 3rd Generation Partnership Project; Technical Specification Group Core Network and Terminals; Interface between the Control Plane and the User Plane Nodes; Stage 3; (Release 16).
3GPP TS 38.300 V16.2.0 (Jul. 2020); Technical Specification; 3rd Generation Partnership Project; Technical Specification Group Radio Access Network; NR; NR and NG-RAN Overall Description; Stage 2; (Release 16).
3GPP TS 38.331 V16.1.0 (Jul. 2020); Technical Specification; 3rd Generation Partnership Project; Technical Specification Group Radio Access Network; NR; Radio Resource Control (RRC) protocol specification; (Release 16).
3GPP TS 38.401 V16.2.0 (Jul. 2020); Technical Specification; 3rd Generation Partnership Project; Technical Specification Group Radio Access Network; NG-RAN; Architecture description; (Release 16).
3GPP TS 38.423 V16.3.0 (Sep. 2020); Technical Specification; 3rd Generation Partnership Project; Technical Specification Group Radio Access Network; NG-RAN; Xn application protocol (XnAP); (Release 16).
3GPP TS 38.463 V16.3.0 (Sep. 2020); Technical Specification; 3rd Generation Partnership Project; Technical Specification Group Radio Access Network; NG-RAN; E1 Application Protocol (E1AP); (Release 16).
3GPP TS 38.470 V16.2.0 (Jul. 2020); Technical Specification; 3rd Generation Partnership Project; Technical Specification Group Radio Access Network; NG-RAN; F1 general aspects and principles; (Release 16).
3GPP TS 38.472 V16.0.0 (Mar. 2020); Technical Specification; 3rd Generation Partnership Project; Technical Specification Group Radio Access Network; NG-RAN; F1 signalling transport; (Release 16).
3GPP TS 38.473 V16.2.0 (Jul. 2020); Technical Specification; 3rd Generation Partnership Project; Technical Specification Group Radio Access Network; NG-RAN; F1 application protocol (F1AP); (Release 16).
Ziegler et al.; 6G Architecture to Connect the Worlds; IEEE Access; Sep. 18, 2020; pp. 173508-173520; vol. 8, 2020.
Wang et al.; 6G Network: Towards a Distributed and Autonomous System; 2020 2nd 6G Wireless Summit (6G Summit); Mar. 17-20, 2020; IEEE.
Chen et al.; Vision, Requirements, and Technology Trend of 6G: How to Tackle the Challenges of System Coverage, Capacity, User Data-Rate and Movement Speed; IEEE Wireless Communications; Feb. 12, 2020.

6G The Next Hyper-Connected Experience for All.; Jul. 14, 2020; Samsung.
Chowdhury et al.; Draft 6G Wireless Communication Systems: Applications, Requirements, Technologies, Challenges, and Research Directions; arXiv:1909.11315; Sep. 2019.
Zhang et al.; 6G Wireless Networks Vision, Requirements, Architecture, and Key Technologies; IEEE Vehicular Technology Magazine; Jul. 17, 2019.
Khan et al.; 6G Wireless Systems: A Vision, Architectural Elements, and Future Directions; IEEE Access; Aug. 10, 2020; pp. 147029-147044; vol. 8, 2020.
Strinati et al.; 6G: The Next Frontier; arXiv:1901.03239v2 [cs.NI]; May 16, 2019; pp. 1-16.
Yu et al.; A Cybertwin based Network Architecture for 6G; 2020 2nd 6G Wireless Summit (6G Summit); Mar. 17-20, 2020; IEEE.
Yu et al.; A Fully-Decoupled RAN Architecture for 6G Inspired by Neurotransmission; Journal of Communications and Information Networks; vol. 4, No. 4; Dec. 2019; pp. 15-23.
Huang et al.; A Survey on Green 6G Network: Architecture and Technologies; IEEE Access; Dec. 4, 2019; pp. 175758-175768; vol. 7, 2019.
White Paper 5G Evolution and 6G; Jan. 2020; NTT Docomo, Inc. pp. 1-17.
Li et al.; Network 2030 A Blueprint of Technology, Applications and Market Drivers Towards the Year 2030 and Beyond; May 2019.
Latva-Aho et al.; Key Drivers and Research Challenges for 6G Ubiquitous Wireless Intelligence; 6G Research Visions 1; Sep. 2019.
Li et al.; Next-Generation Networks: Requirements and Research Directions; Etsi New Internet Forum; Oct. 12, 2018.
Talebi Fard et al.; Simplified Wireless Connectivity for 5G Machine Type Communication; 2016 IEEE Conference on Computer Communications Workshops (INFOCOM WKSHPS); Apr. 10-14, 2016; IEEE.
Alsharif et al.; Review Sixth Generation (6G) Wireless Networks: Vision, Research Activities, Challenges and Potential Solutions; Symmetry 2020, 12, 676; Apr. 24, 2020; pp. 1-21; MDPI.
Ziegler et al.; Stratification of 5G evolution and Beyond 5G; 2019 IEEE 2nd 5G World Forum (5GWF); Sep. 30-Oct. 2, 2019; IEEE; pp. 329-334.
Letaief et al.; The Roadmap to 6G—AI Empowered Wireless Networks; arXiv:1904.11686v2 [cs.NI]; Jul. 19, 2019; pp. 1-8.
Sodhro et al.; Towards 6G Architecture for Energy Efficient Communication in IoT-Enabled Smart Automation Systems; IEEE Internet of Things Journal; Sep. 18, 2020; IEEE; pp. 1-8.
Xiaohu et al.; Towards 6G wireless communication networks: Vision, enabling technologies, and new paradigm shift; Science China Information Sciences; Nov. 24, 2020.
Liu et al.; 6G Mobile Networks: Emerging Technologies and Applications Vision, Requirementa and Network Archtecture of 6G Mobile Network beyond 2030; China Communications; Sep. 2020; pp. 92-104.
Taleb et al.; White Paper on 6G Networking; 6G Research Visions, No. 6; Jun. 2020; 6G Flagship, University of Oulu.
Rajatheva et al.; White Paper on Broadband Connectivity in 6G; 6G Research Visions, No. 10; Jun. 2020; 6G Flagship, University of Oulu.
International Search Report and Written Opinion of the International Searching authority mailed Apr. 26, 2022, in International Application No. PCT/US2021/060012.
3GPP TR 38.806 V15.0.0 (Dec. 2017); Technical Report; 3rd Generation Partnership Project; Technical Specification Group Radio Access Network; Study of separation of NR Control Plane (CP) and User Plane (UP) for split option 2; (Release 15).
S2-175645; SA WG2 Meeting #122; Jun. 26-30, 2017, San Jose Del Cabe, Mexico; Source: Huawei, HiSilicon; Title: TS 23.502 End-Marker during HO Procedure; Document for: Approval; Agenda Item: 6.5.7.3; Work Item/ Release: 5GS_Ph1 / Rel-15.

* cited by examiner

RM State Transition in UE

RM State Transition in AMF

CM State Transition in UE

CM State Transition in AMF

Handover Request Message

| IE/Group Name | Presence | IE type and reference | Semantics description |
|---|---|---|---|
| Message Type | M | | |
| Source NG-RAN node UE XnAP ID reference | M | NG-RAN node UE XnAP ID | Allocated at the source CPF |
| Cause | M | | |
| Target Cell Global ID | M | | Includes either an E-UTRA CGI or an NR CGI |
| GUAMI | M | | |
| UE Context Information | | | |
| >NG-C UE associated Signalling reference | M | AMF UE NGAP ID | Allocated at the source CPF |
| >Signalling TNL association address at source NG-C side | M | CP Transport Layer Information | CPF's IP address of the SCTP association |
| >UE Security Capabilities | M | | |
| >AS Security Information | M | | |
| >Index to RAT/Frequency Selection Priority | O | | |
| >UE Aggregate Maximum Bit Rate | M | | |
| >PDU Session Resources To Be Setup List | | | UL tunnel information per PDU Session Resource; and the source side QoS flow ⇔ DRB mapping |
| >RRC Context | M | OCTET STRING | Includes the *HandoverPreparationInformation* message |
| >Location Reporting Information | O | | Includes the necessary parameters for location reporting. |
| >Management Based MDT PLMN List | O | MDT PLMN List | |
| >5GC Mobility Restriction List Container | O | | |
| >UE Radio Capability ID | O | | |
| UE History Information | M | | |
| UE Context Reference at the S-(R)AN node | O | | |
| >Global (R)AN Node ID | M | | |
| >S-(R)AN node UE XnAP ID | M | NG-RAN node UE XnAP ID | |
| Conditional Handover Information | O | | |
| >CHO Trigger | M | ENUMERATED | |
| >Target RAN node UE XnAP ID | C-ifCHOmod | NG-RAN node UE XnAP ID | Allocated at the T-(R)AN node |
| Keeping UE IP Information | | | |
| > UE IP address | O | | Request Synchronization of multiple SDFs |
| > maintain/keeping IP indication | O | | Flow information of multiple SDFs |
| > IP pool indication | O | | |
| > IP pool identifier | O | | |
| > CPF pool indication | O | | |
| > CPF pool identifier | O | | |
| > UPF pool indication | O | | |
| > UPF pool identifier | O | | |

FIG. 24

T-CPF receive, by a second CPF from a first CPF, a handover request indicating a handover of a data session for a wireless device, wherein the handover request comprises: an IP address of the wireless device, wherein the IP address is used by a first UPF; and a parameter indicating to maintain the IP address of the wireless device determine, by the second CPF and based on the parameter, reusing the IP address in the second CPF;

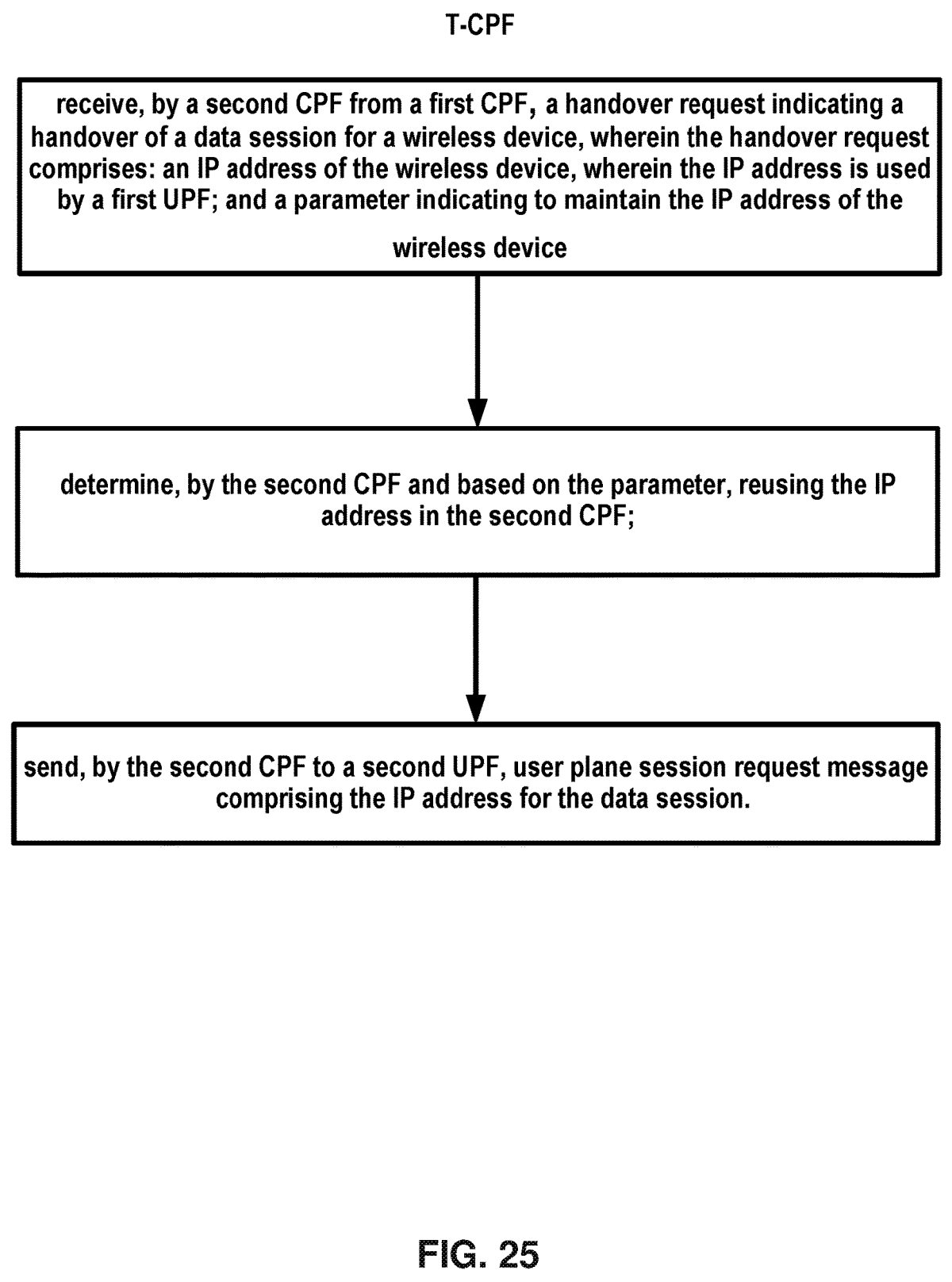

send, by the second CPF to a second UPF, user plane session request message comprising the IP address for the data session.

FIG. 25

T-UPF receive, by a second UPF from a second CPF, a user plane session establishment request message comprising a user plane rule; wherein the user plane rule comprises a IP address of the wireless device receive, by the second UPF from the second CPF, a user plane session modification request message comprising: a routing modification indication; and the IP address of the wireless device send, by the second UPF to at least one router, routing information comprising: the IP address of the wireless device; and address of the second UPF receive, by the second UPF from the at least one router, a data packet comprising the IP address of the wireless device.

FIG. 26

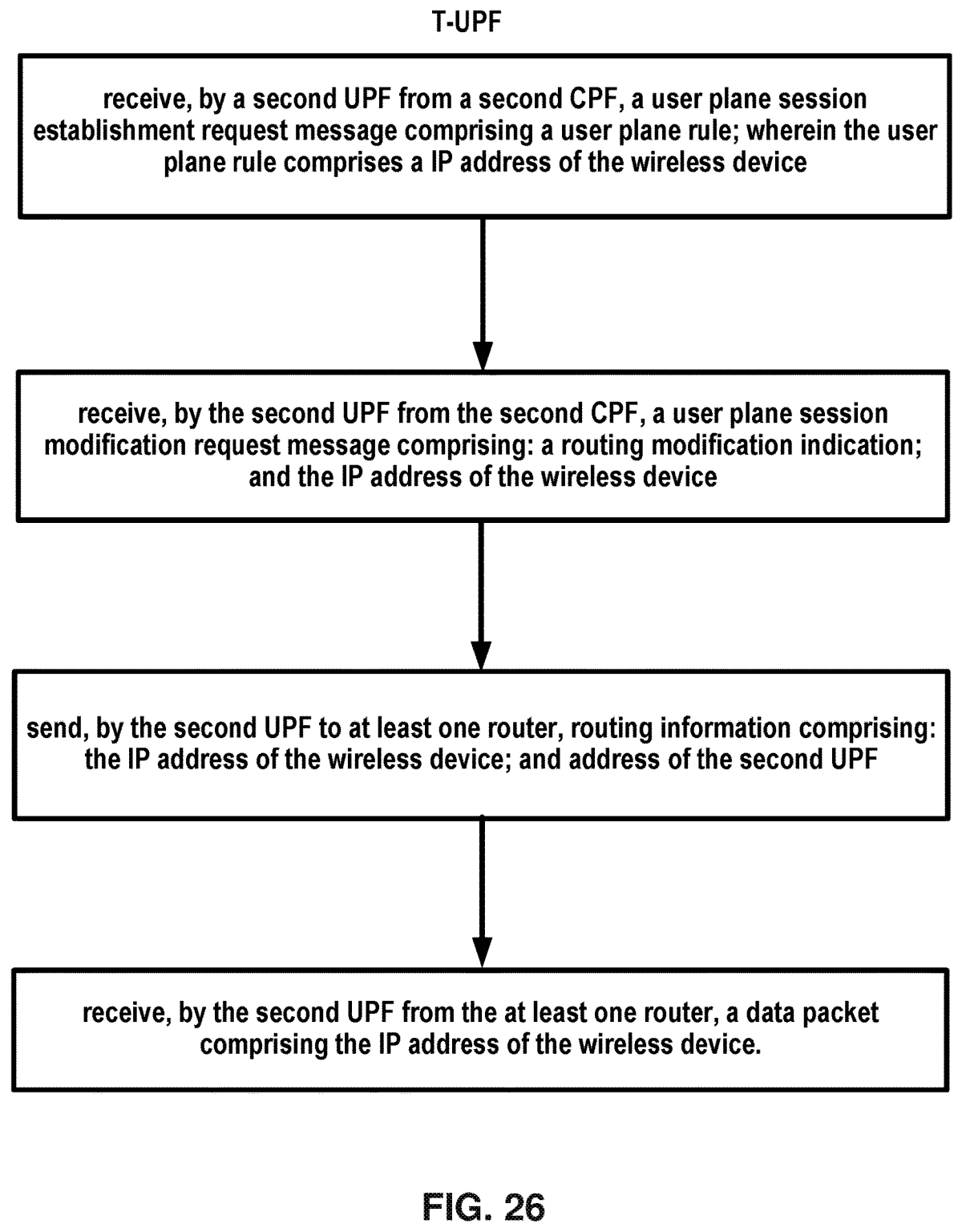

HANDOVER FOR COMMUNICATION NETWORKS

CROSS-REFERENCE TO RELATED APPLICATIONS

This application is a continuation of International Application No. PCT/US2021/060012, filed Nov. 19, 2021, which claims the benefit of U.S. Provisional Application No. 63/116,517, filed Nov. 20, 2020, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 24 is an example diagram depicting a handover request message body as per an aspect of an embodiment of the present disclosure.

FIG. 25 is an example diagram depicting the procedures of a target CPF as per an aspect of an embodiment of the present disclosure.

FIG. 26 is an example diagram depicting the procedures of a target UPF as per an aspect of an embodiment of the present disclosure.

DETAILED DESCRIPTION

Example embodiments of the present invention enable implementation of enhanced features and functionalities in 5G systems. Example embodiments of the present invention enable implementation of enhanced features and functionalities in 6G systems or a future communication system. More particularly, the embodiments of the technology disclosed herein may relate to handover for 5G or future communication system. Throughout the present disclosure, UE, wireless device, terminal, and mobile device are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably. Throughout the present disclosure, base station, Radio Access Network (RAN), eNodeB are used interchangeably.

Figure 4:
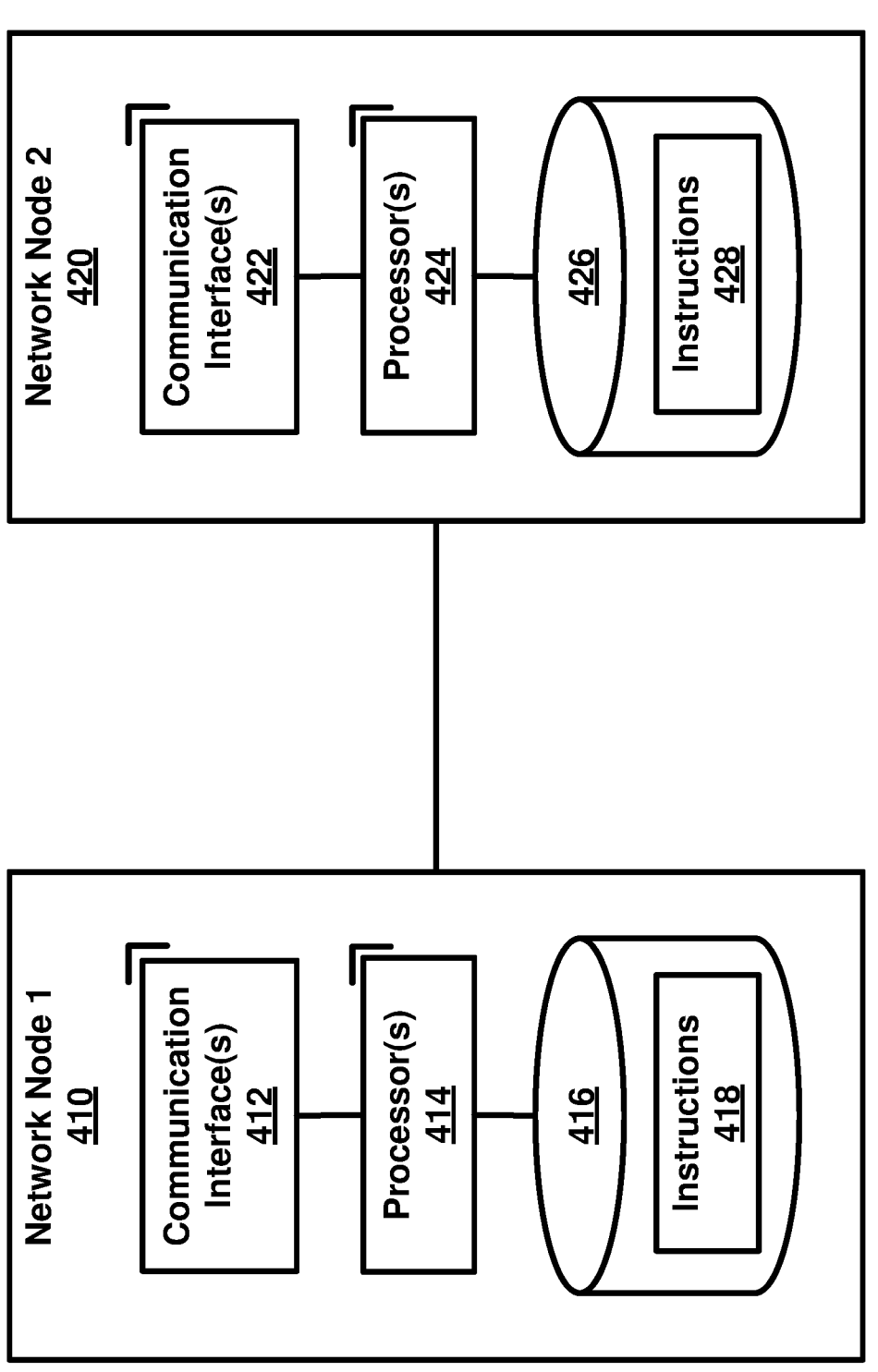
FIG. 4 is a system diagram of an example wireless device as per an aspect of an embodiment of the present disclosure.

Throughout the present disclosure, CPF (e.g. S-CPF, T-CPF), CHF, UPF (e.g. S-UPF, T-UPF, A-UPF), router, PCF, AF, AUTH/Subscription Data Function are example network functions which may be implemented either as a network element on a (dedicated) hardware, and/or a network node as depicted FIG. 4, or as a software instance running on a (dedicated) hardware and/or shared hardware, or as a virtualized function instantiated on an appropriate platform.

The following acronyms are used throughout the present disclosure:

| 5G | 5th generation mobile networks |
|---|---|
| 5GC | 5G Core Network |
| 5GS | 5G System |
| 5G-AN | 5G Access Network |
| 5QI | 5G QOS Indicator |
| 6G | 6th generation mobile networks |
| ACK | Acknowledgement |
| AF | Application Function |
| A-GNSS | Assisted GNSS |
| AMBR | Aggregate Maximum Bit Rate |

-continued

| AMF | Access and Mobility Management Function |
| AN | Access Network |
| ANDSP | Access Network Discovery & Selection Policy |
| APN | Access Point Name |
| ARP | Allocation and Retention Priority |
| BD | Billing Domain |
| BPS | Barometric Pressure Sensor |
| CCNF | Common Control Network Functions |
| CDR | Charging Data Record |
| CHF | Charging Function |
| CIoT | Cellular IoT |
| CN | Core Network |
| CP | Control Plane |
| CU-CP | Central Unit Control Plane |
| CU-UP | Central Unit User Plane |
| C-V2X | Cellular Vehicle-To-Everything |
| DAB | Digital Audio Broadcasting |
| DDN | Downlink Data Notification |
| DDoS | Distributed Denial of Service |
| DL | Downlink |
| DN | Data Network |
| DN-AAA | Data Network Authentication Authorization and Accounting |
| DNN | Data Network Name |
| DTMB | Digital Terrestrial Multimedia Broadcast |
| ECGI | E-UTRAN Cell Global Identifier |
| ECID | Enhanced Cell Identity |
| E-CSCF | Emergency Call Session Control Function |
| eNodeB | evolved Node B |
| EPS | Evolved Packet System |
| E-UTRAN | Evolved Universal Terrestrial Radio Access Network |
| FDD | Frequency Division Duplex |
| FNF | First Network Function |
| FQDN | Fully Qualified Domain Name |
| F-TEID | Fully Qualified TEID |
| GAD | Geographical Area Description |
| GMLC | Gateway Mobile Location Centre |
| gNB | Next Generation Node B |
| gNB-CU-CP | gNB Central Unit Control Plane |
| GNSS | Global Navigation Satellite System |
| GPSI | Generic Public Subscription Identifier |
| GTP | GPRS Tunneling Protocol |
| GUTI | Globally Unique Temporary Identifier |
| GW | Gateway |
| HGMLC | Home GMLC |
| HTTP | Hypertext Transfer Protocol |
| ID | Identifier |
| IMEI | International Mobile Equipment Identity |
| IMEI DB | IMEI Database |
| IMS | IP Multimedia Subsystem |
| IMSI | International Mobile Subscriber Identity |
| IP | Internet Protocol |
| IP-CAN | IP Connectivity Access Network |
| L2 | Layer 2 (data link layer) |
| L3 | Layer 3 (network layer) |
| LADN | Local Area Data Network |
| LAN | local area network |
| LCS | LoCation Services |
| LI | Lawful Intercept |
| LMC | Location Management Component |
| LMF | Location Management Function |
| LPP | LTE Positioning Protocol |
| LRF | location retrieval function |
| MAC | Media Access Control |
| MEI | Mobile Equipment Identifier |
| MIB | Master Information Block |
| MICO | Mobile Initiated Connection Only |
| MME | Mobility Management Entity |
| MO | Mobile Originated |
| MO-LR | Mobile Originated Location Request |
| MSISDN | Mobile Subscriber ISDN |
| MT | Mobile Terminating |
| MT-LR | Mobile Terminated Location Request |
| N3IWF | Non-3GPP InterWorking Function |
| NAI | Network Access Identifier |
| NAS | Non Access Stratum |
| NAT | Network address translation |
| NB-IoT | Narrow Band IoT |
| NCGI | NR Cell Global Identity |

-continued

| NEF | Network Exposure Function |
| NF | Network Function |
| NGAP | Next Generation Application Protocol |
| ng-eNB | Next Generation eNB |
| NG-RAN | NR Radio Access Network |
| NI-LR | Network Induced Location Request |
| NPN | Non-Public Network |
| NR | New Radio |
| NRF | Network Repository Function |
| NRPPa | New Radio Positioning Protocol A |
| NSI | Network Slice Instance |
| NSSAI | Network Slice Selection Assistance Information |
| NSSF | Network Slice Selection Function |
| NWDAF | Network Data Analytics Function |
| OAM | Operation Administration and Maintenance |
| OCS | Online Charging System |
| OFCS | Offline Charging System |
| OTDOA | Observed Time Difference of Arrival |
| PCC | Policy and Charging Control |
| PCF | Policy Control Function |
| PCRF | Policy and Charging Rules Function |
| PDCP | Packet Data Convergence Protocol |
| PDN | Packet Data Network |
| PDU | Protocol Data Unit |
| PEI | Permanent Equipment Identifier |
| PGW | PDN Gateway |
| PLMN | Public Land Mobile Network |
| ProSe | Proximity-based Services |
| QFI | QOS Flow Identifier |
| QoS | Quality of Service |
| RM | Registration Management |
| RA | Random Access |
| RAN | Radio Access Network |
| RAT | Radio Access Technology |
| RLC | Radio link control |
| RRC | Radio Resource Control |
| RM | Registration Management |
| S1-AP | S1 Application Protocol |
| SBA | Service Based Architecture |
| SCM | Security Context Management |
| SCTP | Stream Control Transmission Protocol |
| SDAP | Service Data Adaptation Protocol |
| SEA | Security Anchor Function |
| SET | SUPL Enabled Terminal |
| SGW | Serving Gateway |
| SIB | System Information Block |
| SLP | SUPL Location Platform |
| SM | Session Management |
| SMF | Session Management Function |
| SMSF | SMS Function |
| SNF | Second Network Function |
| S-NSSAI | Single Network Slice Selection Assistance information |
| SS | Synchronization Signal |
| SSC | Session and Service Continuity |
| SUCI | Served User Correlation ID |
| SUPI | Subscriber Permanent Identifier |
| SUPL | Secure User Plane Location |
| TA | Tracking Area |
| TAI | Tracking Area Identity |
| TBS | Terrestrial Beacon System |
| TCP | Transmission Control Protocol |
| TEID | Tunnel Endpoint Identifier |
| TMSI | Temporary Mobile Subscriber Identity |
| TNAN | Trusted Non-3GPP Access Network |
| TNGF | Trusted Non3GPP Gateway |
| TRP | Transmission and Reception Point |
| UCMF | UE radio Capability Management Function |
| UDR | Unified Data Repository |
| UDM | Unified Data Management |
| UDP | User Datagram Protocol |
| UE | User Equipment |
| UL | Uplink |
| UL CL | Uplink Classifier |
| UPF | User Plane Function |
| V2X | Vehicle-To-Everything |
| WLAN | Wireless Local Area Network |
| XML | Extensible Markup Language |

Figure 1:
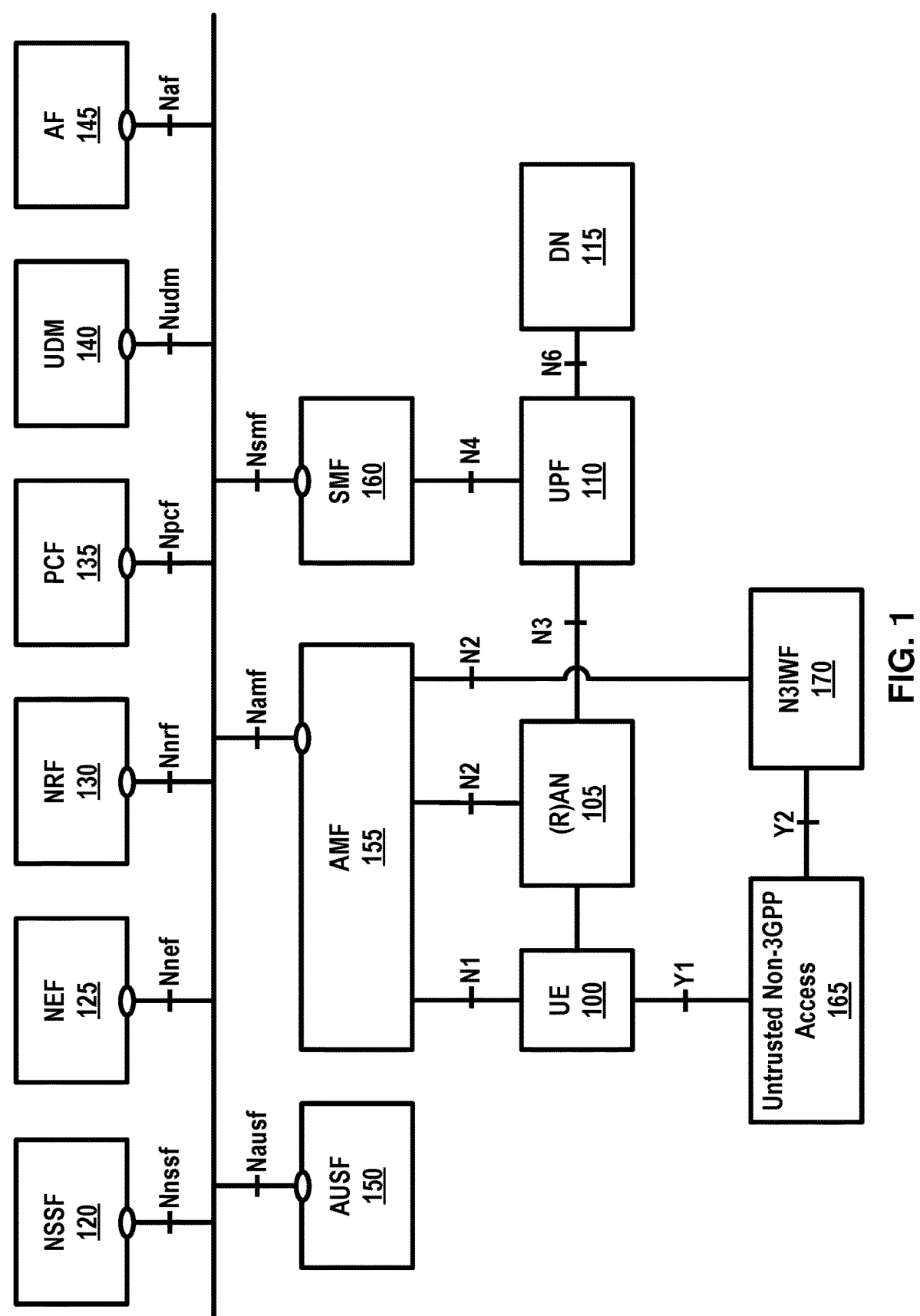
FIG. 1 is a diagram of an example 5G system architecture as per an aspect of an embodiment of the present disclosure.
Figure 2:
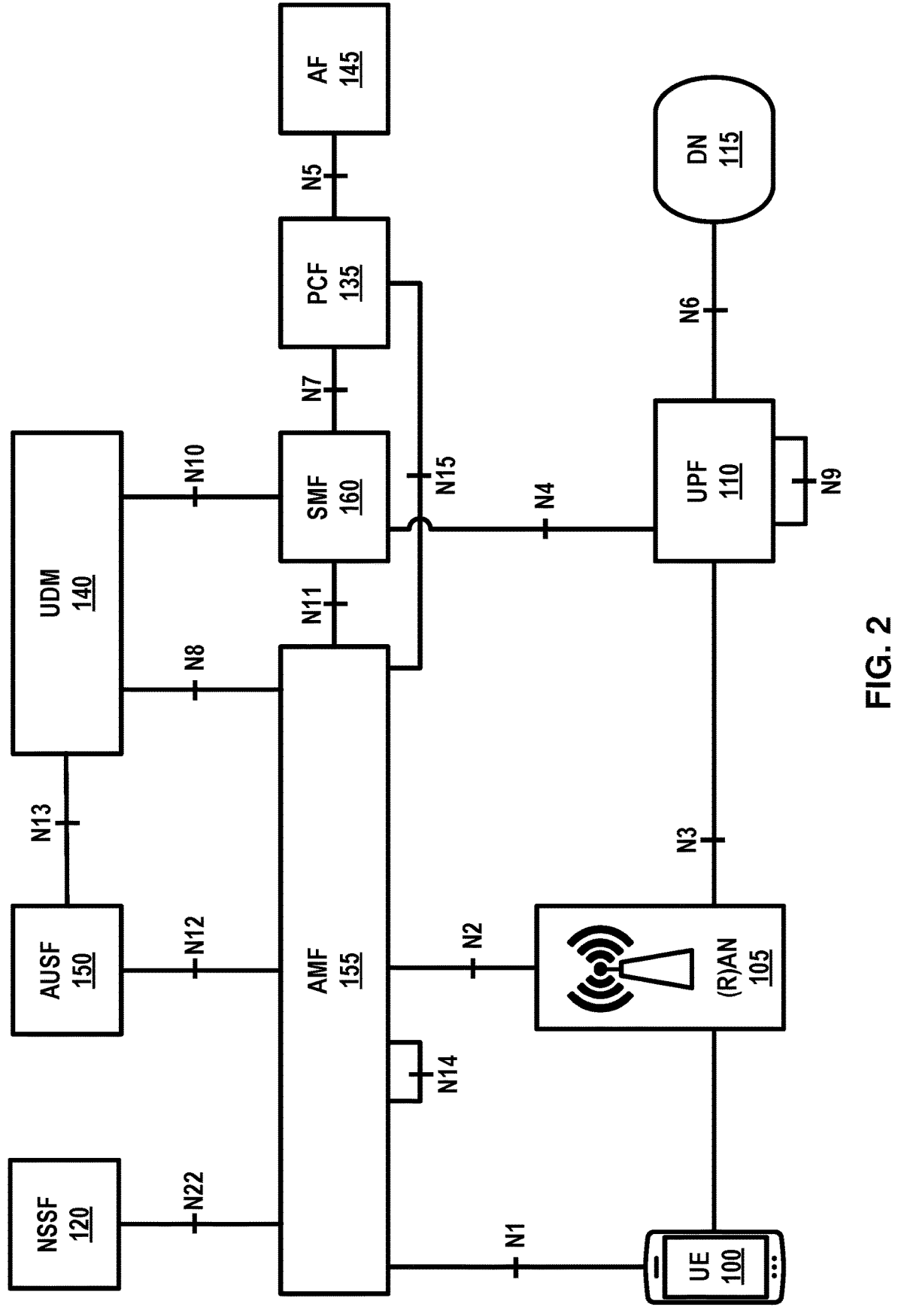
FIG. 2 is a diagram of an example 5G System architecture as per an aspect of an embodiment of the present disclosure.

Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
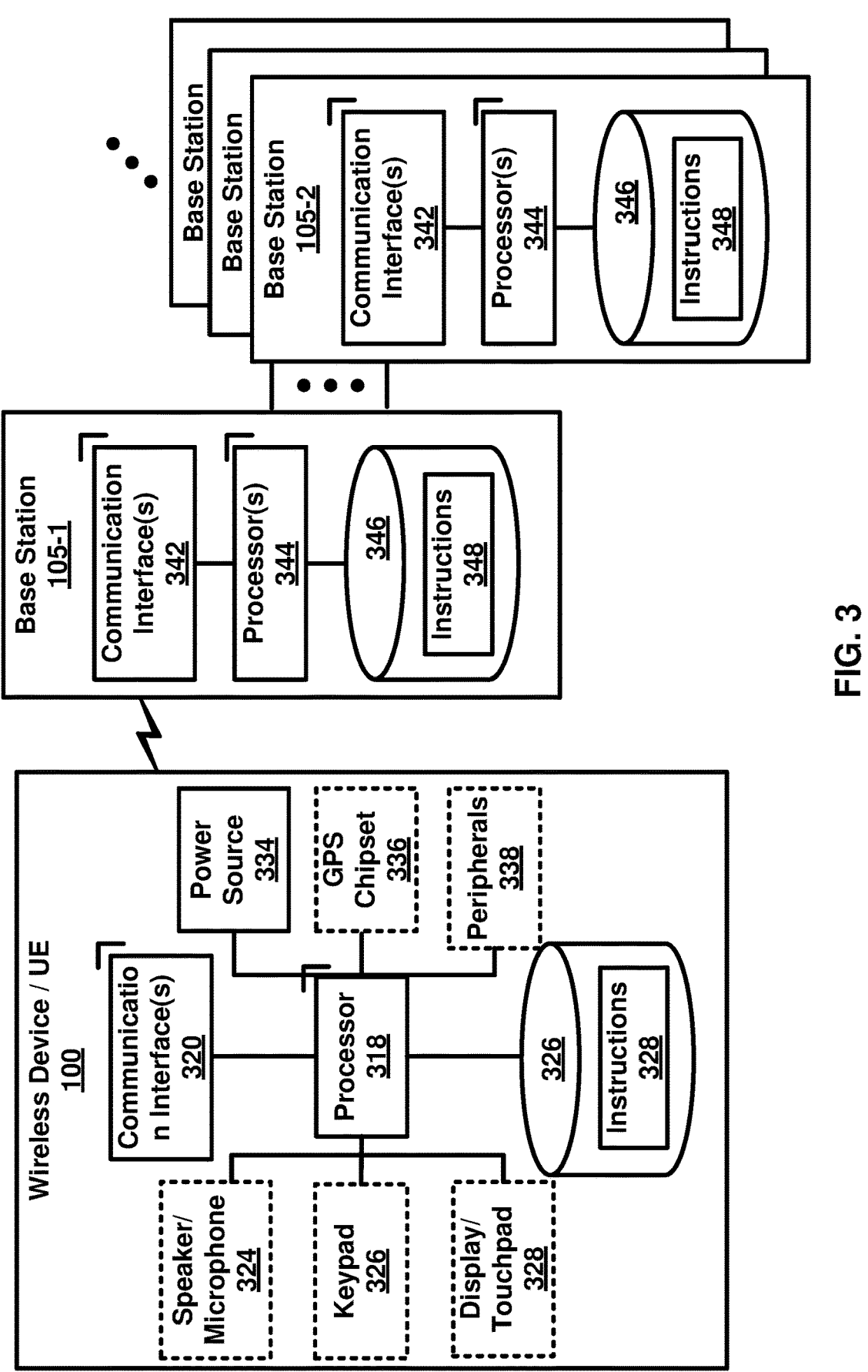
FIG. 3 is a system diagram of an example wireless device and a network node in a 5G system as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, an network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figures 5A, 5B:
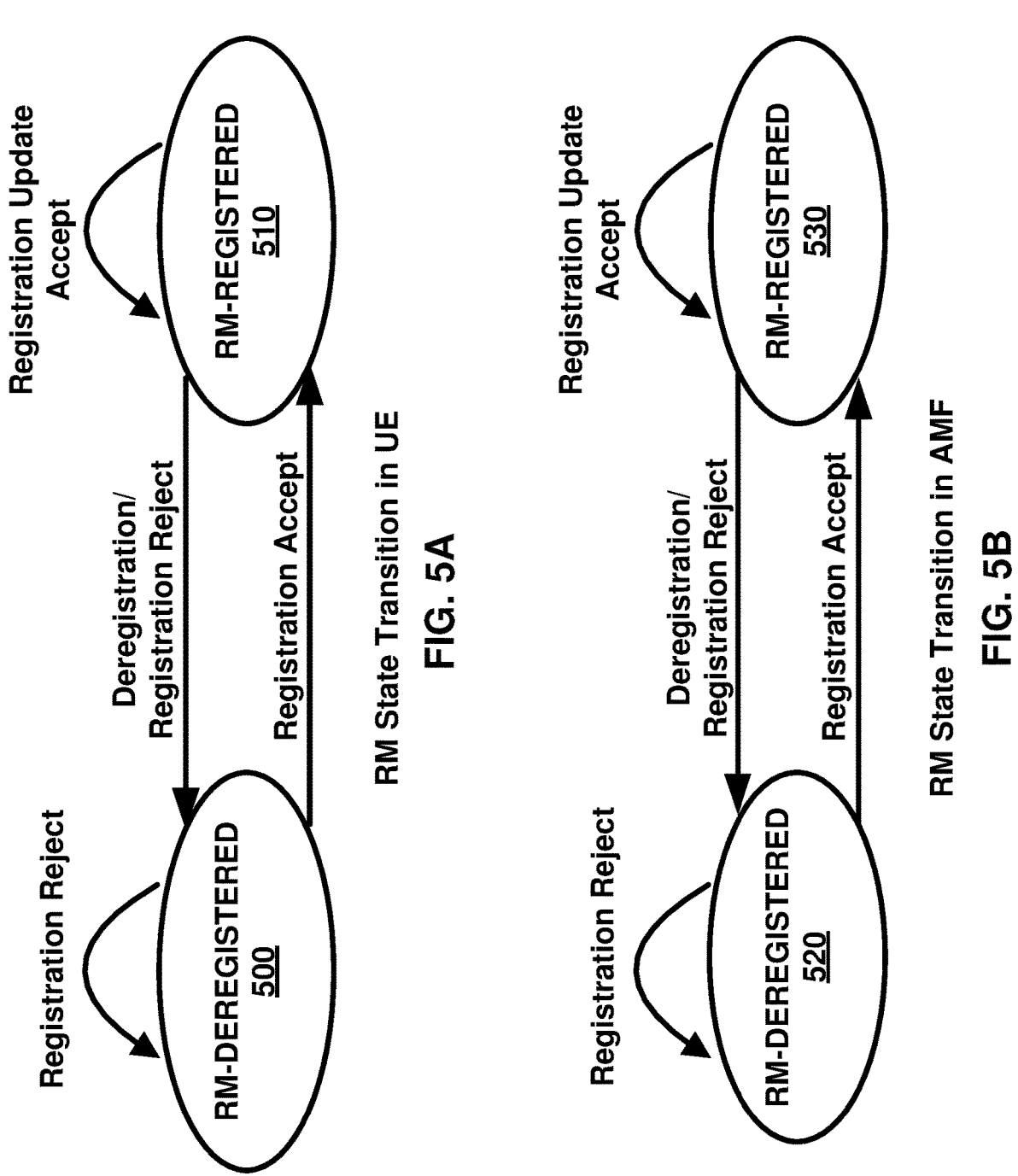
FIG. 5A and FIG. 5B depict two registration management state models in UE 100 and AMF 155 as per an aspect of embodiments of the present disclosure.

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
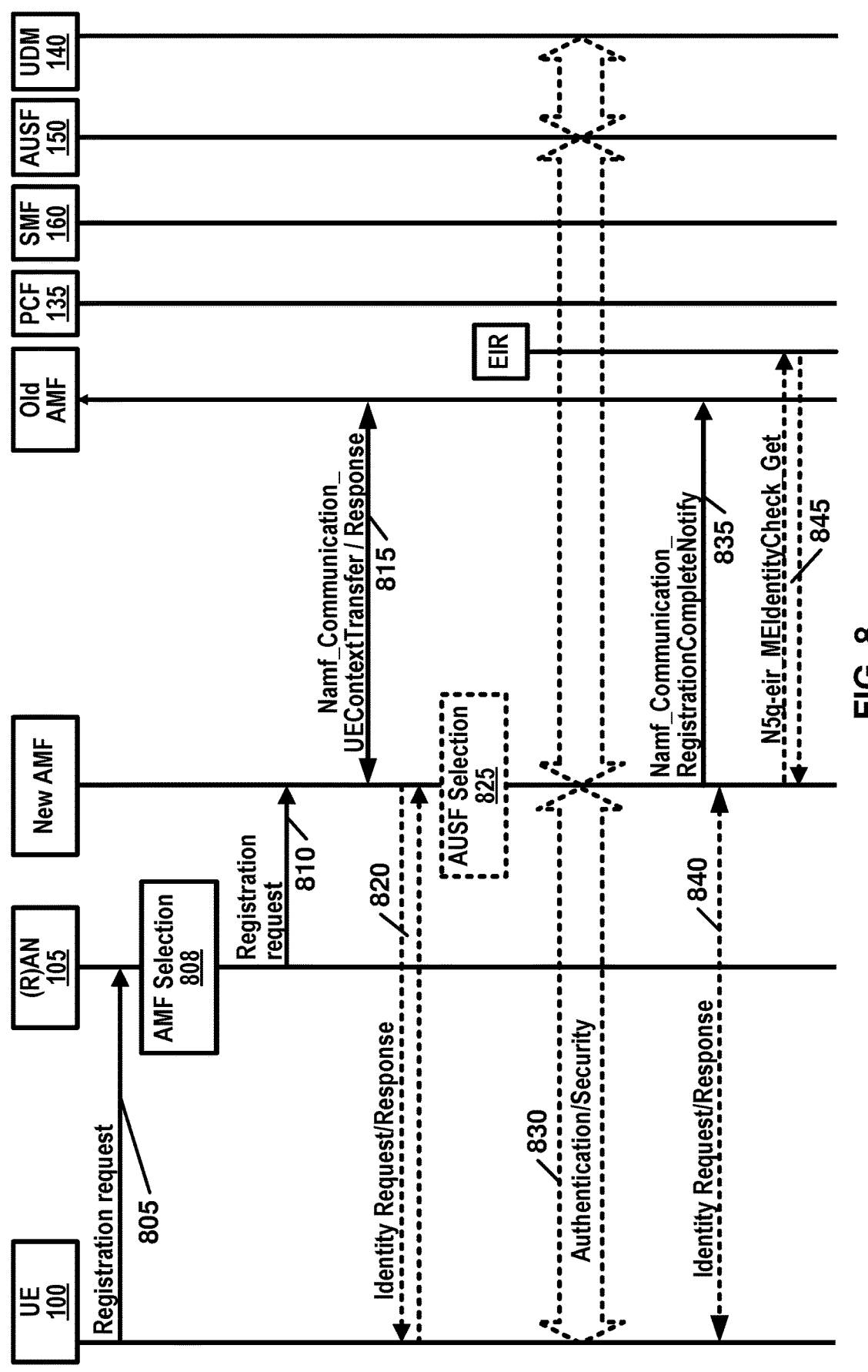
FIG. 8 is an example call flow for registration procedure as per an aspect of an embodiment of the present disclosure.
Figure 9:
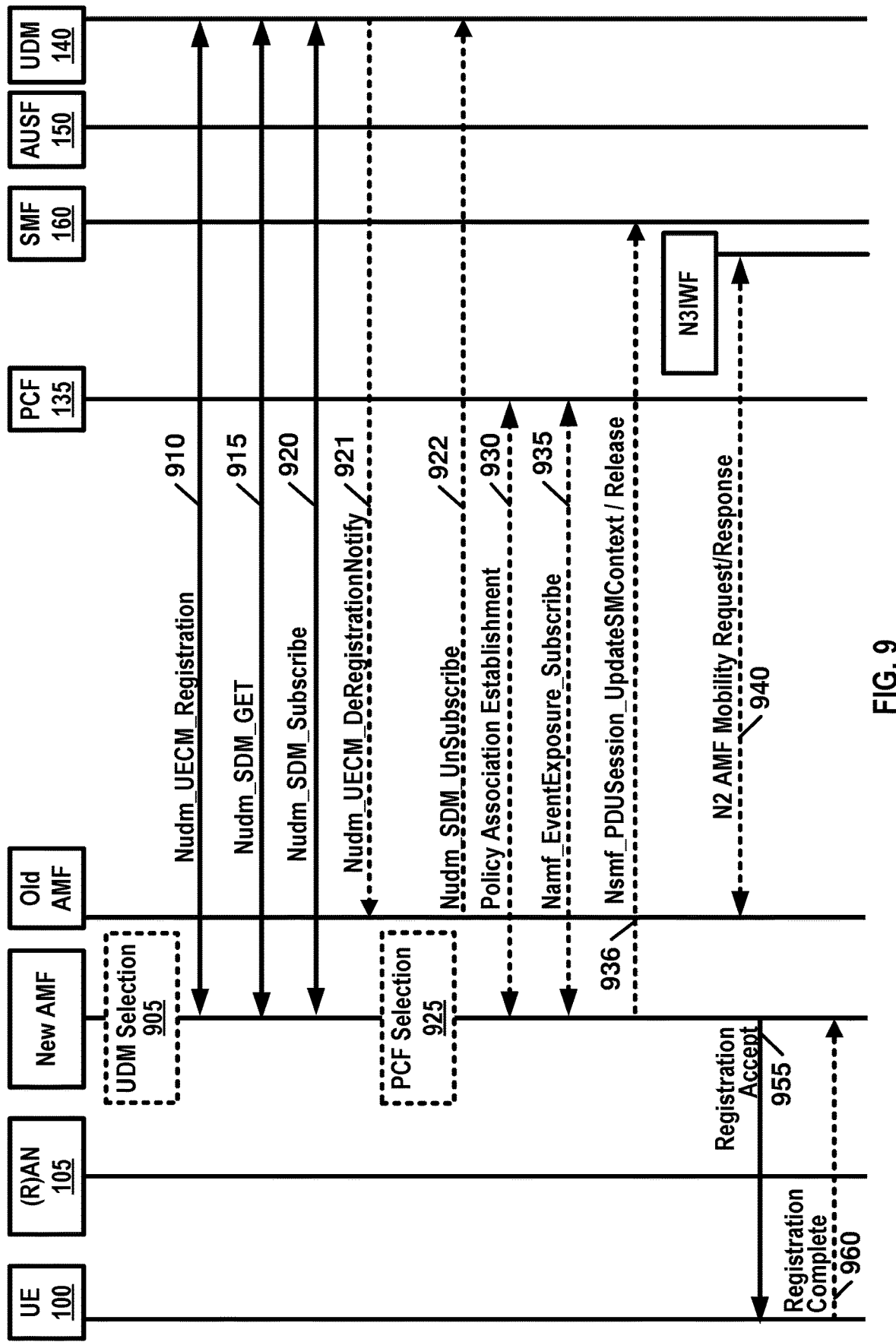
FIG. 9 is an example call flow for registration procedure as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

Figures 6A, 6B:
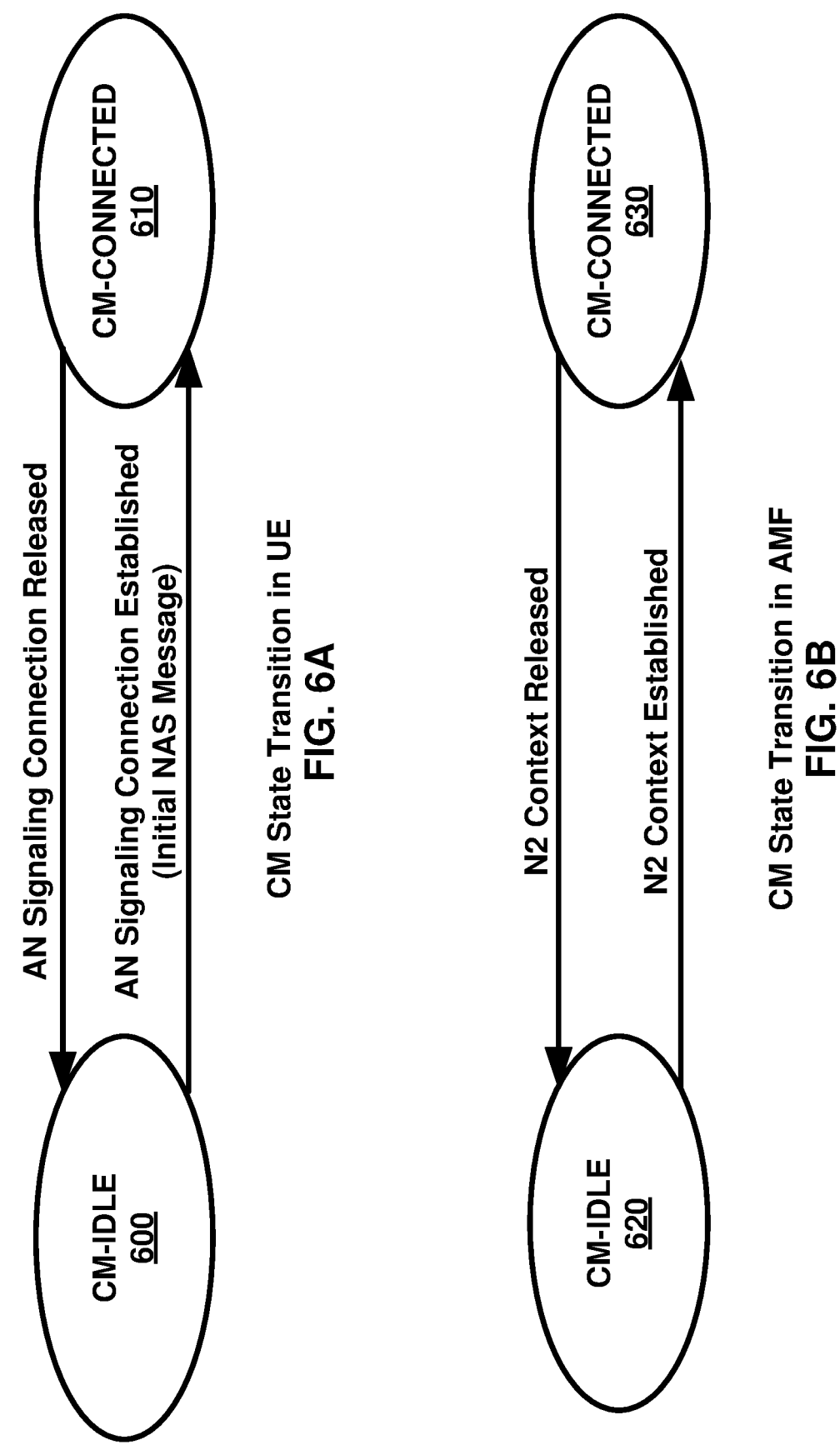
FIG. 6A and FIG. 6B depict two connection management state models in UE 100 and AMF 155 as per an aspect of embodiments of the present disclosure.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the signaling connection between the UE 100 and the (R)AN 105 (e.g. RRC connection over 3GPP access) and the N2 connection for the UE 100 between the and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN

105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
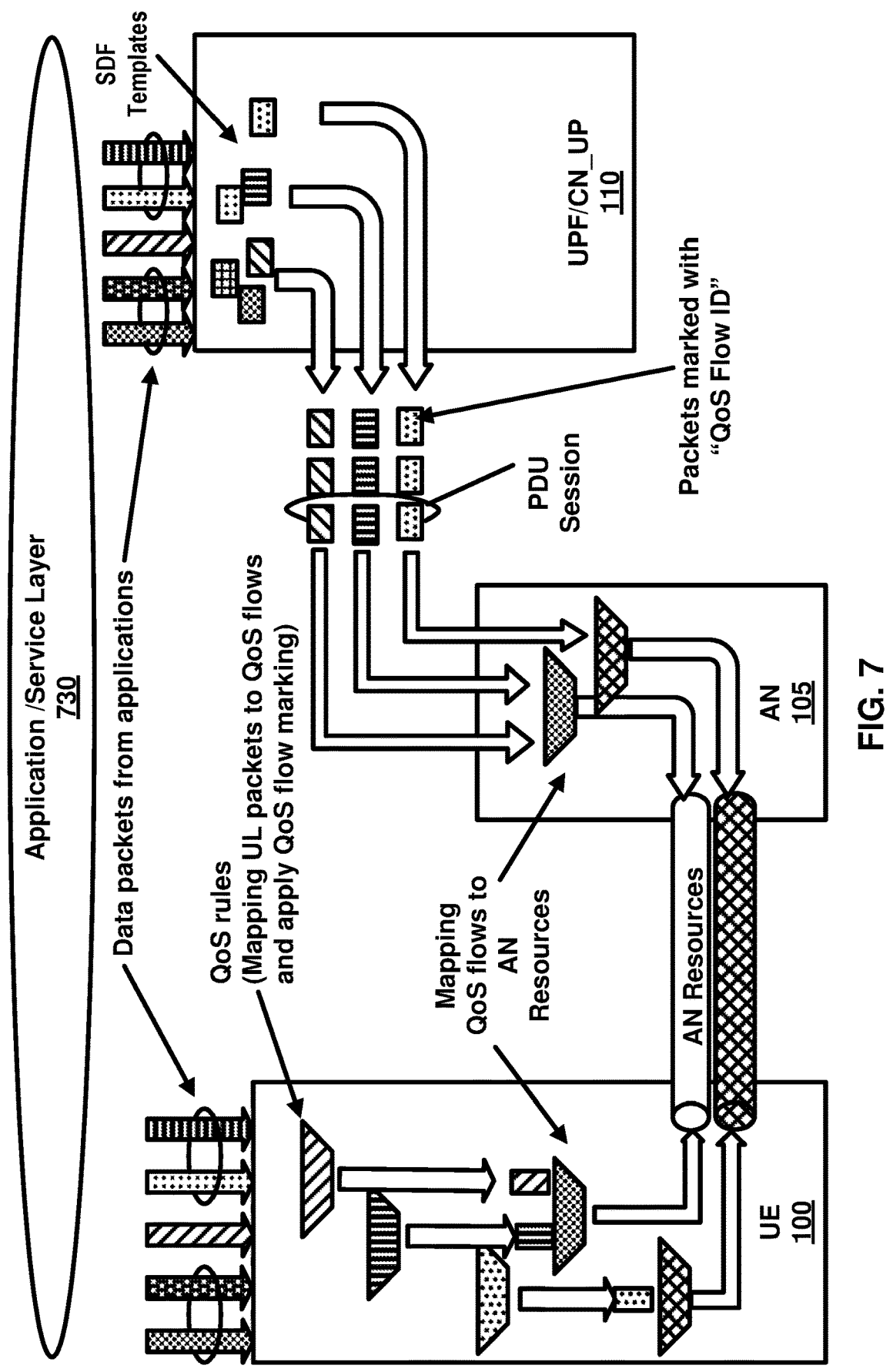
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer.

The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to the a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NS-SAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the parameters may include e.g. SUCI or SUPI or the 5G-GUTI, the Selected PLMN ID and requested NSSAI, and/or the like. In an example, the parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s)

to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AM-PolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_Event-Exposure_Subscribe service operation 935 for UE 100 event subscription.

In an example, the AMF 155 may send to the SMF 160 a Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
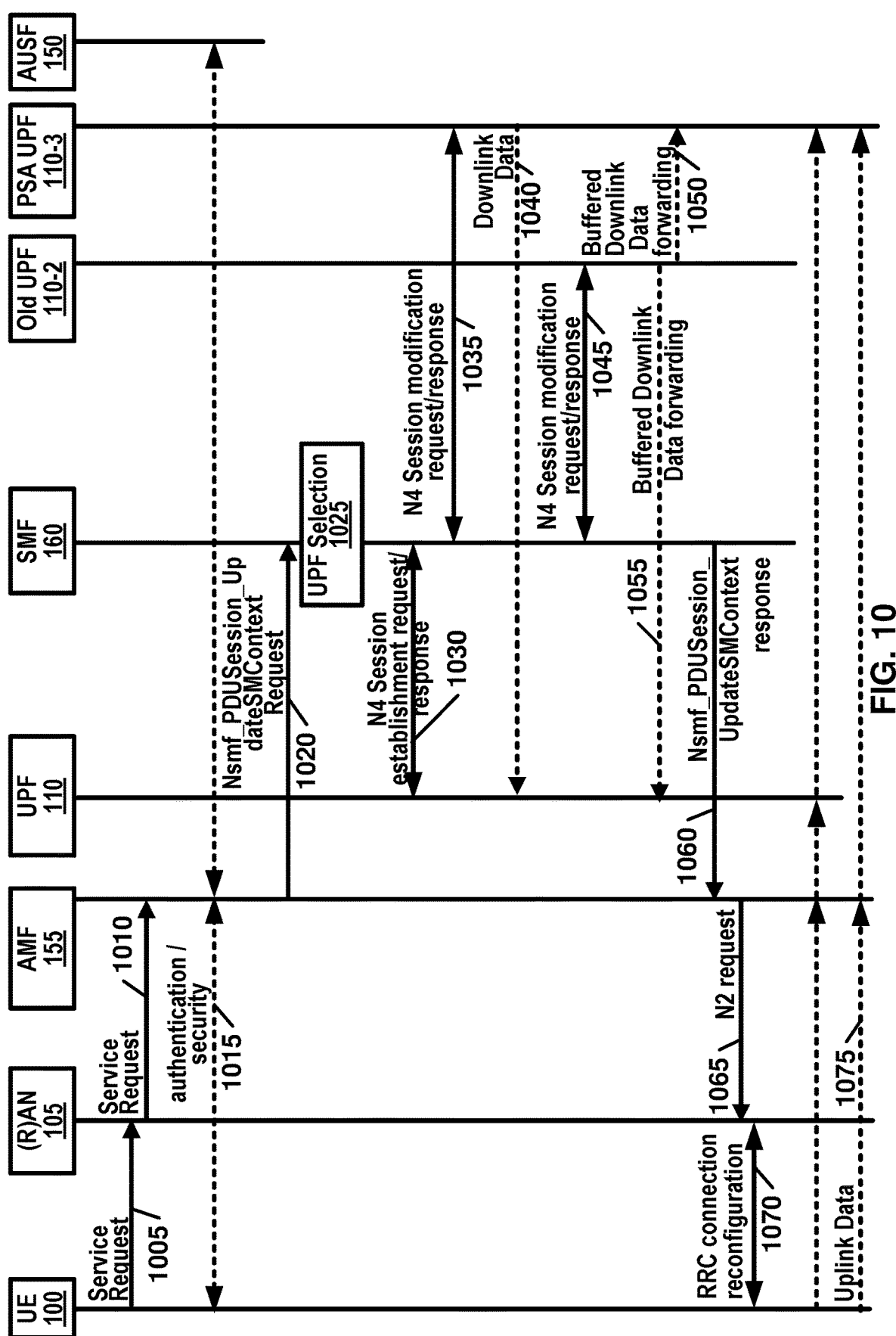
FIG. 10 is an example call flow for service request procedure as per an aspect of an embodiment of the present disclosure.
Figure 11:
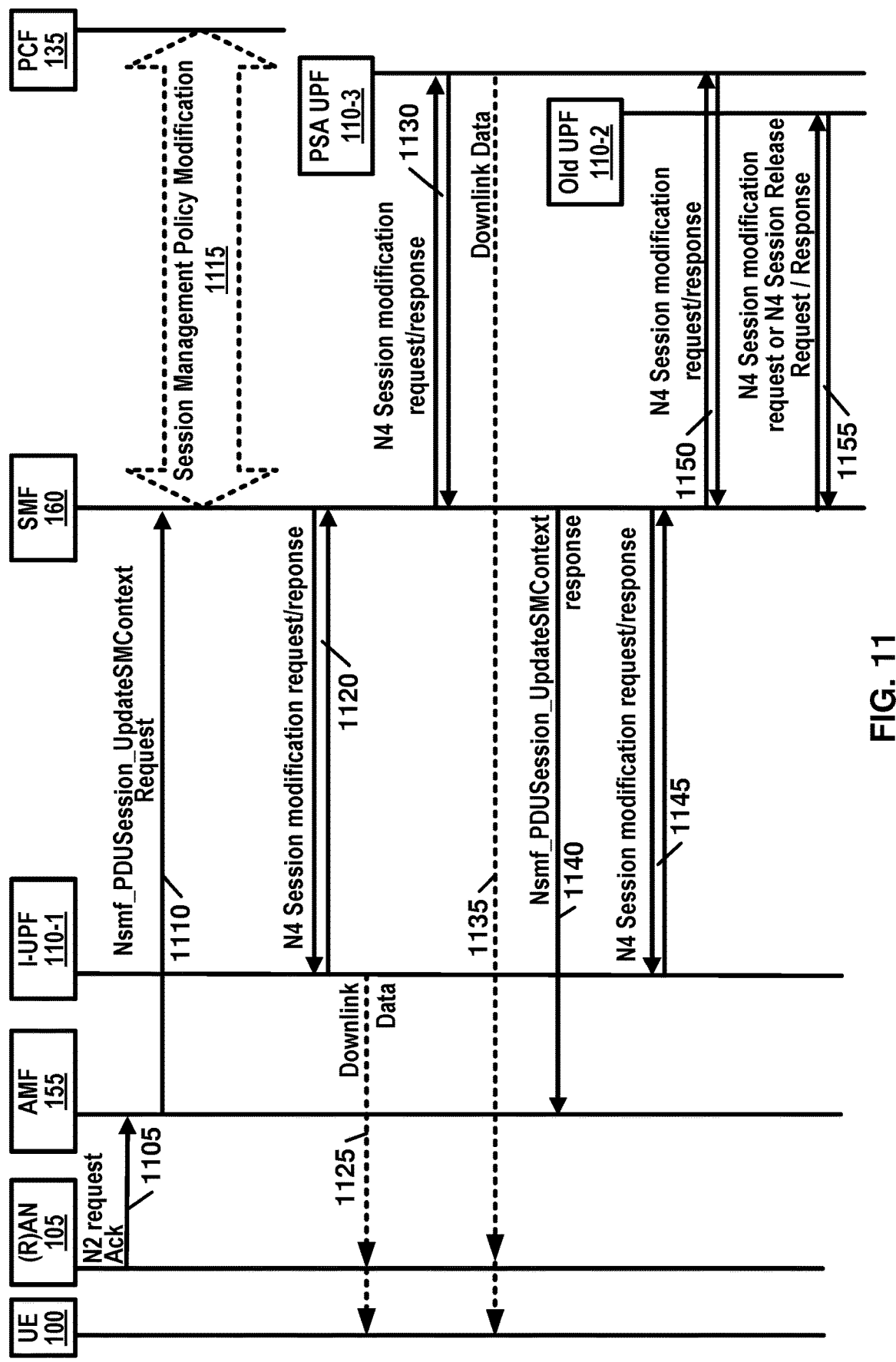
FIG. 11 is an example call flow for service request procedure as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session (s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(*s*) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate)

UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSM-Context response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_Up-dateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_ UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSM-Context response if the PDU session may correspond to a LADN and the UE 100 may be outside the area of avail-ability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signal-ing connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indi-cated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSM-Context response service operations from all the SMF 160s associated with the UE 100 may be received. In such case, the N2 request message may include the N2 SM information received in each of the Nsmf_PDUSession_UpdateSMCon-text response and PDU session ID to enable AMF 155 to associate responses to relevant SMF 160.

In an example, if the RAN 105 (e.g., NG RAN) node may provide the list of recommended cells/TAs/NG-RAN node identifiers during the release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that me be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with a separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
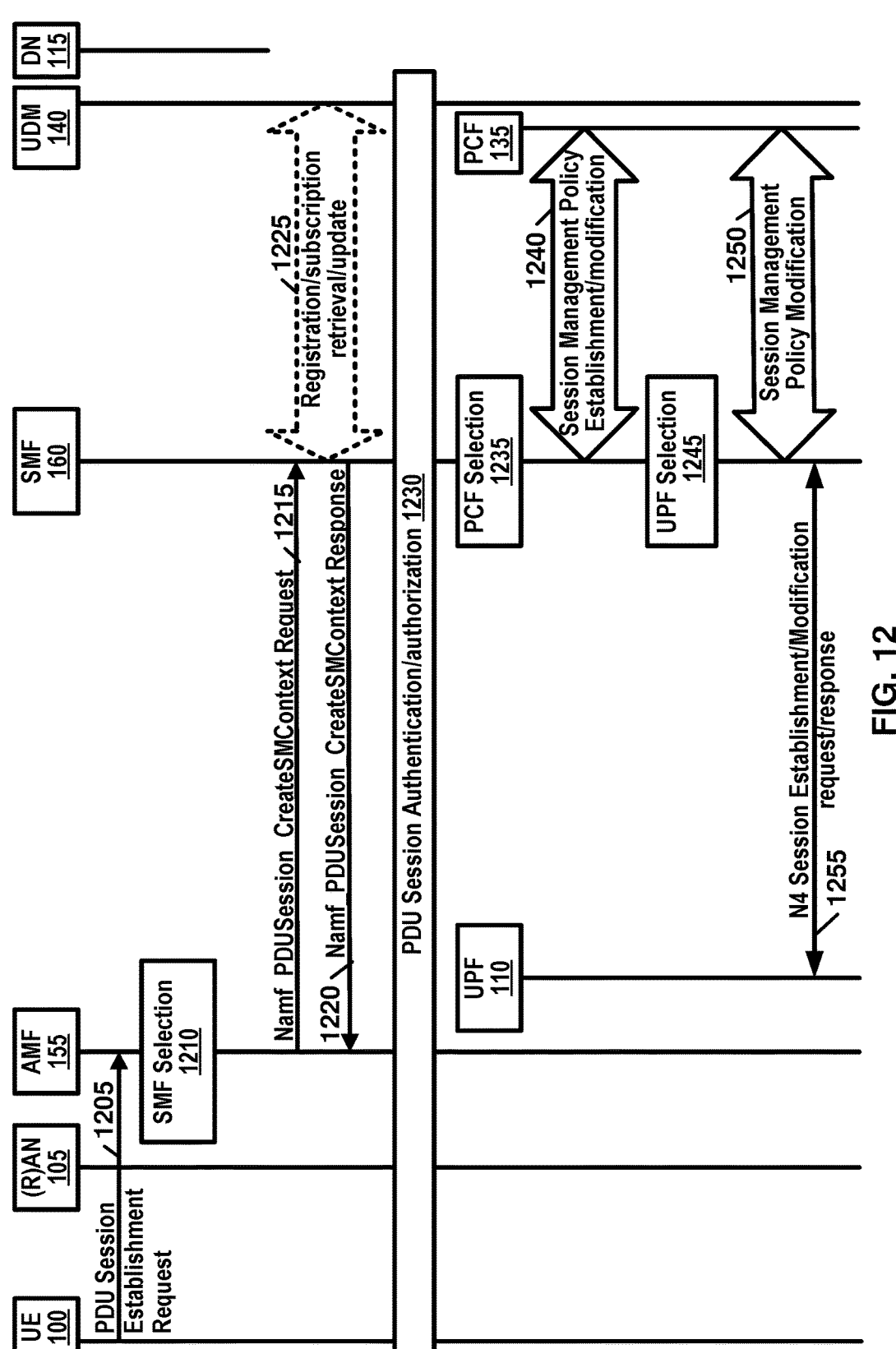
FIG. 12 is an example call flow for PDU session establishment procedure as per an aspect of an embodiment of the present disclosure.
Figure 13:
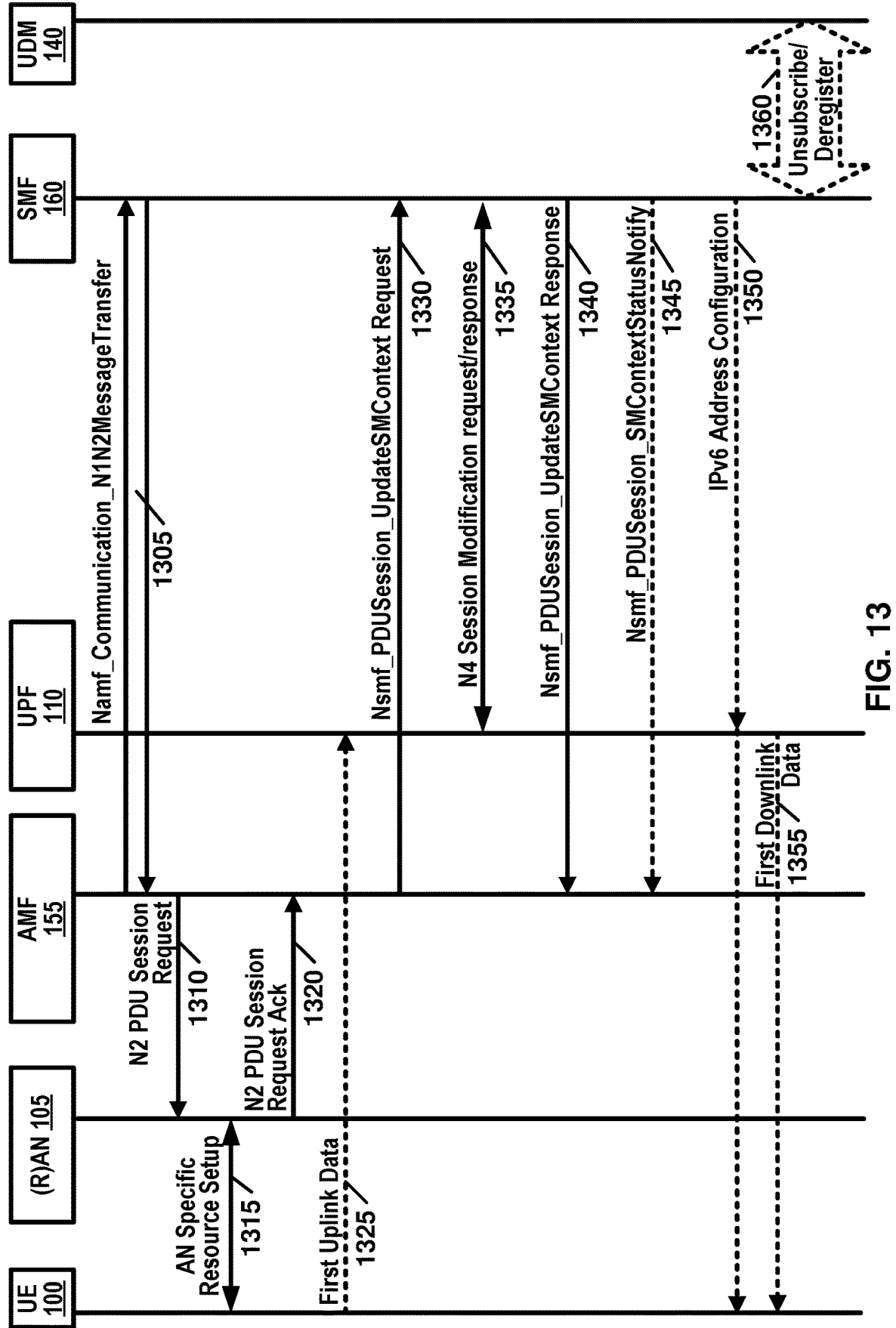
FIG. 13 is an example call flow for PDU session establishment procedure as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSM-Context request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or an Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with each UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE 100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340

(Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NS-SAI). In an example, if the PDU session may not be established, the SMF 160 may deregister 1360 for the given PDU session using Nudm_UECM_Deregistration (SUPI, DNN, PDU session ID).

Figure 14:
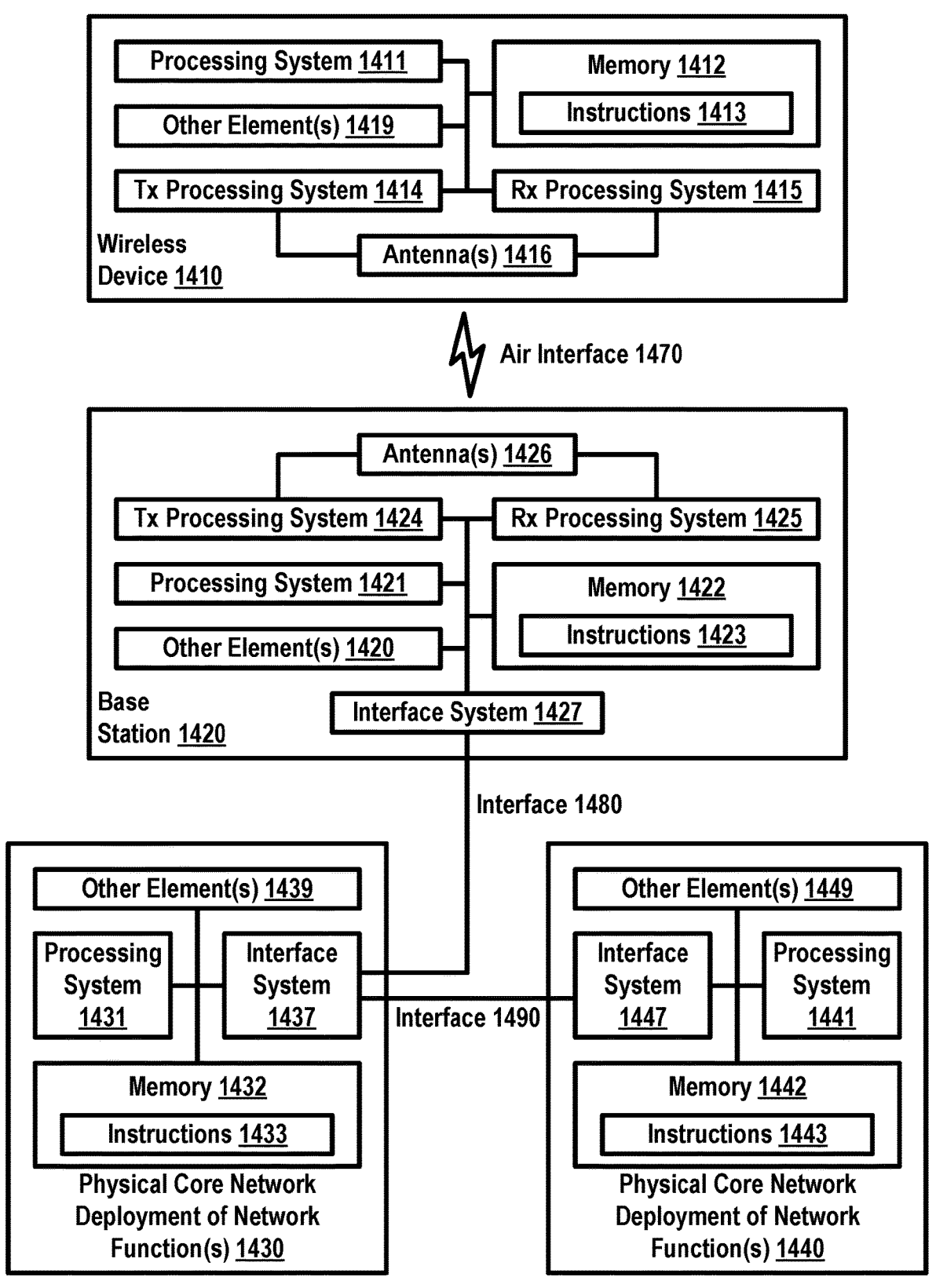
FIG. 14 illustrates an example mobile communication networks as per an aspect of an embodiment of the present disclosure.

FIG. 14 illustrates another example of a mobile communication network in which embodiments of the present disclosure may be implemented. The mobile communication network depicted in FIG. 14 includes a wireless device 1410, a base station 1420, a physical core network deployment of one or more network functions 1430 (henceforth "CN deployment 1430"), and a physical core network deployment of one or more network functions 1440 (henceforth "CN deployment 1440"). The deployment 1430 and the deployment 1440 may be elements of a core network.

The wireless device 1410 may communicate with the base station 1420 over an air interface 1470. The communication direction from the wireless device 1410 to the base station 1420 over the air interface is known as uplink, and the communication direction from the base station 1420 to the wireless device 1410 over the air interface 1470 is known as downlink. Downlink transmissions may be separated from uplink transmissions using FDD, TDD, and/or some combination of the two duplexing techniques. FIG. 14 shows a single wireless device 1410 and a single base station 1420, but it will be understood that the wireless device 1410 may communicate with any number of base stations or other access network components over the air interface 1470, and that the base station 1420 may communicate with any number of wireless devices over the air interface 1470.

The wireless device 1410 may comprise a processing system 1411 and a memory 1412. The memory 1412 may comprise one or more computer-readable media, for example, one or more non-transitory computer readable media. The memory 1412 may include instructions 1413. The processing system 1411 may process and/or execute the instructions 1413. Processing and/or execution of the instructions 1413 may cause the processing system 1411 to perform one or more functions or activities. The memory 1412 may include data (not shown). One of the functions or activities performed by the processing system 1411 may be to store data in the memory 1412 and/or retrieve previously-stored data from the memory 1412. In an example, downlink data received from the base station 1420 may be stored in the memory 1412, and uplink data for transmission to the base station 1420 may be retrieved from the memory 1412. The wireless device 1410 may communicate with the base station 1420 using a transmission processing system 1414 and a reception processing system 1415. The wireless device 1410 may comprise one or more antennas 1416 to access the air interface 1470. Although not shown in FIG. 14, the transmission processing system 1414 and/or the reception processing system 1415 may be coupled to a dedicated memory that is analogous to but separate from the memory 1412, and comprises instructions that may be processed and/or executed to carry out one or more of their respective functionalities.

The wireless device 1410 may comprise one or more other elements 1419. The one or more other elements 1419 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1410 may receive user input data from and/or provide user output data to the one or more one or more other elements 1419. The one or more other elements 1419 may comprise a power source. The wireless device 1410 may receive power from the power source and may be configured to distribute the power to the other components in the wireless device 1410. The power source may comprise one or more sources of power, for example, a battery, a solar cell, a fuel cell, or any combination thereof.

The wireless device 1410 may transmit data to the base station 1420 via the air interface 1470. To perform the transmission, the processing system 1411 may implement layer 3 and layer 2 open systems interconnection (OSI) functionality to process the data for uplink transmission. Layer 3 may include a radio resource control layer (RRC). Layer 14 may include a service data application protocol layer (SDAP), a packet data convergence protocol layer (PDCP), a radio link control layer (RLC), and a media access control layer (MAC). The data may be provided to the transmission processing system 1414, which may implement layer 1 OSI functionality. Layer 1 may include a physical layer (PHY). The wireless device 1410 may transmit the data over the air interface 1470 using one or more antennas 1416. For scenarios where the one or more antennas 1416 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The wireless device 1410 may receive downlink data from the base station 1420 over the air interface 1470. The downlink data may be received via the one or more antennas 1416. The reception processing system 1415 may implement layer 1 OSI functionality on the received downlink data and may provide the data to the processing system 1411. The processing system 1411 may implement layer 2 and layer 3 OSI functionality to process the received downlink data. The base station 1420 may comprise elements analogous to the elements of the wireless device 1410. The base station 1420 may comprise a processing system 1421 and a memory 1422. The memory 1422 may comprise one or more computer-readable media, for example, one or more non-transitory computer readable media. The memory 1422 may include instructions 1423. The processing system 1421 may process and/or execute the instructions 1423. Processing and/or execution of the instructions 1423 may cause the processing system 1421 to perform one or more functions or activities. The memory 1422 may include data (not shown). One of the functions or activities performed by the processing system 1421 may be to store data in the memory 1422 and/or retrieve previously-stored data from the memory 1422. The base station 1420 may communicate with the wireless device 1410 using a transmission processing system 1424 and a reception processing system 1425. The base station 1420 may comprise one or more antennas 1426 to access the air interface 1470. The processing system 1421 may implement layer 14 and layer 3 OSI functionality. The transmission processing system 1424 and the reception processing system 1425 may implement layer 1 OSI functionality to perform transmission of downlink data and reception of uplink data, respectively.

The base station 1420 may comprise an interface system 1427. The interface system 1427 may communicate with one or more elements of the core network via an interface 1480. The interface 1480 may be wired and/or wireless and the interface system 1427 may include one or more components suitable for communicating via the interface 1480. In FIG. 14, the interface 1480 connects the base station 1420 to a single CN deployment 1430, but it will be understood that the wireless device 1410 may communicate with any number of CN deployments over the interface 1480, and that the CN deployment 1430 may communicate with any number of base stations over the interface 1480. The base station 1420 may comprise one or more other elements 1429 analogous to one or more of the one or more other elements 1419.

The CN deployment 1430 may comprise one or more network functions (NFs). For example, the CN deployment 1430 may comprise an AMF and/or a UPF analogous to the AMF and UPF depicted in FIG. 1. The CN deployment 1430 may comprise elements analogous to the elements of the wireless device 1410 and the base station 1420, as described above. The CN deployment 1430 may comprise a processing system 1431 and a memory 1432. The memory 1432 may comprise one or more computer-readable media, for example, one or more non-transitory computer readable media. The memory 1432 may include instructions 1433. The processing system 1431 may process and/or execute the instructions 1433. Processing and/or execution of the instructions 1433 may cause the processing system 1431 to perform one or more functions or activities. The memory 1432 may include data (not shown). One of the functions or activities performed by the processing system 1431 may be to store data in the memory 1432 and/or retrieve previously-stored data from the memory 1432. The CN deployment 1430 may access the interface 1480 using an interface system 1437. The CN deployment 1430 may also use the interface system 1437 to access an interface 1490. The CN deployment 1430 may use the interface 1490 to communicate with one or more data networks (analogous to, for example, the DN(s) depicted in FIG. 1 and/or one or more other CN deployments, including the CN deployment 1440 depicted in FIG. 14. The CN deployment 1430 may comprise one or more other elements 1439.

The CN deployment 1440 may comprise elements analogous to the elements of the CN deployment 1430, as described above. The CN deployment 1440 may comprise a processing system 1441 and a memory 1442. The memory 1442 may comprise one or more computer-readable media, for example, one or more non-transitory computer readable media. The memory 1442 may include instructions 1443. The processing system 1441 may process and/or execute the instructions 1443. Processing and/or execution of the instructions 1443 may cause the processing system 1441 to perform one or more functions or activities. The memory 1442 may include data (not shown). One of the functions or activities performed by the processing system 1441 may be to store data in the memory 1442 and/or retrieve previously-stored data from the memory 1442. The CN deployment 1440 may access the interface 1490 using an interface system 1447. The CN deployment 1440 may comprise one or more other elements.

The processing system 1411, the processing system 1421, the processing system 1431, and/or the processing system 1441 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1411, the processing system 1421, the processing system 1431, and/or the processing system 1441 may perform signal coding/ processing, data processing, power control, input/output processing, and/or any other functionality that may enable the wireless device 1410, base station 1420, CN deployment 1430, and/or CN deployment 1440 to operate in a mobile communications system.

Each CN deployment may comprise one or more network functions. Depending on the context in which the term is used, a network function (NF) may refer to a particular set of functionalities and/or one or more physical elements configured to perform those functionalities (e.g., a processing system and memory comprising instructions that, when executed by the processing system, cause the processing system to perform the functionalities). There are many different types of NF and each type of NF may be associated with a different set of functionalities. Different NFs may be flexibly deployed at different locations (for example, in different physical core network deployments) or in a same location (for example, co-located in the same physical core network deployment). Moreover, physical CN deployment are not limited to implementation of NFs. For example, a particular physical CN deployment may further include a base station or portions therefor and/or a data network or portions thereof. Accordingly, one or more NFs implemented on a particular physical core network deployment may be co-located with one or more non-core elements, including elements of an access network or data network.

Figure 15:
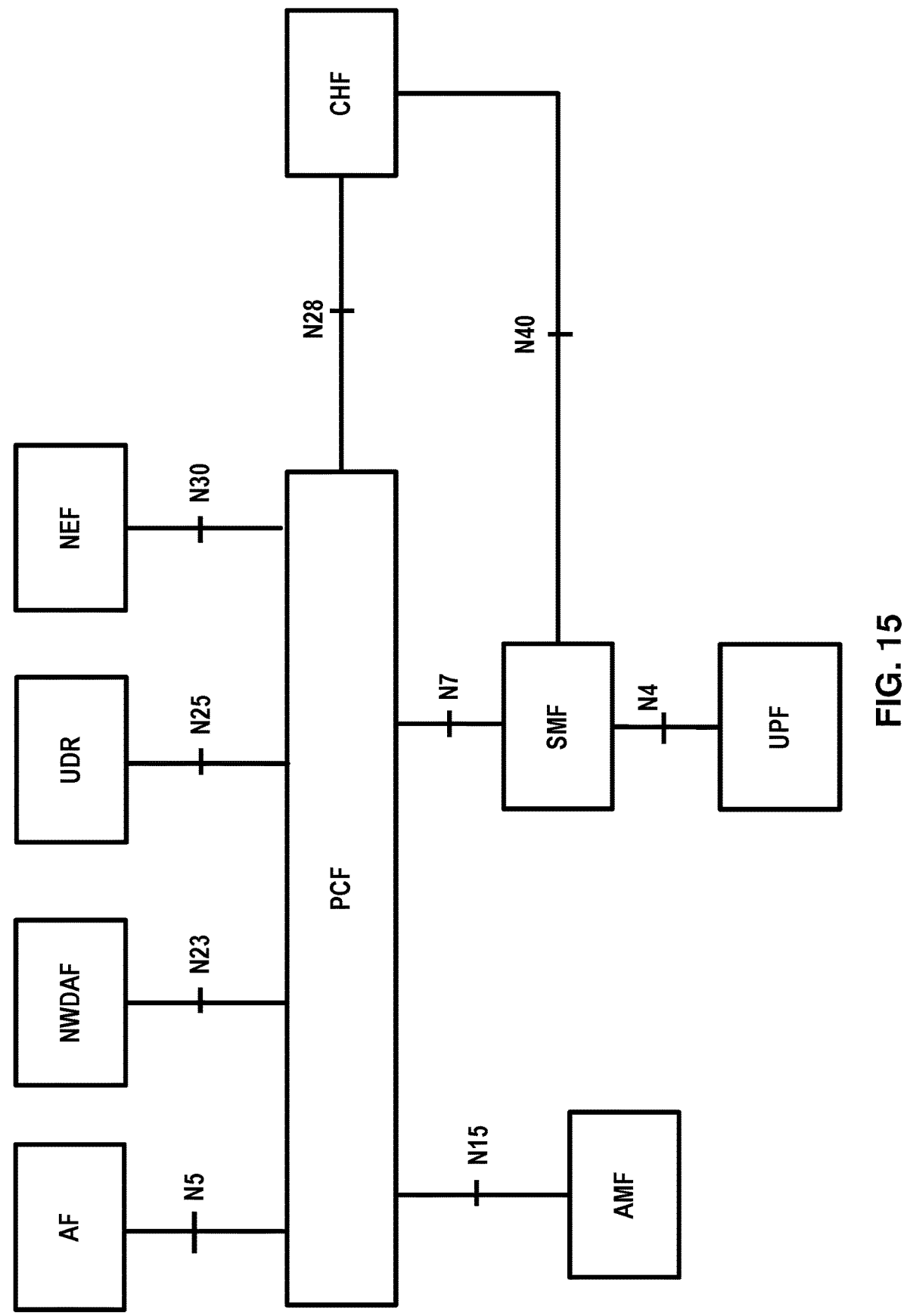
FIG. 15 is a diagram of an example 5G policy and charging control system architecture as per an aspect of an embodiment of the present disclosure.

In an example, FIG. 15 is a diagram of 5G policy and charging control system architecture. The reference architecture of policy and charging control framework for the 5G system may comprise one or more of the following network functions: policy control function (PCF), session management function (SMF), user plane function (UPF), access and mobility management function (AMF), network exposure functionality (NEF), network data analytics function (NWDAF), charging function (CHF), application function (AF) and unified data repository (UDR).

In an example, the CHF may support at least one charging method: offline charging, online charging, or converged charging. In an example, the offline charging may be a process where charging information for network resource usage may be collected concurrently with that resource usage. At the end of the process, CDR files may be generated by the network, which may be transferred to a network operator's billing domain (BD) for the purpose of subscriber billing and/or inter-operator accounting (or additional functions, e.g. statistics, at the operator's discretion). The BD typically comprises post-processing systems such as the operator's billing system or billing mediation device. In an example conclusion, offline charging may be a mechanism where charging information does not affect, in real-time, the service rendered. In an example, online charging may be a process where charging information for network resource usage may be collected concurrently with that resource usage in the same fashion as in offline charging. However, authorization for the network resource usage may be obtained by the network prior to the actual resource usage to occur. In an example, the charging information utilized in online charging may be not necessarily identical to the charging information employed in offline charging. In an example conclusion, online charging may be a mechanism where charging information may affect, in real-time, the service rendered and therefore a direct interaction of the charging mechanism with the control of network resource usage may be required. In an example, converged charging may be a process where online and offline charging may be combined.

Figure 16:
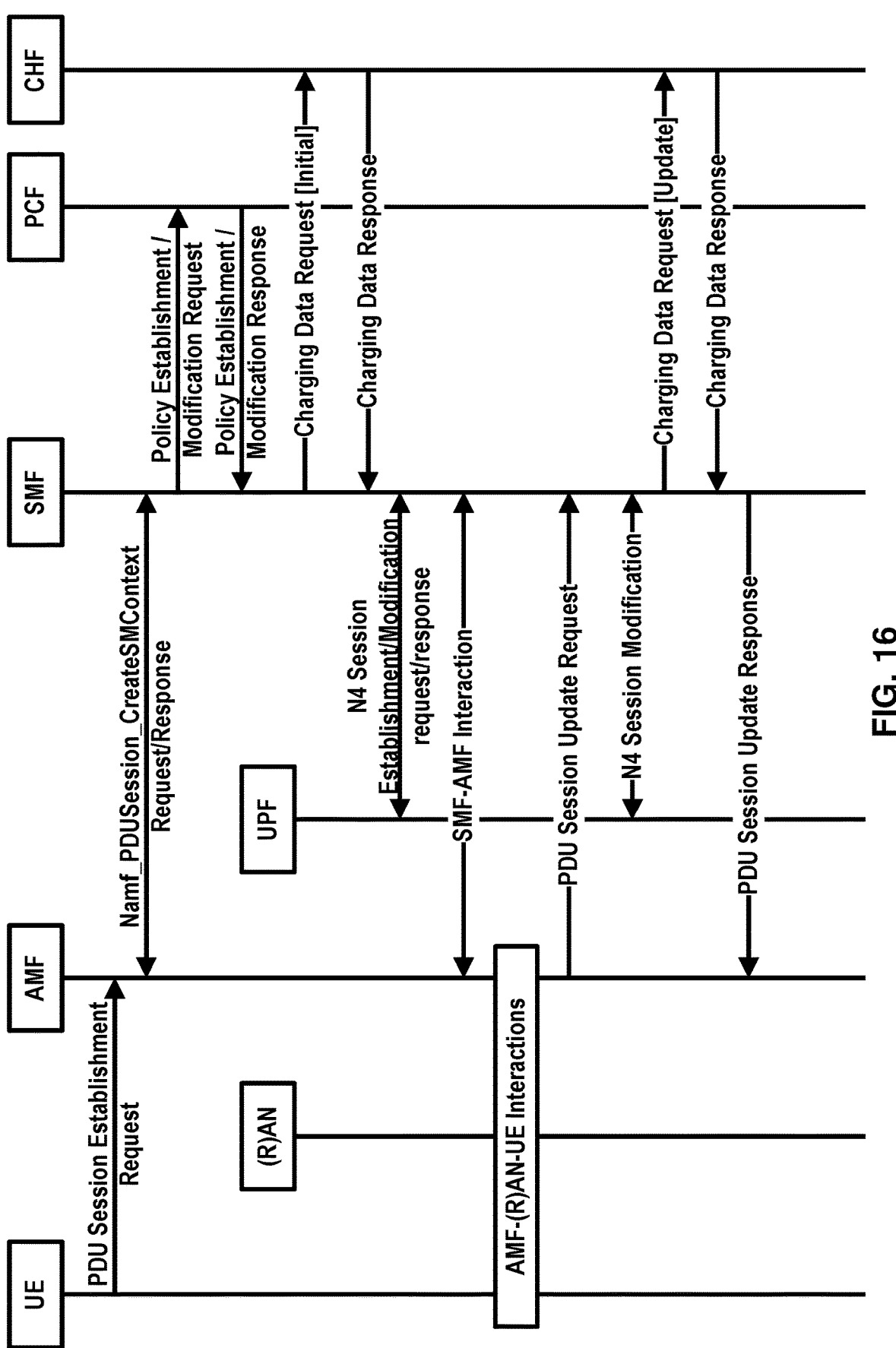
FIG. 16 is an example call flow for PDU session establishment charging as per an aspect of an embodiment of the present disclosure.

FIG. 16 is an example call flow for PDU session establishment charging as per an aspect of an embodiment of the present disclosure. In an example, a UE may initiate a PDU Session establishment procedure. The UE may transmit a PDU Session Establishment Request to an AMF. The PDU Session Establishment Request may comprise one or more of: PDU Session ID, PDU Type, SSC mode, User location information and Access Technology Type Information. In response to the message received from the UE, the AMF may select an SMF. The AMF may send the SMF a message (e.g., Namf_PDUSession_CreateSMContext Request). The SMF may send to the AMF a response message (e.g., Namf_PDUSession_CreateSMContext Response).

In an example, the SMF may select a PCF. The SMF may send to the PCF a message to request PCC rules (e.g., an SM Policy Association Establishment Request and/or SM Policy Association Modification Request). The PCF may provide PCC rules in a response message (e.g. SM Policy Association Establishment Response and/or SM Policy Association Modification Response). In an example, the SMF may create a Charging Id for the PDU session. The Charging Id may be based on the PCC rules. The SMF may send a Charging Data Request [initial] message to a CHF. The Charging Data Request may request authorization for a subscriber associated with the UE to start the PDU session which is triggered by start of PDU session charging event. In an example, the CHF may open CDR for this PDU session and may acknowledge by sending a Charging Data Response [Initial] to the SMF. In an example, the SMF select a UPF and may initiate an N4 Session Establishment/Modification procedure with the selected UPF. The SMF may interact with the AMF, in an example, the SMF may send to the AMF a Namf_Communication_N1N2MessageTransfer message comprising one or more of: PDU Session ID, QoS Profile(s), CN Tunnel Info, and S-NSSAI from the Allowed NSSAI. In an example, the AMF may interact with (R)AN and UE by sending to the (R)AN a N2 PDU Session Request message comprising the information received from the SMF, indicating the PDU session establishment is accepted.

In an example, the (R)AN may send to the AMF a N2 PDU Session Response message comprising one or more of: PDU Session ID, N2 SM information (PDU Session ID, AN Tunnel Info, List of accepted/rejected QFI(s)), wherein the Tunnel Info may be corresponding to the Access Network address of the N3 tunnel corresponding to the PDU Session. In an example, the AMF may send to the SMF a Nsmf_PDUSession_UpdateSMContext Request message comprising the N2 SM information received from (R)AN to the SMF. In an example, the SMF may initiate an N4 Session Modification procedure with the UPF. The SMF may provide AN Tunnel Info to the UPF as well as the corresponding forwarding rules. The UPF may send to the SMF a response message. In an example, the SMF may request quota from CHF, e.g. "start of service data flow" event may need quota from CHF. The SMF may send a message to the CHF (e.g. Charging Data Request [update]). As an example, for online charging or converged charging, the SMF may request quota from CHF when allocated quota is consumed or a trigger is met to request a quota.

In an example, the UPF may report resource usage of a PDU session to the SMF. As an example, the UPF may report resource usage of a wireless device to the SMF. by enforcing the charging control rules, the SMF may send to the CHF a message (e.g. Charging Data Request [update]) comprising resource usage information received from the UPF. In an example, the CHF may update CDR for this PDU session. The CHF may acknowledge the SMF by sending a Charging Data Response message. In an example, the SMF may send to the AMF a Nsmf_PDUSession_UpdateSMContext Response message.

Figure 17:
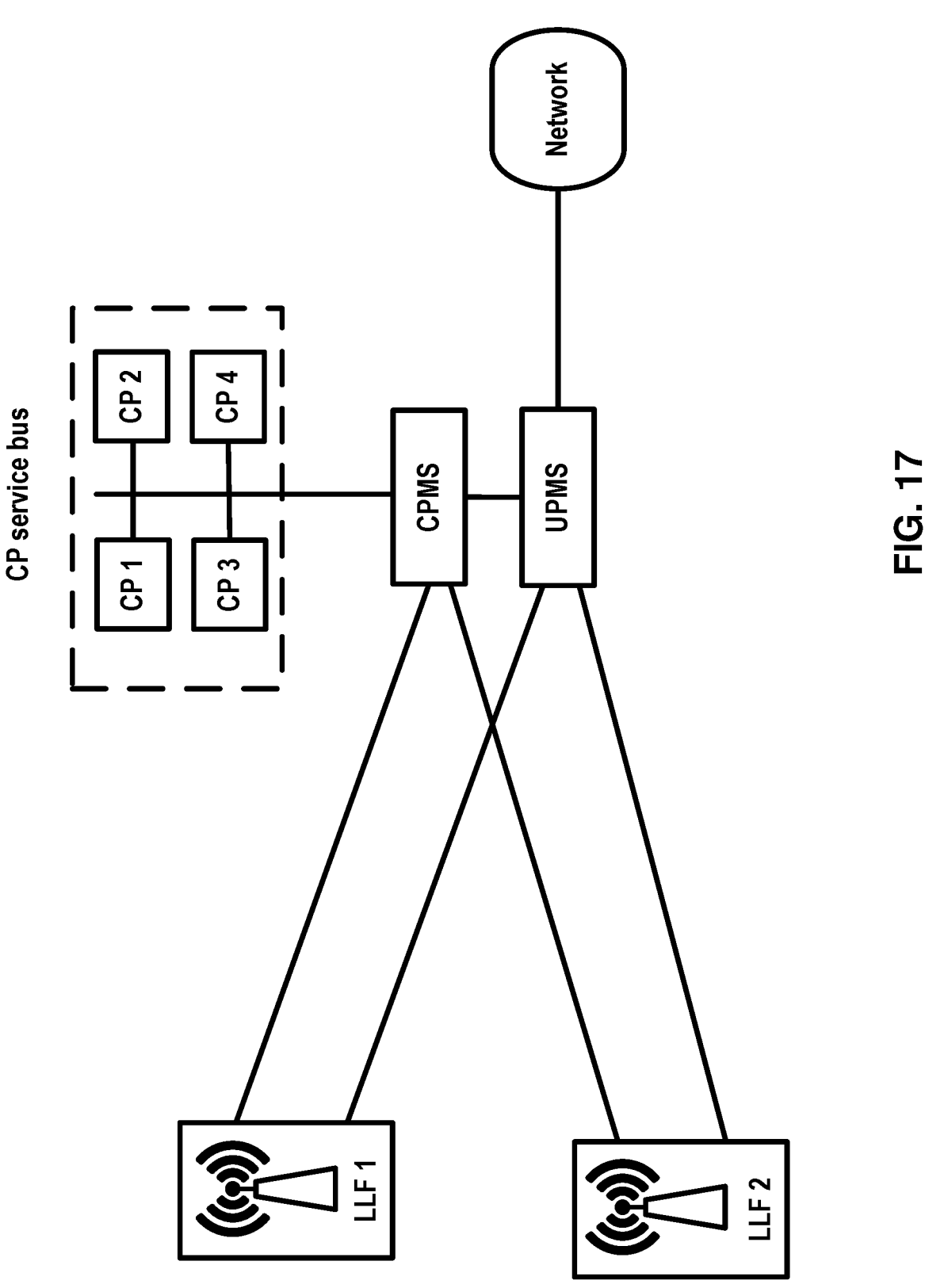
FIG. 17 is a diagram of an example communication network architecture as per an aspect of an embodiment of the present disclosure.

FIG. 17 is a diagram of an example communication system architecture. In an example, research into the design options of a new generation of mobile networks may offer the opportunity to make the network simpler and more flexible. Network simplification may be achieved primarily by harmonizing functions across different entities, eliminating duplicate functionality, reducing system state and processing to the extent possible while still meeting the requirements. In 2G and 3G, the GPRS network included four different nodes in the user plane, GGSN, SGSN, RNC and node B. In 4G EPC, user plane nodes were reduced to PGW, SGW, and eNodeB, and in 5G Core, user plane nodes were reduced to UPF and gNB. Flexibility may be achieved by allowing independent scaling and placement of different functions and ensuring the ability to quickly create new services.

Several criteria may be used to optimize functional placement such as latency, security, resilience, and energy efficiency. The major trends that have facilitated the flexibility may be the separation of user plane and control plane, virtualization of the Core, and more recently, cloud native implementation of the Core. In an example, with the evolution of 5G RAN to vRAN, we may see a similar transformation in the RAN with the separation of the base station CU control and user plane functions, cloud native implementation, and centralized placement. Furthermore, the service-based architecture approach of the 5G Core may extend to the RAN in the future. As the Core user plane functions move closer to the edge because of increasing traffic volume and lower latency requirement, there may be an opportunity to harmonize the RAN and Core functions to create a simpler network.

FIG. 17 shows an example of the converged RAN and Core architecture for 6G. The network may comprise one or more Lower Layer Function (LLF) entities that includes all the latency-critical air interface related RAN functions that are not included in the radio unit. The network may comprise User Plane Micro Services (UPMS) and Control Plane Micro Service (CPMS) functional entities that include all the higher layer RAN and Core capabilities as micro-services. The CPMS may include both RAN and Core services such as radio resource control, radio intelligent control (RIC), mobility management, authentication, radio resource management, etc. The UPMS may include higher layer RAN user plane as well as Core user plane services such as header compression, encryption, QoS policy enforcement and deep packet inspection. The UPMS and CPMS may be based on a framework that exposes APIs for new micro-services to be added to the core set of services that define the two functional entities. The micro services that constitute the UPMS and CPMS may be placed in the het-cloud in a disaggregated fashion. There may be a local and central instance of the UPMS serving different sets of use cases. RAN-CORE convergence and functional optimization may enable highly specialized RAN (e.g., V2X), and slice specific RAN. Ease of introduction of new services and new types of devices with different radio capabilities and dedicated SW stacks may enhance time to market and network total cost of ownership.

The deployment of non-standalone 5G architecture may firmly establish the use of dual connectivity in access where each device is connected to LTE and NR cells. Driven by the need for high reliability, NR-NR dual connectivity may be also likely to be deployed. In dual connectivity, a device may not be associated with only a single cell, but both a master cell and a slave cell. At the same time, integrated access and backhaul (IAB) has been standardized to extend the range of the wireless connection in high bands. IAB nodes may be Layer 2 nodes that simply store and forward packets from the donor node and do not maintain any UE control plane or higher layer user plane state themselves. Enabling dual connectivity for IAB nodes and end devices may result in true mesh connectivity, where a device can connect to the network through multiple routes. Mesh connections of even higher density may be achieved by extending dual to multi-connectivity at each hop. Furthermore, with cloud implementation of the 6G CP and UP functions equivalent to CU-CP and CU-UP and higher layer DU functions, devices may become cell-free with state maintained only at the CP and UP anchors in the edge cloud.

In an example, Holographic communications, employing multiple view cameras, may demand data rates in the order of Tbps in 6G, which are not supported by 5G. In an example, the key objective in Industry 4.0 may be to reduce the need for human intervention in industrial processes by using automatic control systems and communication technologies. In numerical terms, when applied to high-precision manufacturing, this may translate to very high reliability, e.g. up to the order of 10-9 and extremely low latency, in the order of 0.1 to 1 millisecond (ms) round trip time. Furthermore, industrial control networks may require real-time data transfer and strong determinism, which may translate into a very low delay jitter, in the order of 1 μsec. The following table 1 shows an example comparison of 5G and 6G KPI's; NS=Not Specified.

TABLE 1

| KPI | 5G | 6G |
| --- | --- | --- |
| Data rate DL | 20 Gbps | 1 Tbps |
| Data rate UL | 20 Gbps | 1 Tbps |

TABLE 1-continued

| KPI | 5G | 6G |
| --- | --- | --- |
| Uniform user experience | 50 Mbps 2D everywhere | 10 Gbps 3D everywhere |
| Latency (radio interface) | 1 msec | 0.1 msec |
| Jitter | Not Specified | 1 μsec |
| Reliability | 10-5 | 10-9 |
| Localization precision | 10 cm on 2D | 1 cm on 3D |

Figure 18:
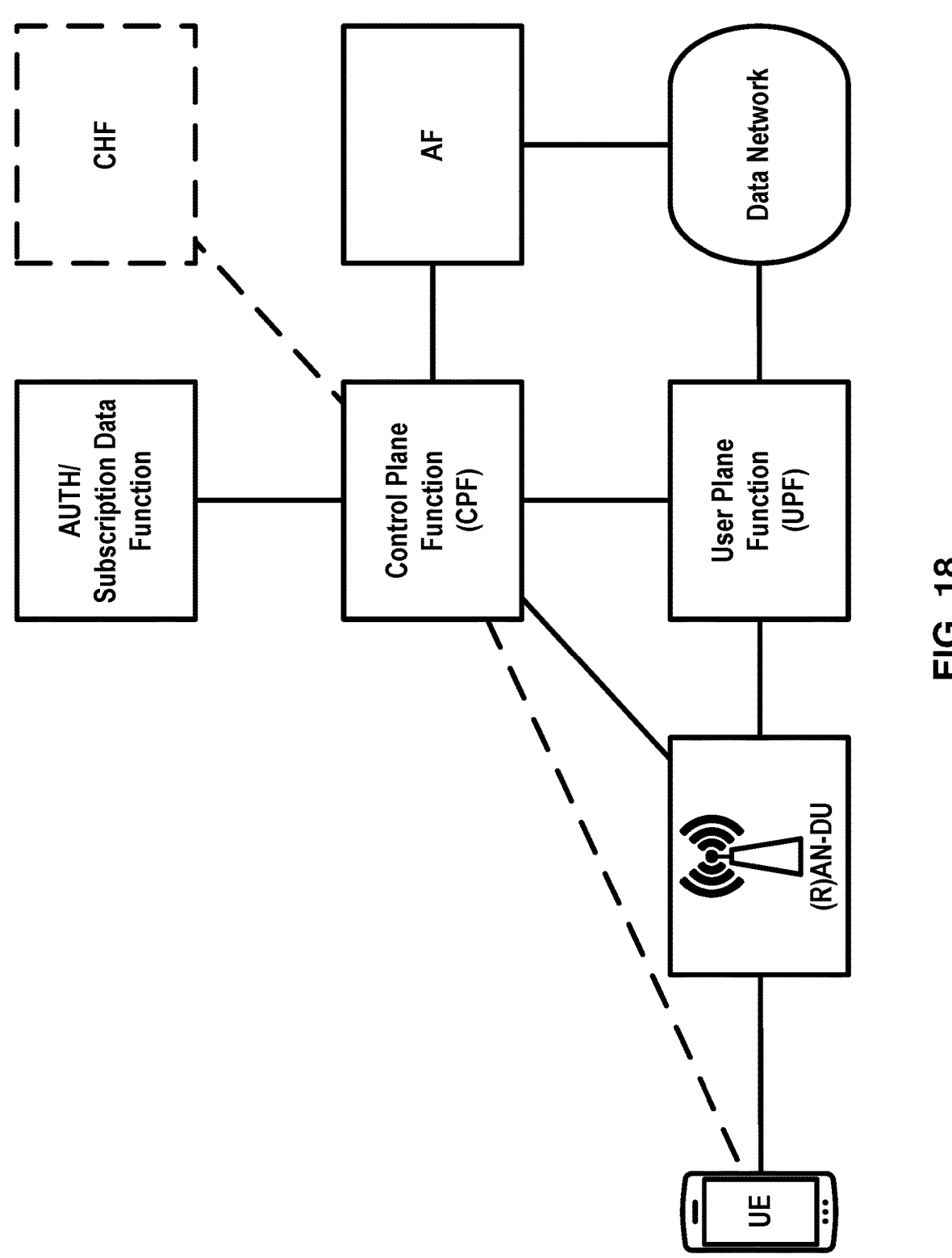
FIG. 18 illustrates an example communication network architecture as per an aspect of an embodiment of the present disclosure.

The architecture of FIG. 18 may be a communication system, for example, a 6G communication system. The example communication system may comprise a wireless device (e.g., a UE in the example of FIG. 18), a base station distributed unit of a (radio) access network (e.g., a (R)AN-DU in the example of FIG. 18), a user plane function (UPF), and/or a data network. In an example, the UPF may comprise a user plane of a base station central unit (CU-UP). For example, the CU-UP may comprise a SDAP layer/function and/or a PDCP layer/function.

The example communication system may comprise a control plane function (CPF), an authorization and/or subscription data function, a charging function (CHF), and/or an application function. In an example, the CPF may comprise a control plane of a base station central unit (CU-CP). For example, the CU-CP may comprise an RRC layer/function and/or a PDCP layer/function. In an example, the CPF may comprise an access and mobility management function. In an example, the CPF may comprise a session management function. In an example, the CPF may comprise a policy and charging control function. In an example, the CPF may comprise the CHF.

Figure 19:
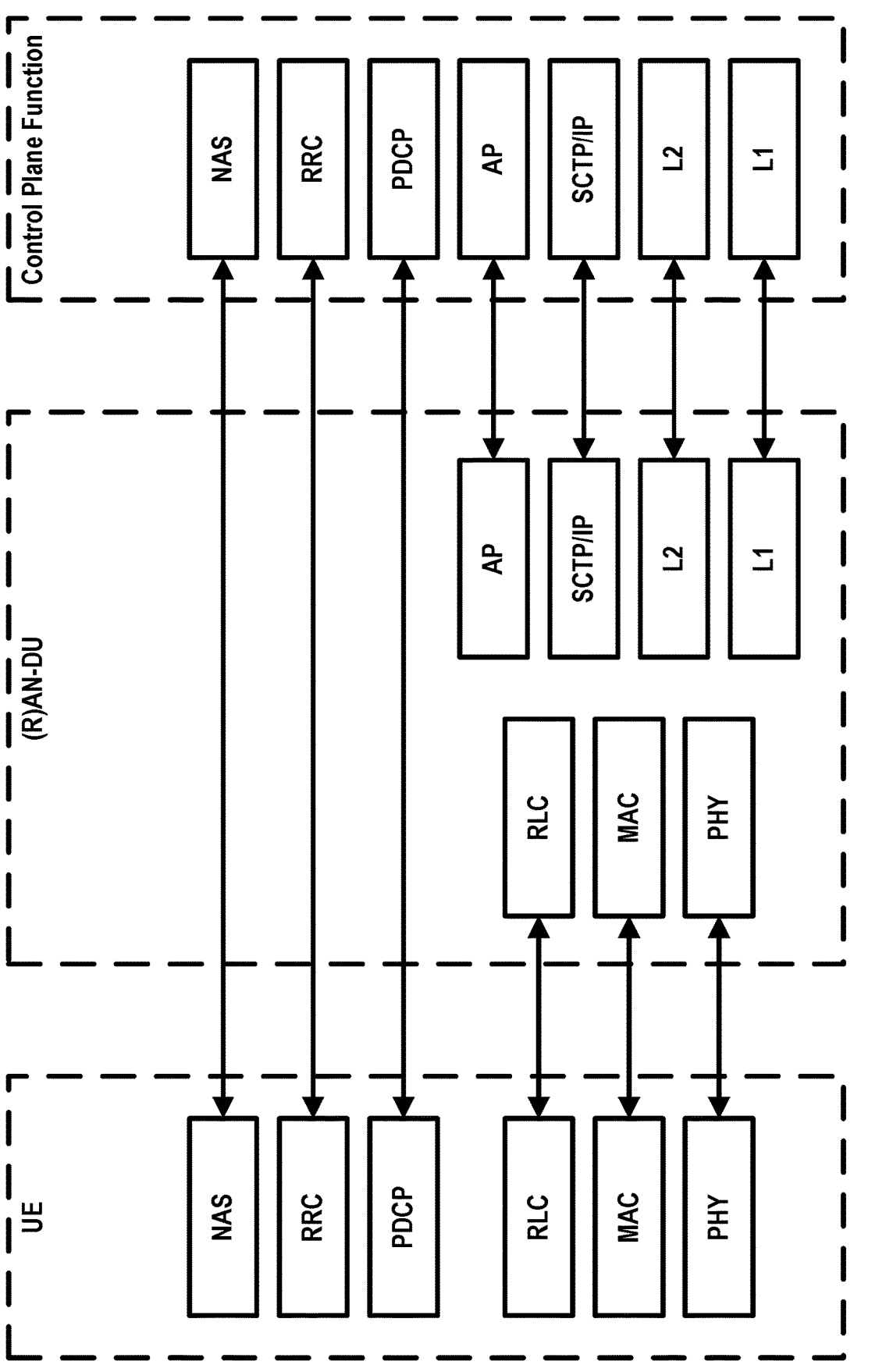
FIG. 19 depicts an example protocol stack for control plane as per an aspect of embodiments of the present disclosure.

FIG. 19 depicts an example protocol stack for control plane. In an example, a UE may comprise at least one (protocol) layer/function: PHY, MAC, RLC, PDCP, RRC, and/or NAS, where the PHY, MAC, and/or RLC (protocol) layer(s) may be used by the UE to communicate to a (R)AN-DU; where the PDCP, RRC, and/or NAS may be used by the UE to communicate to a CPF. In an example, a (R)AN-DU may comprise at least one protocol layer/function: PHY, MAC, and/or RLC, which may be used to communicate to the UE. In an example, a (R)AN-DU may comprise at least one protocol layer/function: AP, SCTP/IP, L2 and/or L1, which may be used to communicate to the CPF. In an example, the CPF may comprise at least one protocol layer/function: AP, SCTP/IP, L2 and/or L1, which may be used to communicate to the (R)AN-DU. In an example, the CPF may comprise at least one protocol layer/function: PDCP, RRC, and/or NAS, which may be used to communicate to the UE.

In an example, the MAC layer may comprise at least one functionality: Mapping between logical channels and transport channels; Multiplexing/demultiplexing of MAC SDUs belonging to one or different logical channels into/from transport blocks (TB) delivered to/from the physical layer on transport channels; Scheduling information reporting; Error correction through HARQ (one HARQ entity per cell in case of CA); Priority handling between UEs by means of dynamic scheduling; Priority handling between logical channels of one UE by means of logical channel prioritization; Priority handling between overlapping resources of one UE; and/or Padding.

In an example, the RLC layer may comprise at least one functionality: Transfer of upper layer PDUs; Sequence numbering independent of the one in PDCP (UM and AM); Error Correction through ARQ (AM only); Segmentation (AM and UM) and re-segmentation (AM only) of RLC SDUs;

Reassembly of SDU (AM and UM); Duplicate Detection (AM only); RLC SDU discard (AM and UM); RLC re-establishment; and/or Protocol error detection (AM only). In an example, the RLC layer may support three transmission modes: Transparent Mode (TM); Unacknowledged Mode (UM); and/or Acknowledged Mode (AM).

In an example, the RRC layer may comprise at least one functionality: Broadcast of System Information related to AS and NAS; Paging initiated by 5GC or NG-RAN; Establishment, maintenance and release of an RRC connection between the UE and NG-RAN; Security functions including key management; Establishment, configuration, maintenance and release of Signalling Radio Bearers (SRBs) and Data Radio Bearers (DRBs); Mobility functions; QoS management functions; UE measurement reporting and control of the reporting; Detection of and recovery from radio link failure; and/or NAS message transfer to/from NAS from/to UE. In an example, the Establishment, maintenance and release of an RRC connection between the UE and NG-RAN may comprise: Addition, modification and release of carrier aggregation; and/or Addition, modification and release of Dual Connectivity in NR or between E-UTRA and NR. In an example, the Mobility functions may comprise Handover and context transfer; UE cell selection and reselection and control of cell selection and reselection; and/or Inter-RAT mobility.

In an example, the PDCP layer may comprise at least one functionality: Transfer of data (user plane and/or control plane); Maintenance of PDCP SNs; Header compression and decompression using the ROHC protocol; Header compression and decompression using EHC protocol; Ciphering and deciphering; Integrity protection and integrity verification; Timer based SDU discard; For split bearers, routing; Duplication; Reordering and in-order delivery; Out-of-order delivery; and/or Duplicate discarding.

In an example, the SDAP layer may comprise at least one functionality: Mapping between a QoS flow and a data radio bearer; and/or Marking QoS flow ID (QFI) in both DL and UL packets. A single protocol entity of SDAP may be configured for each individual data session.

In an example, the NAS layer may comprise mobility management between the UE and the CPF. The mobility management may comprise management of handover procedures. In an example, the NAS layer may comprise session management between the UE and the CPF. The session management may comprise management of PDU session, data session, and/or the like.

Figure 20:
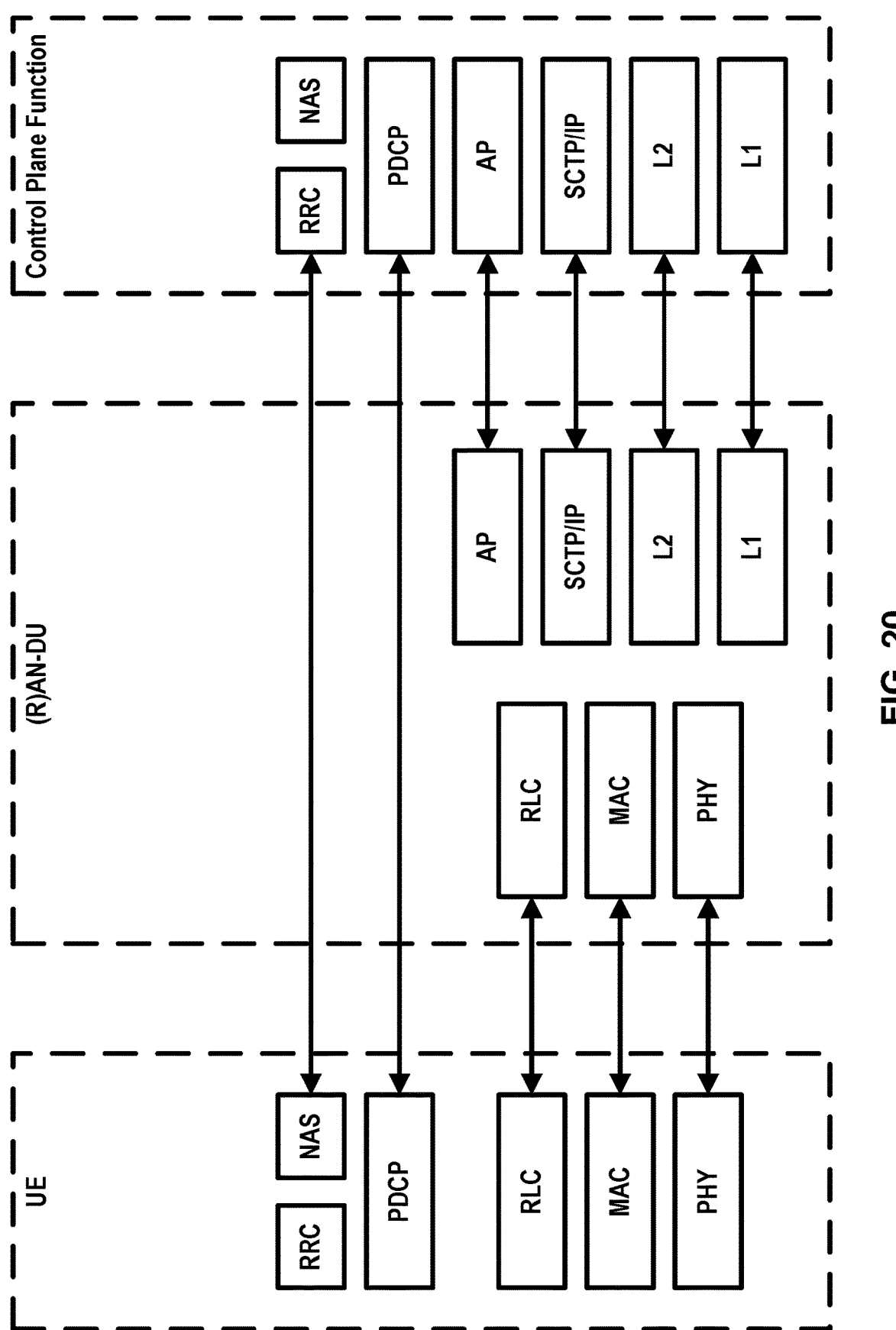
FIG. 20 depicts an example protocol stack for control plane as per an aspect of embodiments of the present disclosure.

FIG. 20 depicts an example protocol stack for control plane. In an example, a UE may comprise at least one protocol layer/function: PHY, MAC, RLC, PDCP, RRC, and/or NAS, where the PHY, MAC, and/or RLC protocol layer(s) may be used by the UE to communicate to a (R)AN-DU; where the PDCP, RRC, and/or NAS may be used by the UE to communicate to a CPF. In an example, the RRC and the NAS protocol layer of the UE may be located at the same protocol layer. In an example, a (R)AN-DU may comprise at least one protocol layer/function: PHY, MAC, and/or RLC, which may be used to communicate to the UE. In an example, a (R)AN-DU may comprise at least one protocol layer/function: AP, SCTP/IP, L2 and/or L1, which may be used to communicate to the CPF. In an example, the CPF may comprise at least one protocol layer/function: AP, SCTP/IP, L2 and/or L1, which may be used to communicate to the (R)AN-DU. In an example, the CPF may comprise at least one protocol layer/function: PDCP, RRC, and/or NAS, which may be used to communicate to the UE. In an example, the RRC and the NAS protocol layer of the CPF may be located at the same protocol layer.

Figure 21:
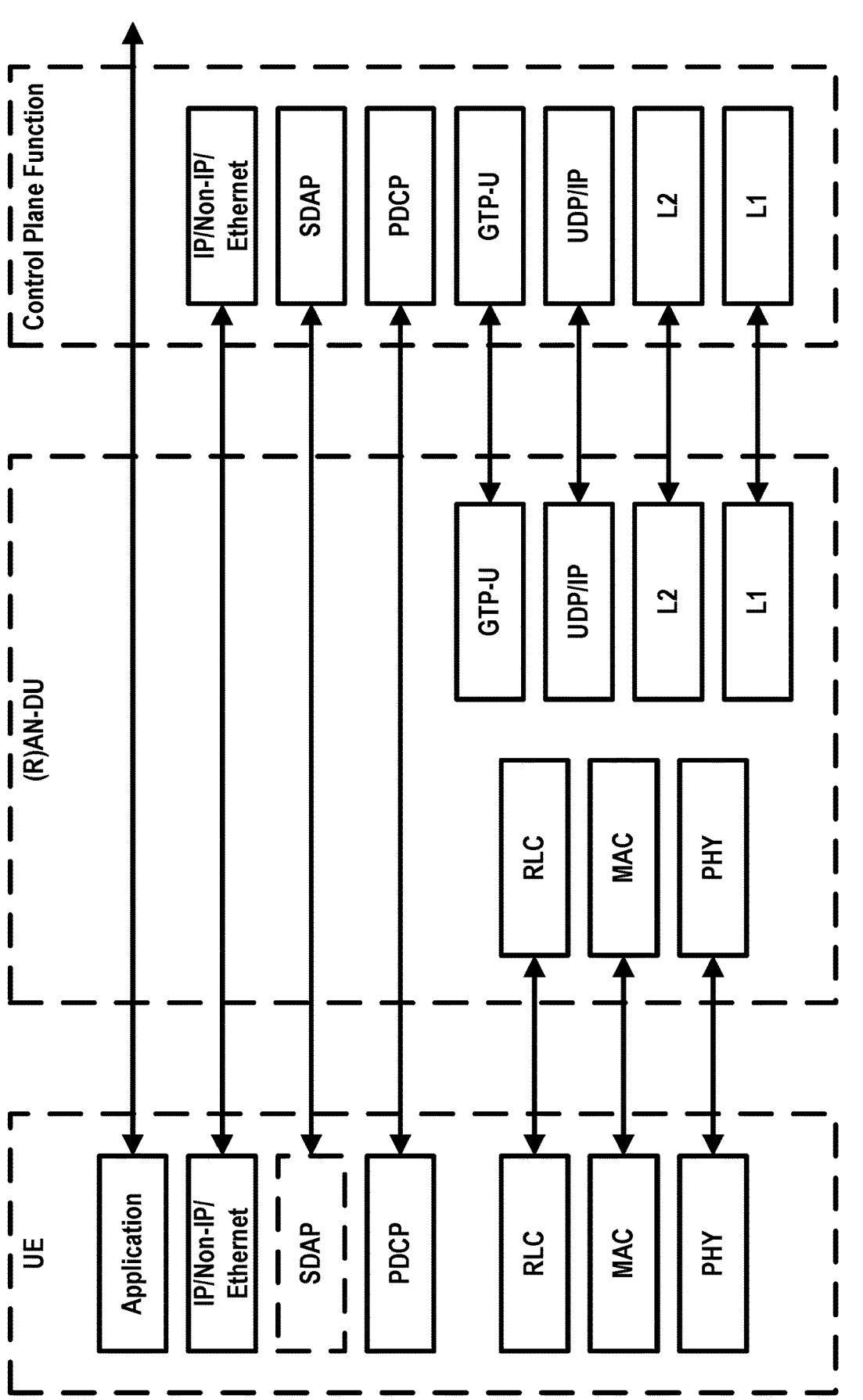
FIG. 21 depicts an example protocol stack for user plane as per an aspect of embodiments of the present disclosure.

FIG. 21 depicts an example protocol stack for user plane. In an example, a UE may comprise at least one protocol layer/function: PHY, MAC, RLC, PDCP, SDAP, IP/Non-IP/Ethernet, and/or Application, where the PHY, MAC, and/or RLC protocol layer(s) may be used by the UE to communicate to a (R)AN-DU; where the PDCP, SDAP, IP/Non-IP/Ethernet may be used by the UE to communicate to a UPF; where the Application layer may be used by the UE to communicate with an application server. In an example, a (R)AN-DU may comprise at least one protocol layer/function: PHY, MAC, and/or RLC, which may be used to communicate to the UE. In an example, a (R)AN-DU may comprise at least one protocol layer/function: GTP-U, UDP/IP, L2 and/or L1, which may be used to communicate to the UPF. In an example, the UPF may comprise at least one protocol layer/function: GTP-U, UDP/IP, L2 and/or L1, which may be used to communicate to the (R)AN-DU. In an example, the UPF may comprise at least one protocol layer/function: PDCP, SDAP, and/or IP/Non-IP/Ethernet, which may be used to communicate to the UE.

In existing technology, during a gateway (e.g. GGSN/PGW) relocation/handover, a session management function (e.g. SMF) relocation/handover, and/or a (anchor) user plane function relocation (e.g. UPF) relocation/handover, a new data session (e.g. IP Connectivity Access Network (IP-CAN) session, PDU session) may be established and a new UE IP address may be allocated accordingly. To communicate with the application server with the new UE IP address, the UE may need to establish a new application session with the application server, which may cause signaling and delay prior to starting the new service.

Example embodiments of the present disclosure may provide enhanced mechanisms to support efficient call flow/signaling for a relocation/handover of a CPF and/or a UPF. Example embodiments of the present disclosure may provide enhanced mechanisms to reuse UE IP address during the handover of the CPF and/or the UPF. According to various embodiments, a second control plane function (CPF) (e.g., a target CPF of the handover) may receive from a first CPF (e.g., a source CPF of the handover), a handover request indicating a handover of a data session for a wireless device. The handover request may comprise an IP address of the wireless device. For example, the IP address may be used by a first user plane function (UPF) (e.g., a source UPF of the handover). The handover request may comprise a parameter indicating to maintain, keep, and/or reuse the IP address of the wireless device. According to various embodiments, based on the parameter, the second CPF may determine to maintain, keep, and/or reuse the IP address in the second CPF (e.g., during and/or after the handover). According to various embodiments, the second CPF may send to a second UPF a user plane session request message. The user plane session request message may comprise the IP address for the data session.

The existing technology may not have efficient call flow/signaling to perform a handover for a wireless device. For example, during the handover, there may be lots of signaling among the UE, source base station (e.g. S-(R)AN-DU, S-(R)AN-CU-CP, S-(R)AN-CU-UP), target base station (e.g. T-(R)AN-DU, T-(R)AN-CU-CP, T-(R)AN-CU-UP), S-AMF, T-AMF, S-SMF, T-SMF, S-UPF and/or T-UPF. This may not meet the KPI requirement of 5G, 6G and/or a future communication system, and this may inhibit implementation of high reliability and/or low delay applications.

Example embodiments of the present disclosure may provide enhanced mechanisms to support efficient call flow/signaling for a relocation/handover of a CPF and/or a UPF. Example embodiments of the present disclosure may provide enhanced mechanisms to support a simplified architecture for a future communication system. According to various embodiments, an example communication system may comprise at least one of: a wireless device, (R)AN-DU, a CPF, a UPF, an AUTH/Subscription Data Function, and/or an AF, which may have less network functions compare to the existing technologies. Example embodiments of the present disclosure may provide enhanced mechanisms to support efficient call flow/signaling for the handover of the example communication system, which may have less call flow and signaling compare to the existing handover procedures.

The existing technology may use a tunnel for the data forwarding between a first base station and a second base station, between a first UPF and a second UPF. When the first base station and/or the first UPF receive downlink data packet, it may need add a tunnel header and send to the second base station and/or the second UPF respectively. The receiver of the tunnel (second base station and/or the second UPF) may need to remove the tunnel header and send the downlink data packet to UE later. This may have the problem that both the sender (e.g. first base station and/or the first UPF) and receiver of the tunnel may need process the tunnel header.

Example embodiments of the present disclosure may provide enhanced mechanisms to support data forwarding tunnel mechanism between a first UPF and a second UPF. Example embodiments of the present disclosure may provide enhanced mechanisms to enable data forwarding tunnel negotiation between the first UPF and the second UPF. According to various embodiments, a first CPF and/or a first UPF may indicate forwarding tunnel capability to a second CPF and/or a second UPF, the second CPF and/or the second UPF may indicate to the first CPF and/or the first UPF whether a forwarding tunnel is used or not between the first UPF and the second UPF. The enhanced mechanisms (e.g. no tunnel between the first UPF and the second UPF) may simplify the implementation of the first UPF and the second UPF. The enhanced mechanisms may decrease the data forwarding delay between the first UPF and the second UPF. This mechanism may also apply for the first base station and a second base station.

Figure 22:
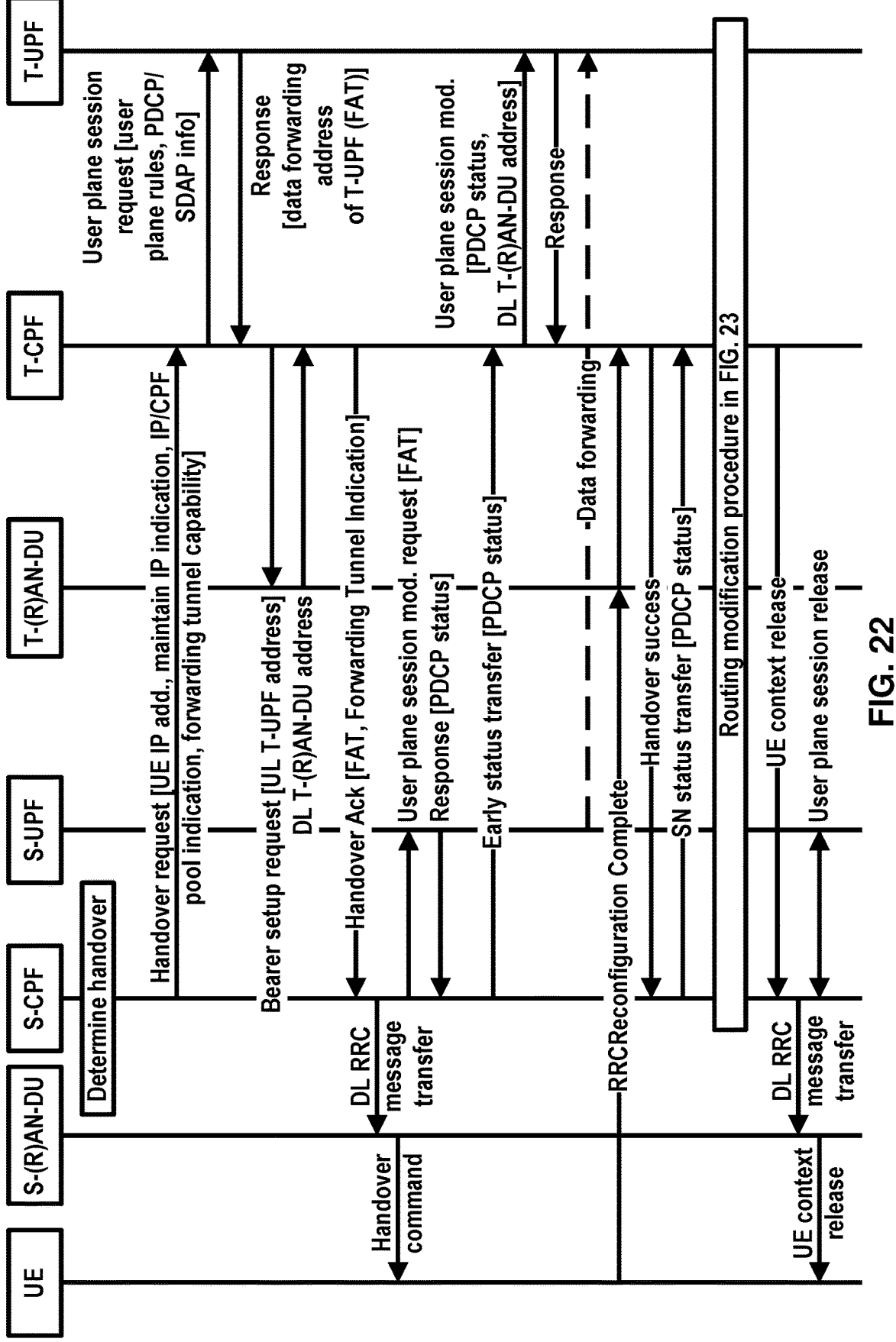
FIG. 22 is an example call flow as per an aspect of an embodiment of the present disclosure.

FIG. 22 is an example call flow which may comprise one or more actions. In an example, a UE may register/attach to a network (e.g. a source/first CPF (S-CPF)), the UE may request the CPF to establish a data session. In an example, the data session may be between the UE and a data network. In an example, the data session may be between the UE and a source/first UPF via a source/first (R)AN-DU (e.g. S-(R)AN-DU). In an example, the source/first UPF may be an anchor UPF (e.g. PDU Session Anchor (PSA) UPF). In an example, the source/first UPF may comprise a CU-DU of a base station. In an example, the data session may comprise at least one QoS flow. In an example, the data session may comprise at least one service data flow. In an example, the data session may comprise at least one bearer (e.g. data bearer, signaling bearer, and/or the like). In an example, the S-CPF may accept the request to establish a data session. The S-CPF may allocate an IP address for the UE/wireless device (e.g. IP address of the wireless device, UE IP address). In an example, the UE IP address may be used by the UE to communicate with the source/first UPF. In an example, the UE IP address may be used by the UE to communicate with an application server. In an example, the UE IP address may comprise an IPv4 address and/or an IPv6 address (prefix).

In an example, the S-CPF may receive a measurement report from the UE. The S-CPF may receive the measurement report via the S-(R)AN-DU. Based on the measurement report, the S-CPF may determine a handover to a target/second CPF (e.g. T-CPF). In an example, the S-CPF may comprise one or more functionalities, for example, the T-CPF may comprise AMF, SMF, PCF, NAS, and/or CU-CP of a base station, wherein the CU-CP comprises a RRC function and/or a PDCP function. In an example, the T-CPF may comprise one or more functionalities, for example, the T-CPF may comprise AMF, SMF, PCF, NAS, and/or CU-CP of a base station, wherein the CU-CP comprises a RRC function and/or a PDCP function.

In an example, a second/target CPF may receive from the source/first CPF, a handover request indicating a handover of the data session for the UE. In an example, the handover request may comprise an IP address of the wireless device, wherein the IP address is used by a first user plane function (UPF). In an example, the handover request may comprise a parameter indicating to maintain the IP address of the wireless device. For example, the S-CPF may send a handover request message to the T-CPF. In an example, the handover request message may comprise at least one of: the UE IP address, a maintain/keeping IP indication, an IP pool indication, an IP pool identifier, a CPF pool indication, a CPF pool identifier, a UPF pool indication, a UPF pool identifier, and/or a forwarding tunnel capability. The handover request message body depicted in FIG. 22 may comprise one or more of the information elements described herein, for example, one or more of the information elements depicted in FIG. 24, described in greater detail below.

For example, the maintain/keeping IP indication may indicate to the T-CPF to reuse, maintain, and/or keep the UE IP address during the handover and/or after the handover. For example, the IP pool indication and/or the IP pool identifier may indicate that the UE IP address may be in an IP pool and may be used by multiple CPFs (e.g. S-CPF and/or T-CPF) and/or UPFs (e.g. S-UPF and/or T-UPF), wherein the IP pool may be identified by the IP pool identifier. For example, the CPF pool indication and/or CPF pool identifier may indicate the UE IP address may be in a CPF pool and is used by multiple CPFs (e.g. S-CPF and/or T-CPF), wherein the CPF pool may be identified by the CPF pool identifier. For example, the UPF pool indication and/or UPF pool identifier may indicate the UE IP address may be in a UPF pool and is used by multiple UPFs (e.g. S-UPF and/or T-UPF), wherein the UPF pool may be identified by the UPF pool identifier. In an example, the forwarding tunnel capability may indicate whether the S-UPF supports a data forwarding tunnel between the S-UPF and a second/target UPF (e.g. T-UPF). In an example, the forwarding tunnel capability may indicate whether the S-UPF supports a direct data forwarding between the S-UPF and the T-UPF. For example, the direct data forwarding may indicate no tunnel is used between the S-UPF and the T-UPF.

In an example, the handover request message may comprise at least one parameter: target cell ID, KgNB*, C-RNTI of the UE in the S-CPF, RRM-configuration including UE inactive time, basic AS-configuration including antenna Info and DL Carrier Frequency, current QoS flow to DRB mapping rules applied to the UE, SIB1 of S-CPF, UE capabilities for different RATs, data session related information, UE reported measurement information including beam-related information if available, and/or dual active protocol stack (DAPS) Handover information (e.g. DAPS Handover indication). The data session related information may comprise network slice information and/or QoS flow level QoS profile(s). For example, the data session related information may comprise a data session identifier for the data session. The DAPS Handover information may indicate the S-CPF requests a DAPS Handover for at least one DRB.

In response to the message received from the S-CPF, the T-CPF may take one or more actions. In an example action, the T-CPF may perform admission control. For example, based on the network slice information received from the S-CPF and/or capability of the T-CPF, the T-CPF may determine whether to support network slice and/or the data session for the handover. In an example action, the T-CPF may determine a target/second UPF (e.g. T-UPF) for the handover. In an example, the target/second UPF may be an anchor UPF (e.g. PSA UPF). In an example, the target/second UPF may comprise a CU-DU of a base station.

In an example action, based on the handover request message, the T-CPF may determine to reuse the UE IP address in the T-CPF and/or T-UPF during the handover and/or after the handover. For example, based on the maintain/keeping IP indication, the T-CPF may determine to reuse the UE IP address in the T-CPF and/or T-UPF during the handover and/or after the handover. For example, based on the IP pool indication and/or the IP pool identifier, the T-CPF may determine to reuse the UE IP address in the T-CPF and/or T-UPF during the handover and/or after the handover. For example, based on the CPF pool indication and/or CPF pool identifier, the T-CPF may determine to reuse the UE IP address in the T-CPF and/or T-UPF during the handover and/or after the handover. For example, based on the UPF pool indication and/or UPF pool identifier, the T-CPF may determine to reuse the UE IP address in the T-CPF and/or T-UPF during the handover and/or after the handover.

In an example action, based on the handover request message, the T-CPF may determine at least one policy control rule for the data session. The at least one policy control rule may comprise at least one QoS control rule, at least one charging control rule, at least one gating control rule, at least one usage monitoring control rule, at least one application detection and control rule, at least one traffic steering control rule; and/or at least one service data flow detection information (e.g. service data flow template).

In an example action, based on the handover request message, the T-CPF may determine a user plane rule for the data session (e.g. during the handover and/or after the handover), the user plane rule may comprise the first IP address. In an example action, in response to the handover request message, the T-CPF may send a message (e.g. user plane session establishment request) to the T-UPF, wherein the user plane session establishment request message may comprise the user plane rule, PDCP configuration information and/or SDAP configuration information.

In an example, the PDCP configuration information may comprise at least one parameter: PDCP SN UL Size, PDCP SN DL Size, RLC mode, ROHC Parameters, UL Data Split Threshold, PDCP Duplication, PDCP Re-establishment, PDCP Data Recovery, Duplication Activation, Out Of Order Delivery, PDCP Status Report Indication, Additional PDCP duplication Information, EHC Parameters, and/or the like. In an example, the PDCP SN UL Size may indicate PDCP sequence number size (e.g. in bits) for uplink. The PDCP SN DL Size may indicate PDCP sequence number size (e.g. in bits) for downlink. The RLC mode may indicate the RLC mode for the DRB, for example, Acknowledged Mode (AM), Unacknowledged Mode (UM) and/or Transparent Mode (TM). The ROHC Parameters may indicate ROHC parameters for header compression. The UL Data Split Threshold may indicate the uplink data split threshold (e.g. in bytes). The PDCP Duplication may indicates whether PDCP duplication is to be configured for the DRB. The PDCP Re-establishment may indicate PDCP entity re-establishment to be triggered. The PDCP Data Recovery may indicate PDCP data recovery to be triggered. The Duplication Activation may comprise information on the initial state of DL PDCP duplication. Out Of Order Delivery may indicate whether or not outOfOrderDelivery specified is configured. Out of order delivery may be configured only when the radio bearer is established. The PDCP Status Report Indication may indicate PDCP Status Report. For example, For Acknowledged Mode DRB, "downlink" indicates that the PDCP entity is configured to send PDCP status report(s) to the UE, and "uplink" indicates that the UE is configured to send PDCP status report(s). The Additional PDCP duplication Information may indicate number of PDCP duplication configured when it is more than 2 for the DRB. The EHC Parameters may indicate Ethernet Header Compression parameters.

In an example, the SDAP configuration information may comprise at least one parameter: Default DRB, SDAP Header UL, and/or SDAP Header DL. The Default DRB may indicate whether or not this is the default DRB for PDU Session Resource. The SDAP Header UL may indicates whether or not a SDAP header is present for uplink data on this DRB. The SDAP Header DL may indicate whether or not a SDAP header is present for DL data on this DRB.

In an example, the user plane rule may comprise at least one of: at least one packet detection rule; at least one forwarding action rule; at least one QoS enforcement rule; and/or at least one usage reporting rule. In an example, the at least one packet detection rule may comprise data/traffic packet detection information, e.g. one or more match fields against which incoming packets are matched and may apply other user plane rules (e.g. the at least one forwarding action rule, the at least one QoS enforcement rule, and/or the at least one usage reporting rule) to the data/traffic packets matching the packet detection rule. In an example, the at least one forwarding action rule may comprise an apply action parameter, which may indicate whether a second network function (e.g. user plane function) forwards, duplicates, drops or buffers the data/traffic packet respectively. In an example, the at least one usage reporting rule may be used to measure the network resources usage in terms of traffic data volume, duration (i.e. time) and/or events, according to a measurement method in the at least one usage reporting rule. In an example, the at least one QoS enforcement rule may contain instructions to request the user plane function to perform QoS enforcement of the user plane traffic. In an example, the T-CPF may determine the at least one packet detection rule based on the at least one service data flow detection information (e.g. service data flow template, flow information). In an example, the T-CPF may determine the at least one forwarding action rule based on the at least one policy control rule and/or the at least one usage monitoring control rule. In an example, the T-CPF may determine the at least one QoS enforcement rule based on the at least one policy control rule (e.g. the at least one QoS control rule). In an example, the T-CPF may determine the at least one usage reporting rule based on the at least one usage monitoring control rule and/or the quota. In an example, the T-CPF may determine that the data session is between the UE and the T-UPF during the handover and after the handover.

In response to the message received from the T-CPF, the T-UPF may take one or more actions. In an example action, the T-UPF may determine to use the same UE IP address as the S-UPF based on the user plane rule. In an example action, the T-UPF may determine that the data session is between the UE and the T-UPF during the handover and after the handover. In an example action, in response to the message received from the T-CPF, the T-UPF may send a response message (e.g. user plane session establishment response) to the T-CPF, wherein the user plane session establishment response message may comprise a data forwarding address of the T-UPF and/or an uplink T-UPF user plane tunnel address.

In response to the message received from the T-UPF, and/or in response to the message received from the S-CPF, the T-CPF may send a message (e.g. SESSION SETUP REQUEST, BEARER SETUP REQUEST, FLOW SETUP REQUEST, UE CONTEXT SETUP REQUEST) to the T-(R)AN-DU to establish session/bearer/flow and/or UE context in the (R)AN-DU for the data session of the UE. In an example, the SESSION SETUP REQUEST/BEARER SETUP REQUEST/FLOW SETUP REQUEST/UE CONTEXT SETUP REQUEST message may comprise the uplink T-UPF user plane tunnel address.

In an example, the SESSION SETUP REQUEST/BEARER SETUP REQUEST/FLOW SETUP REQUEST/UE CONTEXT SETUP REQUEST message may comprise at least one parameter: the CP UE AP ID, the (R)AN-DU UE AP ID, a SpCell ID (e.g. special cell ID), a Candidate SpCell List, a ServCellIndex, CPF to DU RRC Information, a SCell To Be Setup List, a SRB to Be Setup List, a DRB to Be Setup List, RAT-Frequency Priority Information, Masked IMEISV, Serving PLMN, (R)AN-DU UE Aggregate Maximum Bit Rate Uplink, RRC Delivery Status Request, BH RLC Channel to be Setup List, SL DRB to Be Setup List, Conditional Inter-DU Mobility Information, and/or the like. The DRB to Be Setup List may indicate list of data radio bearers to be setup. The DRB to Be Setup List may comprise at least one of parameter: DRB ID, CHOICE QoS Information/DRB Information, a UL UP TNL Information to be setup List and/or an Additional PDCP Duplication TNL List. For example, the CHOICE QoS Information/DRB Information may comprise at least one parameter: DRB QoS, S-NSSAI, and/or Flows Mapped to DRB Item. The Flows Mapped to DRB Item may comprise QoS Flow Identifier, QoS Flow Level QoS Parameters, QoS Flow Mapping Indication, and/or TSC Traffic Characteristics. In an example, the QoS Flow Level QoS Parameters may indicate the QoS to be applied to a QoS flow, to a DRB or to a BH RLC channel. In an example, the QoS Flow Mapping Indication may indicate only the uplink or downlink QoS flow is mapped to the DRB. In an example, the TSC Traffic Characteristics may indicate traffic pattern information associated with a QFI.

In an example action, the T-(R)AN-DU may send a response message (e.g. SESSION SETUP RESPONSE/BEARER SETUP RESPONSE/FLOW SETUP RESPONSE/UE CONTEXT SETUP RESPONSE) to the T-CPF. The SESSION SETUP RESPONSE/BEARER SETUP RESPONSE/FLOW SETUP RESPONSE/UE CONTEXT SETUP RESPONSE may be used by the T-(R)AN-DU to confirm the setup of session(s)/bearer(s)/flow(s) and/or a UE context. The SESSION SETUP RESPONSE/BEARER SETUP RESPONSE/FLOW SETUP RESPONSE/UE CONTEXT SETUP RESPONSE may comprise at least one of: the CP UE AP ID, the (R)AN-DU UE AP ID, the C-RNTI, a DRB Setup List, a SRB Setup List, a BH RLC Channel Setup List, a SL DRB Setup List, a DRB Failed to Setup List, a SRB Failed to Setup List, a SCell Failed To Setup List, a BH RLC Channel Failed to be Setup List, a SL DRB Failed To Setup List, Requested Target Cell ID, and/or the like. In an example, the SESSION SETUP RESPONSE/BEARER SETUP RESPONSE/FLOW SETUP RESPONSE/UE CONTEXT SETUP RESPONSE message may comprise DL T-(R)AN-DU address of user plane tunnel, wherein the DL T-(R)AN-DU address of user plane tunnel may indicate a downlink T-(R)AN-DU address of a user plane tunnel.

In an example action, based on the forwarding tunnel capability received from the S-CPF, the T-CPF and/or T-UPF may determine a forwarding tunnel indication. In an example, the forwarding tunnel indication may indicate to use a data forwarding tunnel between the S-UPF and T-UPF. In an example, the forwarding tunnel indication may indicate to use a direct data forwarding (e.g. no tunnel is used) between the S-UPF and the T-UPF.

In response to the message received from the T-(R)AN-DU, and/or in response to the message received from the S-CPF, the T-CPF may send a response message (e.g. handover acknowledgement) to the S-CPF. In an example, the handover acknowledgement may comprise the forwarding tunnel indication. In an example, the handover acknowledgement may comprise the data forwarding address of the T-UPF and/or the uplink T-UPF user plane tunnel address. In an example, the handover acknowledgement may comprise a parameter indicating whether the DAPS Handover is accepted or not.

In an example, the S-CPF may send a handover message to the UE, the handover message may comprise the UE IP address and/or the maintain/keeping IP indication. The maintain/keeping IP indication may indicate the UE to reuse the same UE IP address during the handover and/or after the handover. For example, the S-CPF may send the handover message to the UE via the S-(R)AN-DU. For example, in response to the message received from the T-CPF, the S-CPF may take one or more actions. In an example action, the S-CPF may send a message (e.g. DL RRC MESSAGE TRANSFER) to the S-(R)AN-DU. The DL RRC MESSAGE TRANSFER may comprise a RRC message and/or a NAS message sending to the UE. In an example, the RRC message and/or a NAS message may be a handover message. In an example, the NAS message may comprise the UE IP address and/or the maintain/keeping IP indication. In an example, the RRC message may be an RRCReconfiguration message. For example, the RRCReconfiguration message may comprise at least one parameter required to access the target cell: at least the target cell ID, the new C-RNTI, the target gNB security algorithm identifiers for the selected security algorithms, a set of dedicated RACH resources, association between RACH resources and SSB(s), association between RACH resources and UE-specific CSI-RS configuration(s), common RACH resources, system information of the target cell, and/or the like.

In an example action, the S-CPF may send a message (e.g. user plane session modification request, bearer modification request, flow modification request) to the S-UPF. The user plane session modification request message may comprise at least one of: UE identity, the data forwarding address of the T-UPF, the uplink T-UPF user plane tunnel address, the forwarding tunnel indication, and/or PDCP status query indication. The forwarding tunnel indication may indicate to the S-UPF to use a data forwarding tunnel and/or a direct data forwarding (e.g. no tunnel is used) between the S-UPF and the T-UPF. The PDCP status query indication may be used by the S-CPF to query/request the PDCP status in the S-UPF, wherein the PDCP status is associated with the UE. In response to the message received, the S-UPF may send a response message (e.g. user plane session modification response, bearer modification response, flow modification response). The user plane session modification response message may comprise PDCP status information. For example, the PDCP status information may comprise uplink and/or downlink PDCP status for the UE.

In an example, in response to the message received from the S-UPF, the S-CPF may send a message (e.g. EARLY STATUS TRANSFER, SN STATUS TRANSFER) to the T-CPF, wherein the EARLY STATUS TRANSFER/SN STATUS TRANSFER may comprise the PDCP status information. In an example, if DRBs configured with DAPS, the S-CPF may send an EARLY STATUS TRANSFER message to the T-CPF. The EARLY STATUS TRANSFER message may comprise a DL COUNT value, the DL COUNT value may indicate PDCP SN and HFN of the first PDCP SDU that the S-UPF forwards to the T-UPF. In an example, for DRBs not configured with DAPS, the S-CPF may send an SN STATUS TRANSFER message to the T-CPF to convey the uplink PDCP SN receiver status and the downlink PDCP SN transmitter status of DRBs for which PDCP status preservation applies (e.g. for RLC AM). The uplink PDCP SN receiver status may comprise at least the PDCP SN of the first missing UL PDCP SDU and may comprise a bit map of the receive status of the out of sequence UL PDCP SDUs that the UE needs to retransmit in the target cell, if any. The downlink PDCP SN transmitter status may indicate the next PDCP SN that the T-UPF may assign to new PDCP SDUs, not having a PDCP SN yet.

In response to the message received from the S-CPF, the T-CPF may send a message (e.g. user plane session modification request, bearer modification request, flow modification request) to the T-UPF comprising the PDCP status information. For example, the T-CPF may send a user plane session modification request message to the T-UPF, the user plane session modification message may comprise the PDCP status information. For example, the user plane session modification message may comprise the DL T-(R)AN-DU address of user plane tunnel. For example, the user plane session modification message may comprise user plane rules. In response to the message received from the T-CPF, the T-UPF may send a user plane session modification response message to the T-CPF.

In an example, the S-UPF may receive downlink data packet towards to the UE, the S-UPF may forward the downlink data packet to the T-UPF based on the data forwarding address of the T-UPF, the uplink T-UPF user plane tunnel address, and/or the forwarding tunnel indication. For example, based on the forwarding tunnel indication, the S-UPF may forward the downlink data packet to the T-UPF using a direct data forwarding (e.g. no tunnel is used). For example, based on the forwarding tunnel indication, the S-UPF may forward the downlink data packet to the T-UPF using a data forwarding tunnel.

In an example, the UE may synchronise to target cell and completes the RRC handover procedure by sending RRCReconfigurationComplete message to T-CPF. For example, the UE may send the RRCReconfigurationComplete message to T-CPF via the T-(R)AN-DU. For example, in response to the message received from the UE, the T-(R)AN-DU may send a UL RRC MESSAGE TRANSFER message to the T-CPF, the UL RRC MESSAGE TRANSFER message may comprise the RRCReconfigurationComplete message. In an example, in case of DAPS handover, the UE may not detach from the source cell upon receiving the RRCReconfiguration message. The UE may release the source SRB resources, security configuration of the source cell and stops DL/UL reception/transmission with the source upon receiving an explicit release from the T-CPF.

In an example, in response to the message received from the UE, the T-CPF may send a message (e.g. HANDOVER SUCCESS) to the S-CPF indicating that the UE has successfully accessed to the target cell. In an example, in response to the message received from the T-CPF, in case of DAPS Handover or Conditional Handover, the S-CPF may take one or more actions. In an example action, the S-CPF may send a message (e.g. UE Context Modification) to the UE indicating to stop the data transmission for the UE. In an example action, the S-CPF may send a message (e.g. user plane session modification request, bearer modification request, flow modification request) to the S-UPF indicating the S-UPF to stop packet delivery and also to retrieve the PDCP UL/DL status. The S-UPF may send the PDCP status information to the S-CPF. In an example, the S-CPF may send a message (e.g. SN STATUS TRANSFER) to the T-CPF, the SN STATUS TRANSFER message may comprise the PDCP status information. In response to the message received from the S-CPF, the T-CPF may send a message (e.g. user plane session modification request, bearer modification request, flow modification request) to the T-UPF comprising the PDCP status information.

In an example, the T-CPF may send a message (e.g. UE context release) to the S-CPF to release the resource (e.g. session resource, bearer resource, flow resource) of S-CPF for the UE. In an example, the UE context release message may indicate releasing resource of S-(R)AN-DU for the UE. In an example, the UE context release message may indicate releasing UE context information in the S-CPF and/or S-(R)AN-DU.

In response to the message received from the T-CPF, the S-CPF may take one or more actions. In an example action, the S-CPF may send a message (e.g. UE context release) to the UE. The UE context release message may indicate releasing UE context between the UE and the S-CPF and/or S-(R)AN-DU. In an example, the S-CPF may send the UE context release message via the S-(R)AN-DU. For example, the S-CPF may send a DL RRC MESSAGE TRANSFER message to the S-(R)AN-DU, the DL RRC MESSAGE TRANSFER message may comprise the UE context release message. The S-(R)AN-DU may send the UE context release message to the UE in response to receive the message from the S-CPF. In an example action, the S-CPF may send a message (e.g. user plane session release) to the S-UPF. The user plane session release message may indicate releasing session/bearer/flow resource of the UE in S-UPF.

Figure 23:
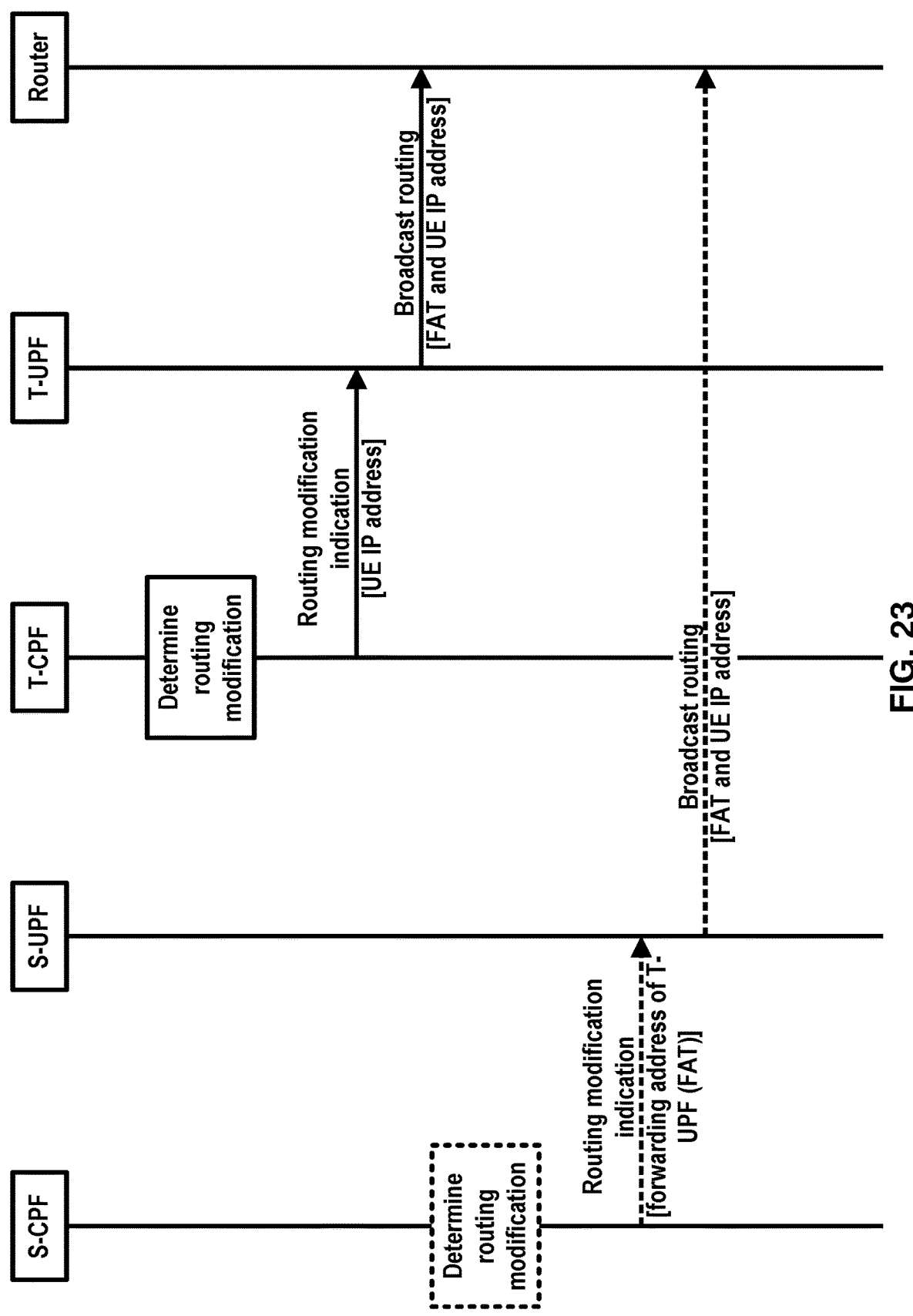
FIG. 23 is an example call flow as per an aspect of an embodiment of the present disclosure.

In an example, there may be routing modification procedure during the handover and/or after the handover. The routing modification procedure may be shown in FIG. 23. FIG. 23 is an example call flow which may comprise one or more actions. In an example, the T-CPF may determine to modify a routing, wherein the routing may be used by the T-UPF to receive downlink data packet from a router. For example, in response to receive the RRCReconfigurationComplete message from the UE, the T-CPF may determine to modify a routing for the T-UPF and/or the UE, and the routing may be used by the T-UPF to receive downlink data packet towards the UE from a router. For example, the router may send the downlink data packet to the S-UPF before the handover, wherein the downlink data packet may be sent by an application server to the UE. During the handover and/or after the handover, the T-CPF and/or T-UPF may indicate the router to change the routing for the UE, for example, the T-CPF and/or T-UPF may indicate the router to forward the downlink data packet to the T-UPF (rather than the S-UPF).

In an example, the T-CPF may send a message (e.g. user plane session modification request) to the T-UPF, the user plane session modification request message may comprise a routing modification indication and/or the UE IP address. The routing modification indication may indicate modifying the routing of the downlink data packet towards the UE.

In response to the message received from the T-CPF, the T-UPF may send a response to the T-CPF confirm the routing modification. In an example, the T-UPF may send a message to the router comprising the routing information, wherein the routing information may comprise a destination address and/or next hop address. For example, the T-UPF may set the destination address of the routing information to the UE IP address. For example, the T-UPF may set the next hop address of the routing information to an address of the T-UPF. For example, the T-UPF may send/broadcast the routing information to the router. For example, the T-UPF may use one or more routing protocols to send/broadcast the routing information to the router. The one or more routing protocols may comprise: a Routing Information Protocol (RIP), an Interior Gateway Protocol (IGRP), an Open Shortest Path First (OSPF), an Exterior Gateway Protocol (EGP), an Enhanced Interior Gateway Routing Protocol (EIGRP), a Border Gateway Protocol (BGP), and/or an Intermediate System-to-Intermediate System (IS-IS) Protocol.

In an example, the S-CPF may determine to modify a routing, wherein the routing may be used by the T-UPF to receive downlink data packet from a router. For example, in response to receive the HANDOVER SUCCESS message from the T-CPF, the S-CPF may determine to modify a routing for the T-UPF and/or the UE, and the routing may be used by the T-UPF to receive downlink data packet towards the UE from a router. For example, the router may send the downlink data packet to the S-UPF before the handover, wherein the downlink data packet may be sent by an application server to the UE. During the handover and/or after the handover, the S-CPF and/or S-UPF may indicate the router to change the routing for the UE, for example, the S-CPF and/or S-UPF may indicate the router to forward the downlink data packet to the T-UPF (rather than the S-UPF).

In an example, the S-CPF may send a message (e.g. user plane session modification request) to the S-UPF, the user plane session modification request message may comprise a routing modification indication, the UE IP address and/or an address of the T-UPF (e.g. forwarding address of the T-UPF). The routing modification indication may indicate modifying the routing of the downlink data packet towards the UE.

In response to the message received from the S-CPF, the S-UPF may send a response to the S-CPF confirm the routing modification. In an example, the S-UPF may send a message to the router comprising the routing information, wherein the routing information may comprise a destination address and/or next hop address. For example, the S-UPF may set the destination address of the routing information to the UE IP address. For example, the S-UPF may set the next hop address of the routing information to the address of the T-UPF. For example, the S-UPF may send/broadcast the routing information to the router. For example, the S-UPF may use one or more routing protocols to send/broadcast the routing information to the router. The one or more routing protocols may comprise: a Routing Information Protocol (RIP), an Interior Gateway Protocol (IGRP), an Open Shortest Path First (OSPF), an Exterior Gateway Protocol (EGP), an Enhanced Interior Gateway Routing Protocol (EIGRP), a Border Gateway Protocol (BGP), and/or an Intermediate System-to-Intermediate System (IS-IS) Protocol.

FIG. 24 is an example diagram depicting a handover request message body as per an aspect of an embodiment of the present disclosure. The handover request message disclosed herein may include one or more of the information elements depicted in FIG. 24, including for example, maintaining/keeping UE IP information. The maintaining/keeping UE IP information may comprise one or more of a UE IP address, a maintain/keep IP indication, an IP pool indication, an IP pool identifier, a CPF pool indication, a CPF pool identifier, a UPF pool indication, and a UPF pool identifier.

FIG. 25 is an example diagram depicting the procedures of a second/target CPF as per an aspect of an embodiment of the present disclosure.

FIG. 26 is an example diagram depicting the procedures of a second/target UPF as per an aspect of an embodiment of the present disclosure.

Figure 27:
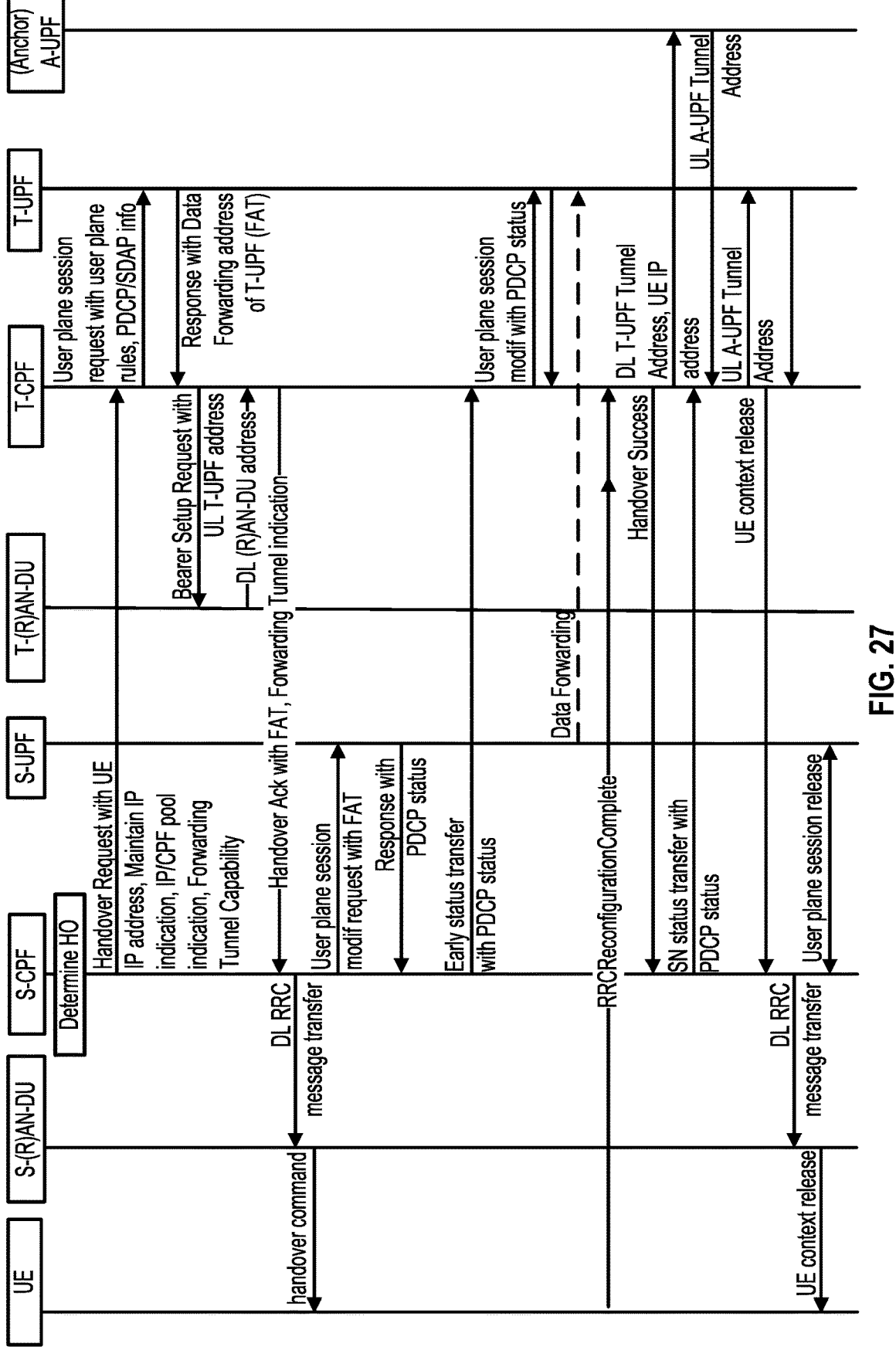
FIG. 27 is an example call flow as per an aspect of an embodiment of the present disclosure.

FIG. 27 is an example call flow which may comprise one or more actions. In an example, a UE may register/attach to a network (e.g. a source/first CPF (S-CPF)), the UE may request the CPF to establish a data session. In an example, the data session may be between the UE and a data network. In an example, the data session may be between the UE and a source/first UPF (e.g. S-UPF) via a source/first (R)AN-DU (e.g. S-(R)AN-DU). In an example, the data session may be between the UE and an anchor UPF (e.g. PDU Session Anchor (PSA) UPF, shown as A-UPF in FIG. 27) via the S-UPF. In an example, the source/first UPF may comprise a CU-DU of a base station. In an example, the data session may comprise at least one QoS flow. In an example, the data session may comprise at least one service data flow. In an example, the data session may comprise at least one bearer (e.g. data bearer, signaling bearer, and/or the like). In an example, the S-CPF may accept the request to establish a data session. The S-CPF may allocate an IP address for the UE/wireless device (e.g. IP address of the wireless device, UE IP address). In an example, the UE IP address may be used by the UE to communicate with the source/first UPF. In an example, the UE IP address may be used by the UE to communicate with an application server. In an example, the UE IP address may comprise an IPv4 address and/or an IPv6 address (prefix). In an example, there may be a tunnel between the S-UPF and the A-UPF for the uplink and/or downlink data packet, wherein the uplink data packet may be sent by the UE to an application server and the downlink data packet may be sent by the application server to the UE. For example, when the A-UPF receive a downlink data packet from the application server and/or a router, the A-UPF may send the downlink data packet to the S-UPF, and the S-UPF may send the downlink data packet to the UE via the S-(R)AN-DU. For example, when the S-UPF receive an uplink data packet from the UE/S-(R)AN-DU, the S-UPF may send the uplink data packet to the A-UPF, and the A-UPF may send the uplink data packet to the application server and/or the router.

In an example, the S-CPF may receive a measurement report from the UE. The S-CPF may receive the measurement report via the S-(R)AN-DU. Based on the measurement report, the S-CPF may determine a handover to a target/second CPF (e.g. T-CPF). In an example, the S-CPF may comprise one or more functionalities, for example, the T-CPF may comprise AMF, SMF, PCF, NAS, and/or CU-CP of a base station, wherein the CU-CP comprises a RRC function and/or a PDCP function. In an example, the T-CPF may comprise one or more functionalities, for example, the T-CPF may comprise AMF, SMF, PCF, NAS, and/or CU-CP of a base station, wherein the CU-CP comprises a RRC function and/or a PDCP function.

In an example, a second/target CPF may receive from the source/first CPF, a handover request indicating a handover of the data session for the UE. In an example, the handover request may comprise an IP address of the wireless device, wherein the IP address is used by a first user plane function (UPF). In an example, the handover request may comprise a parameter indicating to maintain the IP address of the wireless device. For example, the S-CPF may send a handover request message to the T-CPF. In an example, the handover request message may comprise at least one of: the UE IP address, a maintain/keeping IP indication, an IP pool indication, an IP pool identifier, a CPF pool indication, a CPF pool identifier, a UPF pool indication, a UPF pool identifier, and/or a forwarding tunnel capability.

For example, the maintain/keeping IP indication may indicate the T-CPF to reuse the UE IP address during the handover and/or after the handover. For example, the IP pool indication and/or the IP pool identifier may indicate that the UE IP address may be in an IP pool and may be used by multiple CPFs (e.g. S-CPF and/or T-CPF) and/or UPFs (e.g. S-UPF and/or T-UPF), wherein the IP pool may be identified by the IP pool identifier. For example, the CPF pool indication and/or CPF pool identifier may indicate the UE IP address may be in a CPF pool and is used by multiple CPFs (e.g. S-CPF and/or T-CPF), wherein the CPF pool may be identified by the CPF pool identifier. For example, the UPF pool indication and/or UPF pool identifier may indicate the UE IP address may be in a UPF pool and is used by multiple UPFs (e.g. A-UPF, S-UPF and/or T-UPF), wherein the UPF pool may be identified by the UPF pool identifier. In an example, the forwarding tunnel capability may indicate whether the S-UPF supports a data forwarding tunnel between the S-UPF and a second/target UPF (e.g. T-UPF). In an example, the forwarding tunnel capability may indicate whether the S-UPF supports a direct data forwarding between the S-UPF and the T-UPF. For example, the direct data forwarding may indicate no tunnel is used between the S-UPF and the T-UPF.

In an example, the handover request message may comprise at least one parameter: target cell ID, KgNB*, C-RNTI of the UE in the S-CPF, RRM-configuration including UE inactive time, basic AS-configuration including antenna Info and DL Carrier Frequency, current QoS flow to DRB mapping rules applied to the UE, SIB1 of S-CPF, UE capabilities for different RATs, data session related information, UE reported measurement information including beam-related information if available, and/or dual active protocol stack (DAPS) Handover information (e.g. DAPS Handover indication). The data session related information may comprise network slice information and/or QoS flow level QoS profile (s). For example, the data session related information may comprise a data session identifier for the data session. The DAPS Handover information may indicate the S-CPF requests a DAPS Handover for at least one DRB.

In response to the message received from the S-CPF, the T-CPF may take one or more actions. In an example action, the T-CPF may perform admission control. For example, based on the network slice information received from the S-CPF and/or capability of the T-CPF, the T-CPF may determine whether to support network slice and/or the data session for the handover. In an example action, the T-CPF may determine a target/second UPF (e.g. T-UPF) for the handover. In an example, the target/second UPF may comprise a CU-DU of a base station.

In an example action, based on the handover request message, the T-CPF may determine to reuse the UE IP address in the T-CPF, T-UPF and/or A-UPF during the handover and/or after the handover. For example, based on the maintain/keeping IP indication, the T-CPF may determine to reuse the UE IP address in the T-CPF, T-UPF and/or A-UPF during the handover and/or after the handover. For example, based on the IP pool indication and/or the IP pool identifier, the T-CPF may determine to reuse the UE IP address in the T-CPF, T-UPF and/or A-UPF during the handover and/or after the handover. For example, based on the CPF pool indication and/or CPF pool identifier, the T-CPF may determine to reuse the UE IP address in the T-CPF, T-UPF and/or A-UPF during the handover and/or after the handover. For example, based on the UPF pool indication and/or UPF pool identifier, the T-CPF may determine to reuse the UE IP address in the T-CPF, T-UPF and/or A-UPF during the handover and/or after the handover.

In an example action, based on the handover request message, the T-CPF may determine at least one policy control rule for the data session. The at least one policy control rule may comprise at least one QoS control rule, at least one charging control rule, at least one gating control rule, at least one usage monitoring control rule, at least one application detection and control rule, at least one traffic steering control rule; and/or at least one service data flow detection information (e.g. service data flow template).

In an example action, based on the handover request message, the T-CPF may determine a user plane rule for the data session (e.g. during the handover and/or after the handover), the user plane rule may comprise the UE IP address. In an example action, in response to the handover request message, the T-CPF may send a message (e.g. user plane session establishment request) to the T-UPF, wherein the user plane session establishment request message may comprise the user plane rule, PDCP configuration information and/or SDAP configuration information.

In an example, the PDCP configuration information may comprise at least one parameter: PDCP SN UL Size, PDCP SN DL Size, RLC mode, ROHC Parameters, UL Data Split Threshold, PDCP Duplication, PDCP Re-establishment, PDCP Data Recovery, Duplication Activation, Out Of Order Delivery, PDCP Status Report Indication, Additional PDCP duplication Information, EHC Parameters, and/or the like. In an example, the PDCP SN UL Size may indicate PDCP sequence number size (e.g. in bits) for uplink. The PDCP SN DL Size may indicate PDCP sequence number size (e.g. in bits) for downlink. The RLC mode may indicate the RLC mode for the DRB, for example, Acknowledged Mode (AM), Unacknowledged Mode (UM) and/or Transparent Mode (TM). The ROHC Parameters may indicate ROHC parameters for header compression. The UL Data Split Threshold may indicate the uplink data split threshold (e.g. in bytes). The PDCP Duplication may indicates whether PDCP duplication is to be configured for the DRB. The PDCP Re-establishment may indicate PDCP entity re-establishment to be triggered. The PDCP Data Recovery may indicate PDCP data recovery to be triggered. The Duplication Activation may comprise information on the initial state of DL PDCP duplication. Out Of Order Delivery may indicate whether or not outOfOrderDelivery specified is configured. Out of order delivery may be configured only when the radio bearer is established. The PDCP Status Report Indication may indicate PDCP Status Report. For example, For Acknowledged Mode DRB, "downlink" indicates that the PDCP entity is configured to send PDCP status report(s) to the UE, and "uplink" indicates that the UE is configured to send PDCP status report(s). The Additional PDCP duplication Information may indicate number of PDCP duplication configured when it is more than 2 for the DRB. The EHC Parameters may indicate Ethernet Header Compression parameters.

In an example, the SDAP configuration information may comprise at least one parameter: Default DRB, SDAP Header UL, and/or SDAP Header DL. The Default DRB may indicate whether or not this is the default DRB for PDU Session Resource. The SDAP Header UL may indicates whether or not a SDAP header is present for uplink data on this DRB. The SDAP Header DL may indicate whether or not a SDAP header is present for DL data on this DRB.

In an example, the user plane rule may comprise at least one of: at least one packet detection rule; at least one forwarding action rule; at least one QoS enforcement rule; and/or at least one usage reporting rule. In an example, the at least one packet detection rule may comprise data/traffic packet detection information, e.g. one or more match fields against which incoming packets are matched and may apply other user plane rules (e.g. the at least one forwarding action rule, the at least one QoS enforcement rule, and/or the at least one usage reporting rule) to the data/traffic packets matching the packet detection rule. In an example, the at least one forwarding action rule may comprise an apply action parameter, which may indicate whether a second network function (e.g. user plane function) forwards, duplicates, drops or buffers the data/traffic packet respectively. In an example, the at least one usage reporting rule may be used to measure the network resources usage in terms of traffic data volume, duration (i.e. time) and/or events, according to a measurement method in the at least one usage reporting rule. In an example, the at least one QoS enforcement rule may contain instructions to request the user plane function to perform QoS enforcement of the user plane traffic. In an example, the T-CPF may determine the at least one packet detection rule based on the at least one service data flow detection information (e.g. service data flow template, flow information). In an example, the T-CPF may determine the at least one forwarding action rule based on the at least one policy control rule and/or the at least one usage monitoring control rule. In an example, the T-CPF may determine the at least one QoS enforcement rule based on the at least one policy control rule (e.g. the at least one QoS control rule). In an example, the T-CPF may determine the at least one usage reporting rule based on the at least one usage monitoring control rule and/or the quota. In an example, the T-CPF may determine that the data session is between the UE and the T-UPF during the handover and after the handover.

In response to the message received from the T-CPF, the T-UPF may take one or more actions. In an example action, the T-UPF may determine to use the same UE IP address as the S-UPF based on the user plane rule. In an example action, the T-UPF may determine that the data session is between the UE and the T-UPF during the handover and after the handover. In an example action, the T-UPF may determine that the data session is between the UE and the A-UPF via the T-UPF during the handover and after the handover. In an example action, in response to the message received from the T-CPF, the T-UPF may send a response message (e.g. user plane session establishment response) to the T-CPF, wherein the user plane session establishment response message may comprise a data forwarding address of the T-UPF and/or an uplink T-UPF user plane tunnel address.

In response to the message received from the T-UPF, and/or in response to the message received from the S-CPF, the T-CPF may send a message (e.g. SESSION SETUP REQUEST, BEARER SETUP REQUEST, FLOW SETUP REQUEST, UE CONTEXT SETUP REQUEST) to the T-(R)AN-DU to establish session/bearer/flow and/or UE context in the -(R)AN-DU for the data session of the UE. In an example, the SESSION SETUP REQUEST/BEARER SETUP REQUEST/FLOW SETUP REQUEST/UE CONTEXT SETUP REQUEST message may comprise the uplink T-UPF user plane tunnel address.

In an example, the SESSION SETUP REQUEST/ BEARER SETUP REQUEST/FLOW SETUP REQUEST/ UE CONTEXT SETUP REQUEST message may comprise at least one parameter: the CP UE AP ID, the (R)AN-DU UE AP ID, a SpCell ID (e.g. special cell ID), a Candidate SpCell List, a ServCellIndex, CPF to DU RRC Information, a SCell To Be Setup List, a SRB to Be Setup List, a DRB to Be Setup List, RAT-Frequency Priority Information, Masked IMEISV, Serving PLMN, (R)AN-DU UE Aggregate Maximum Bit Rate Uplink, RRC Delivery Status Request, BH RLC Channel to be Setup List, SL DRB to Be Setup List, Conditional Inter-DU Mobility Information, and/or the like. The DRB to Be Setup List may indicate list of data radio bearers to be setup. The DRB to Be Setup List may comprise at least one of parameter: DRB ID, CHOICE QoS Information/DRB Information, a UL UP TNL Information to be setup List and/or an Additional PDCP Duplication TNL List. For example, the CHOICE QoS Information/DRB Information may comprise at least one parameter: DRB QoS, S-NSSAI, and/or Flows Mapped to DRB Item. The Flows Mapped to DRB Item may comprise QoS Flow Identifier, QoS Flow Level QoS Parameters, QoS Flow Mapping Indication, and/or TSC Traffic Characteristics. In an example, the QoS Flow Level QoS Parameters may indicate the QoS to be applied to a QoS flow, to a DRB or to a BH RLC channel. In an example, the QoS Flow Mapping Indication may indicate only the uplink or downlink QoS flow is mapped to the DRB. In an example, the TSC Traffic Characteristics may indicate traffic pattern information associated with a QFI.

In an example action, the T-(R)AN-DU may send a response message (e.g. SESSION SETUP RESPONSE/ BEARER SETUP RESPONSE/FLOW SETUP RESPONSE/UE CONTEXT SETUP RESPONSE) to the T-CPF. The SESSION SETUP RESPONSE/BEARER SETUP RESPONSE/FLOW SETUP RESPONSE/UE CONTEXT SETUP RESPONSE may be used by the T-(R)AN-DU to confirm the setup of session(s)/bearer(s)/flow(s) and/ or a UE context. The SESSION SETUP RESPONSE/ BEARER SETUP RESPONSE/FLOW SETUP RESPONSE/UE CONTEXT SETUP RESPONSE may comprise at least one of: the CP UE AP ID, the (R)AN-DU UE AP ID, the C-RNTI, a DRB Setup List, a SRB Setup List, a BH RLC Channel Setup List, a SL DRB Setup List, a DRB Failed to Setup List, a SRB Failed to Setup List, a SCell Failed To Setup List, a BH RLC Channel Failed to be Setup List, a SL DRB Failed To Setup List, Requested Target Cell ID, and/or the like. In an example, the SESSION SETUP RESPONSE/BEARER SETUP RESPONSE/FLOW SETUP RESPONSE/UE CONTEXT SETUP RESPONSE message may comprise DL T-(R)AN-DU address of user plane tunnel, wherein the DL T-(R)AN-DU address of user plane tunnel may indicate a downlink T-(R)AN-DU address of a user plane tunnel. In an example, the SESSION SETUP RESPONSE/BEARER SETUP RESPONSE/FLOW SETUP RESPONSE/UE CONTEXT SETUP RESPONSE message may comprise a DL T-UPF tunnel address. The DL T-UPF tunnel address may be used to receive downlink data packet from the A-UPF.

In an example action, based on the forwarding tunnel capability received from the S-CPF, the T-CPF and/or T-UPF may determine a forwarding tunnel indication. In an example, the forwarding tunnel indication may indicate to use a data forwarding tunnel between the S-UPF and T-UPF. In an example, the forwarding tunnel indication may indicate to use a direct data forwarding (e.g. no tunnel is used) between the S-UPF and the T-UPF.

In response to the message received from the T-(R)AN-DU, and/or in response to the message received from the S-CPF, the T-CPF may send a response message (e.g. handover acknowledgement) to the S-CPF. In an example, the handover acknowledgement may comprise the forwarding tunnel indication. In an example, the handover acknowledgement may comprise the data forwarding address of the T-UPF and/or the uplink T-UPF user plane tunnel address. In an example, the handover acknowledgement may comprise a parameter indicating whether the DAPS Handover is accepted or not.

In an example, the S-CPF may send a handover message to the UE, the handover message may comprise the UE IP address and/or the maintain/keeping IP indication. The maintain/keeping IP indication may indicate the UE to reuse the same UE IP address during the handover and/or after the handover. For example, the S-CPF may send the handover message to the UE via the S-(R)AN-DU. For example, in response to the message received from the T-CPF, the S-CPF may take one or more actions. In an example action, the S-CPF may send a message (e.g. DL RRC MESSAGE TRANSFER) to the S-(R)AN-DU. The DL RRC MESSAGE TRANSFER may comprise a RRC message and/or a NAS message sending to the UE. In an example, the RRC message and/or a NAS message may be a handover message. In an example, the NAS message may comprise the UE IP address and/or the maintain/keeping IP indication. In an example, the RRC message may be an RRCReconfiguration message. For example, the RRCReconfiguration message may comprise at least one parameter required to access the target cell: at least the target cell ID, the new C-RNTI, the target gNB security algorithm identifiers for the selected security algorithms, a set of dedicated RACH resources, association between RACH resources and SSB(s), association between RACH resources and UE-specific CSI-RS configuration(s), common RACH resources, system information of the target cell, and/or the like.

In an example action, the S-CPF may send a message (e.g. user plane session modification request, bearer modification request, flow modification request) to the S-UPF. The user plane session modification request message may comprise at least one of: UE identity, the data forwarding address of the T-UPF, the uplink T-UPF user plane tunnel address, the forwarding tunnel indication, and/or PDCP status query indication. The forwarding tunnel indication may indicate to the S-UPF to use a data forwarding tunnel and/or a direct data forwarding (e.g. no tunnel is used) between the S-UPF and the T-UPF. The PDCP status query indication may be used by the S-CPF to query/request the PDCP status in the S-UPF, wherein the PDCP status is associated with the UE. In response to the message received, the S-UPF may send a response message (e.g. user plane session modification response, bearer modification response, flow modification response). The user plane session modification response message may comprise PDCP status information. For example, the PDCP status information may comprise uplink and/or downlink PDCP status for the UE.

In an example, in response to the message received from the S-UPF, the S-CPF may send a message (e.g. EARLY STATUS TRANSFER, SN STATUS TRANSFER) to the T-CPF, wherein the EARLY STATUS TRANSFER/SN STATUS TRANSFER may comprise the PDCP status information. In an example, if DRBs configured with DAPS, the S-CPF may send an EARLY STATUS TRANSFER message to the T-CPF. The EARLY STATUS TRANSFER message may comprise a DL COUNT value, the DL COUNT value may indicate PDCP SN and HFN of the first PDCP SDU that the S-UPF forwards to the T-UPF. In an example, for DRBs not configured with DAPS, the S-CPF may send an SN STATUS TRANSFER message to the T-CPF to convey the uplink PDCP SN receiver status and the downlink PDCP SN transmitter status of DRBs for which PDCP status preservation applies (e.g. for RLC AM). The uplink PDCP SN receiver status may comprise at least the PDCP SN of the first missing UL PDCP SDU and may comprise a bit map of the receive status of the out of sequence UL PDCP SDUs that the UE needs to retransmit in the target cell, if any. The downlink PDCP SN transmitter status may indicate the next PDCP SN that the T-UPF may assign to new PDCP SDUs, not having a PDCP SN yet.

In response to the message received from the S-CPF, the T-CPF may send a message (e.g. user plane session modification request, bearer modification request, flow modification request) to the T-UPF comprising the PDCP status information. For example, the T-CPF may send a user plane session modification request message to the T-UPF, the user plane session modification message may comprise the PDCP status information. For example, the user plane session modification message may comprise the DL T-(R)AN-DU address of user plane tunnel. For example, the user plane session modification message may comprise user plane rules. In response to the message received from the T-CPF, the T-UPF may send a user plane session modification response message to the T-CPF.

In an example, the S-UPF may receive downlink data packet from the A-UPF. The downlink data packet may send from an application server to the UE. The S-UPF may forward the downlink data packet to the T-UPF based on the data forwarding address of the T-UPF, the uplink T-UPF user plane tunnel address, and/or the forwarding tunnel indication. For example, based on the forwarding tunnel indication, the S-UPF may forward the downlink data packet to the T-UPF using a direct data forwarding (e.g. no tunnel is used). For example, based on the forwarding tunnel indication, the S-UPF may forward the downlink data packet to the T-UPF using a data forwarding tunnel.

In an example, the UE may synchronise to target cell and completes the RRC handover procedure by sending RRCReconfigurationComplete message to T-CPF. For example, the UE may send the RRCReconfigurationComplete message to T-CPF via the T-(R)AN-DU. For example, in response to the message received from the UE, the T-(R)AN-DU may send a UL RRC MESSAGE TRANSFER message to the T-CPF, the UL RRC MESSAGE TRANSFER message may comprise the RRCReconfigurationComplete message. In an example, in case of DAPS handover, the UE may not detach from the source cell upon receiving the RRCReconfiguration message. The UE may release the source SRB resources, security configuration of the source cell and stops DL/UL reception/transmission with the source upon receiving an explicit release from the T-CPF.

In an example, in response to the message received from the UE, the T-CPF may send a message (e.g. HANDOVER SUCCESS) to the S-CPF indicating that the UE has successfully accessed to the target cell. In an example, in response to the message received from the T-CPF, in case of DAPS Handover or Conditional Handover, the S-CPF may take one or more actions. In an example action, the S-CPF may send a message (e.g. UE Context Modification) to the UE indicating to stop the data transmission for the UE. In an example action, the S-CPF may send a message (e.g. user plane session modification request, bearer modification request, flow modification request) to the S-UPF indicating the S-UPF to stop packet delivery and also to retrieve the PDCP UL/DL status. The S-UPF may send the PDCP status information to the S-CPF. In an example, the S-CPF may send a message (e.g. SN STATUS TRANSFER) to the T-CPF, the SN STATUS TRANSFER message may comprise the PDCP status information. In response to the message received from the S-CPF, the T-CPF may send a message (e.g. user plane session modification request, bearer modification request, flow modification request) to the T-UPF comprising the PDCP status information. The T-UPF may send a reply (e.g. user plane session modification response, bearer modification response, flow modification response) to the T-CPF, the reply may comprise the DL T-UPF tunnel address.

In an example, in response to the RRCReconfiguration-Complete message received from the UE, the T-CPF may send a message (e.g. user plane session request) to the A-UPF, the user plane session request message may comprise the UE IP address and/or the DL T-UPF tunnel address. For example, the user plane session request may comprise a user plane session establishment request. For example, the user plane session request may comprise a user plane session modification request. In response to the message received from the T-CPF, the A-UPF may send a response message (e.g. user plane session response), the user plane session response may comprise an UL A-UPF Tunnel Address. For example, the UL A-UPF Tunnel Address may be used by the A-UPF to receive uplink data packet from the T-UPF. In response to the message received from the A-UPF, the T-CPF may send a user plane session modification request message to the T-UPF comprising the UL A-UPF Tunnel Address. The T-UPF may send a user plane session modification response message to the T-CPF.

In an example, the T-CPF may send a message (e.g. UE context release) to the S-CPF to release the resource (e.g. session resource, bearer resource, flow resource) of S-CPF for the UE. In an example, the UE context release message may indicate releasing resource of S-(R)AN-DU for the UE. In an example, the UE context release message may indicate releasing UE context information in the S-CPF and/or S-(R)AN-DU.

In response to the message received from the T-CPF, the S-CPF may take one or more actions. In an example action, the S-CPF may send a message (e.g. UE context release) to the UE. The UE context release message may indicate releasing UE context between the UE and the S-CPF and/or S-(R)AN-DU. In an example, the S-CPF may send the UE context release message via the S-(R)AN-DU. For example, the S-CPF may send a DL RRC MESSAGE TRANSFER message to the S-(R)AN-DU, the DL RRC MESSAGE TRANSFER message may comprise the UE context release message. The S-(R)AN-DU may send the UE context release message to the UE in response to receive the message from the S-CPF. In an example action, the S-CPF may send a message (e.g. user plane session release) to the S-UPF. The user plane session release message may indicate releasing session/bearer/flow resource of the UE in S-UPF. The S-UPF may send a response message to the S-CPF.

Figure 29:
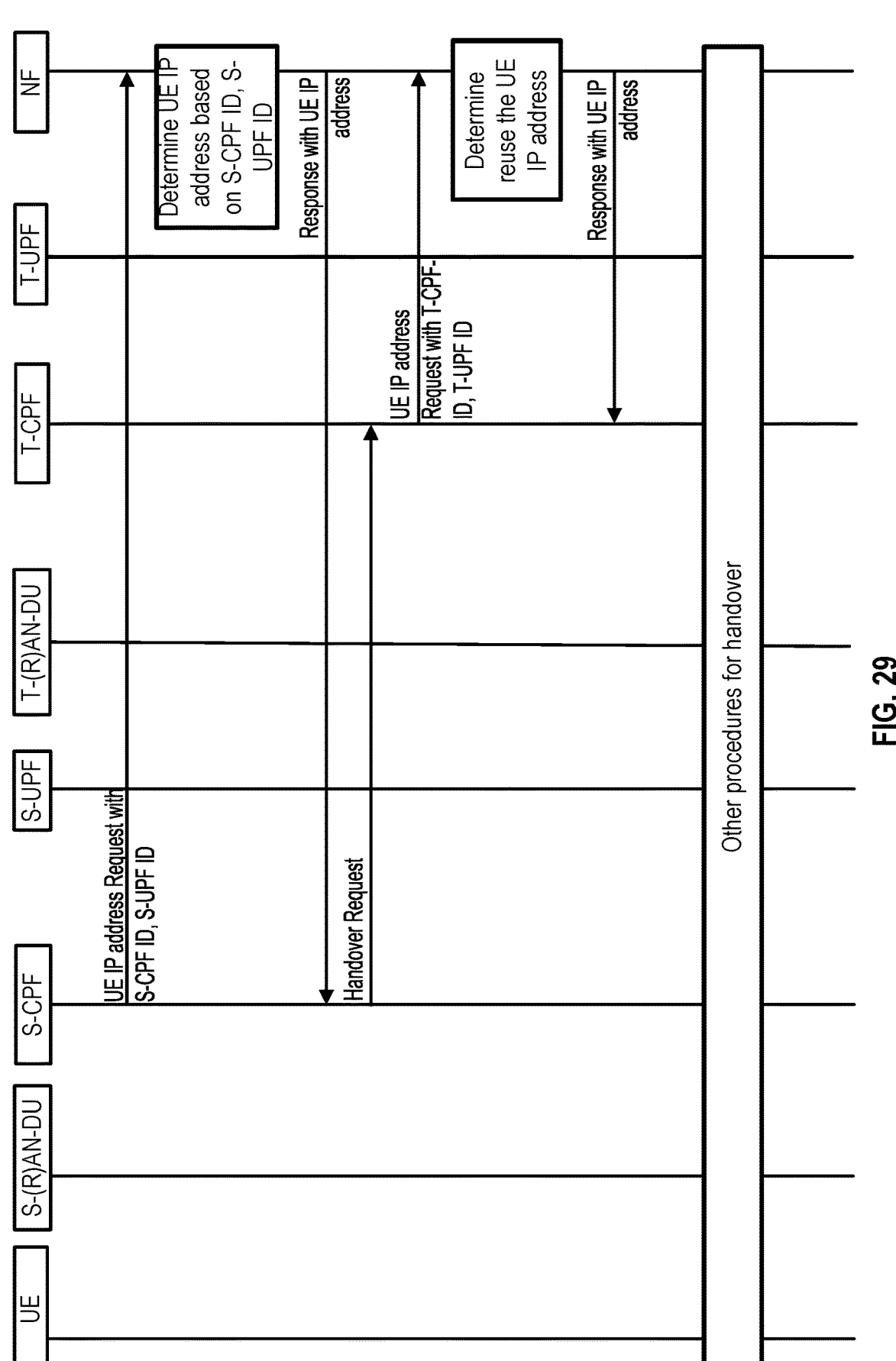
FIG. 29 is an example call flow as per an aspect of an embodiment of the present disclosure.

FIG. 29 is an example call flow which may comprise one or more actions. In an example, a network function may receive from a first CPF, a first UE IP address request message for a wireless device, wherein the first UE IP address request message comprises an identifier of the wireless device, a first CPF identifier and/or a first UPF identifier. For example, the S-CPF may send a first UE IP address request message to the network function, the first UE IP address request message may comprise an identifier of the wireless device, an S-CPF identifier and/or an S-UPF identifier. In an example, the network function may be a control plane function. In an example, the network function may be a user plane function. In an example, the network function may be an SMF. In an example, the network function may be an authentication, authorization, and accounting (AAA) server. In an example, the network function may be a dynamic host configuration protocol (DHCP) server. In an example, the network function may be an OAM. In response to the message received from the S-CPF, based on the first IP address of the wireless device request message, the network function may determine an IP address of the wireless device (e.g. UE IP address). The network function may send a response message (e.g. first UE IP address response) to the S-CPF comprising the UE IP address and/or the identifier of the wireless device.

In an example, the network function may receive from a second CPF, a second UE IP address request message for the wireless device, wherein the second UE IP address request message may comprise the identifier of the wireless device, a second CPF identifier and/or or a second UPF identifier. For example, the T-CPF may send a second UE IP address request message to the network function, the second UE IP address request message may comprise the identifier of the wireless device, a T-CPF identifier and/or a T-UPF identifier.

In an example, based on a configured CPF pool and/or a configured UPF pool, the network function may determine to reuse the UE IP address in the T-CPF and/or T-UPF for the UE. In an example, the configured CPF pool may comprise the S-CPF identifier and/or the T-CPF identifier. In an example, the configured UPF pool may comprise the S-UPF identifier and/or the T-UPF identifier. In an example, the network function may send a second UE IP address response message to the T-CPF comprising the UE IP address and/or the identifier of the wireless device. In an example, there may be other procedures to complete the handover.

Figure 28:
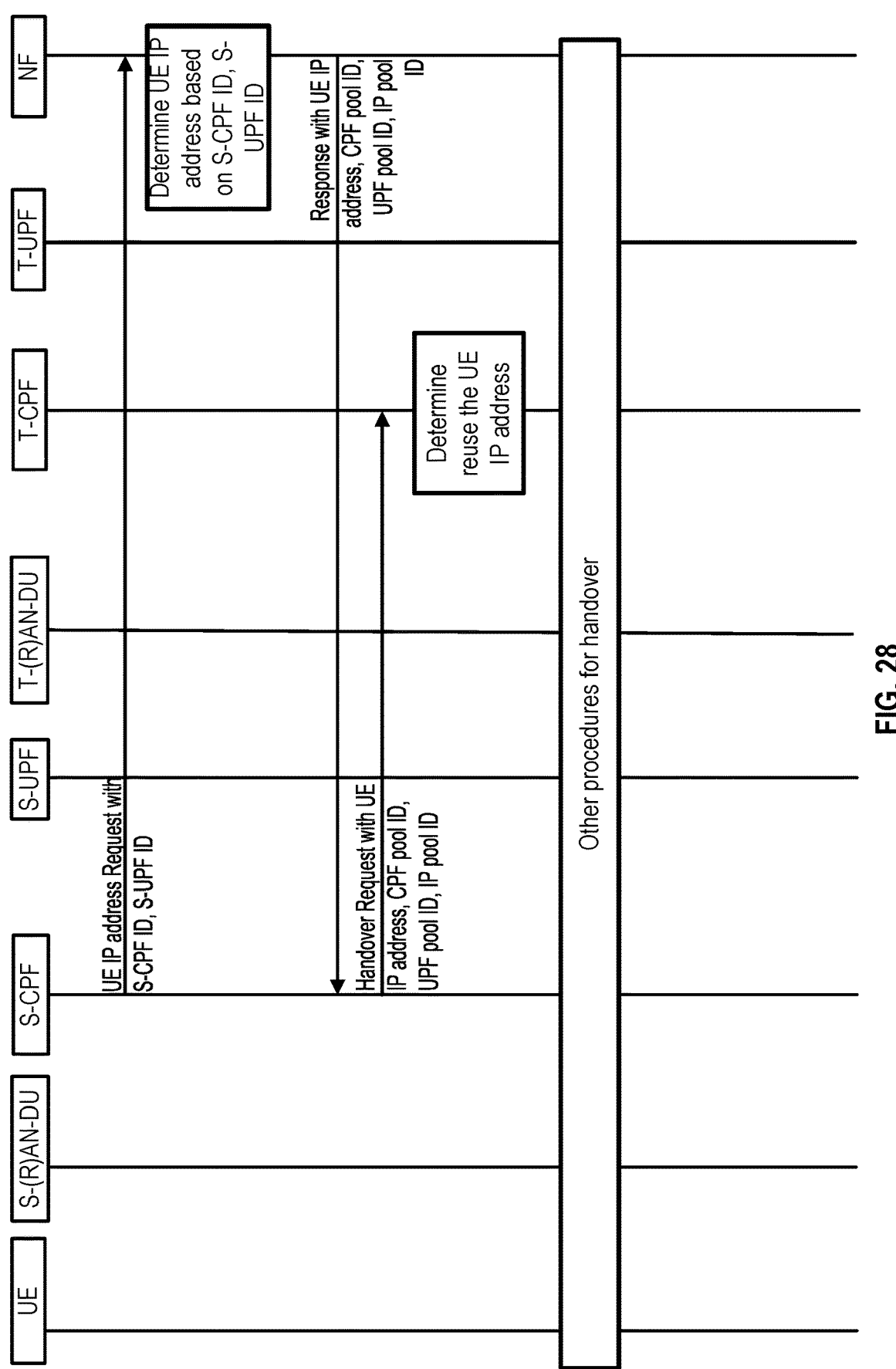
FIG. 28 is an example call flow as per an aspect of an embodiment of the present disclosure.

FIG. 28 is an example call flow which may comprise one or more actions. In an example, a network function may receive from a first CPF, a first UE IP address request message for a wireless device, wherein the first UE IP address request message comprises an identifier of the wireless device, a first CPF identifier and/or a first UPF identifier. For example, the S-CPF may send a first UE IP address request message to the network function, the first UE IP address request message may comprise the identifier of the wireless device, an S-CPF identifier and/or an S-UPF identifier. In response to the message received from the S-CPF, the network function may determine a UE IP address for the UE. The network function may send a first UE IP address response message to the S-CPF, the first UE IP address response message may comprise at least one of: the identifier of the wireless device, the UE IP address, a CPF pool identifier, a UPF pool identifier, and/or an IP pool identifier. For example, the UE IP address may be associate with a CPF pool identified by the CPF pool identifier. For example, the UE IP address may be associate with a UPF pool identified by the UPF pool identifier. For example, the UE IP address may be associate with an IP pool identified by the IP pool identifier.

In an example, the S-CPF may determine a handover, for example based on a measurement report from the UE. The S-CPF may determine a target CPF (e.g. T-CPF) and send a handover request message to the T-CPF. The handover request message may comprise at least one of: the identifier of the wireless device, the UE IP address, the CPF pool identifier, the UPF pool identifier, and/or the IP pool identifier. In response to the message received from the S-CPF, based on the handover request message, the T-CPF may determine to reuse the same UE IP address during the handover and/or after the handover. For example, based on the CPF pool identifier, the UPF pool identifier, and/or the IP pool identifier, the T-CPF may determine to reuse the same UE IP address during the handover and/or after the handover. For example, the T-CPF may determine the T-CPF is associated with the CPF pool identifier, the UPF pool identifier, and/or the IP pool identifier, and determine to reuse the same UE IP address during the handover and/or after the handover. For example, the T-CPF may determine the T-UPF is associated with the CPF pool identifier, the UPF pool identifier, and/or the IP pool identifier, and determine to reuse the same UE IP address during the handover and/or after the handover. In an example, there may be other procedures to complete the handover.

In an example, a second control plane function (CPF) may receive from a first CPF, a handover request indicating a handover of a data session for a wireless device. The handover request may comprise an IP address of the wireless device, wherein the IP address may be used by a first user plane function (UPF). The handover request may comprise a parameter indicating to maintain the IP address of the wireless device. In an example, based on the parameter, the second CPF may determine reusing the IP address in the second CPF. In an example, the second CPF may send to a second UPF, a user plane session request message comprising the IP address for the data session.

In an example embodiment, the second CPF may comprise at least one of: access and mobility management function (AMF); session management function (SMF); policy control function (PCF); Non Access Stratum function (NAS); and/or Central Unit Control Plane (CU-CP) of a base station. The CU-CP may comprise a radio resource control (RRC) function and a packet data convergence protocol (PDCP) function. In an example embodiment, the first CPF may comprise at least one of: AMF; SMF; PCF; NAS; and/or CU-CP of a base station. In an example embodiment, the first UPF may comprise a PDU Session Anchor (PSA) UPF. In an example embodiment, the second UPF may comprise a PSA UPF. In an example embodiment, the first UPF may comprise a central unit user plane (CU-UP) of a base station. In an example embodiment, the second UPF may comprise a CU-DU of a base station. In an example embodiment, the data session may be between the UE and the first UPF before the handover. In an example embodiment, the second CPF may determine the data session is between the UE and the second UPF during the handover and after the handover. In an example embodiment, the second UPF may determine the data session is between the UE and the second UPF during the handover and after the handover. In an example embodiment, based on the handover request, the second CPF may determine a user plane rule for the data session, wherein the user plane rule may comprise the IP address of the wireless device. In an example embodiment, the second CPF may send to the second UPF, the user plane rule, wherein the second UPF may use the same IP address of the wireless device as the first UPF based on the user plane rule. In an example embodiment, the second CPF may send to the second UPF, a user plane session request message comprises service data adaptation protocol (SDAP) configuration information.

In an example embodiment, the user plane session request message may further comprise packet data convergence protocol (PDCP) configuration information. In an example embodiment, the handover request may further comprise an IP pool indication, wherein the IP pool indication may indicate the IP address of the wireless device is in an IP pool and may be used by multiple CPFs or UPFs. In an example embodiment, the handover request may further comprise an IP pool identifier, wherein the IP pool identifier may indicate the IP pool. In an example embodiment, based on the IP pool indication, the second CPF may determine to reuse the IP address of the wireless device during the handover. In an example embodiment, the handover request may further comprise a CPF pool indication, wherein the CPF pool indication may indicate the IP address of the wireless device may be in a CPF pool and may be used by multiple CPFs. In an example embodiment, the handover request may further comprise a CPF pool identifier, wherein the CPF pool identifier may indicates the CPF pool. In an example embodiment, based on the CPF pool indication, the second CPF may determine to reuse the IP address of the wireless device during the handover. In an example embodiment, the handover request may further comprise a UPF pool indication, wherein the UPF pool indication may indicate the IP address of the wireless device may be in a UPF pool and may be used by multiple UPFs.

In an example embodiment, the handover request may further comprise a UPF pool identifier, wherein the UPF pool identifier may indicate the UPF pool. In an example embodiment, based on the UPF pool indication, the second CPF may determine to reuse the IP address of the wireless device during the handover. In an example embodiment, the handover request may further comprise current QoS flow to DRB mapping rules for the wireless device. In an example embodiment, the handover request may further comprise at least one of: a dual active protocol stack (DAPS) handover indication; target cell ID; RRM-configuration comprising UE inactive time; basic AS-configuration comprising antenna Info and DL Carrier Frequency; SIB1 of S-CPF; UE capabilities for different RATs; and/or UE reported measurement information comprising beam-related information. In an example embodiment, the handover request may further comprise data session information, wherein the data session information may comprise at least one of: a data session identifier; network slice information; and/or QoS profile(s).

In an example embodiment, the second CPF may determine to modify a routing, wherein the routing may be used by the second UPF to receive downlink data packet from a router. In an example embodiment, second CPF may send to the second UPF, a user plane session modification request message comprising a routing modification indication. In an example embodiment, the user plane session modification request message may comprise the IP address of the wireless device. In an example embodiment, the second UPF may send routing information to at least one router. The routing information may comprise the IP address of the wireless device; and/or the address of the second UPF. In an example embodiment, the first CPF may determine to modify a routing, wherein the routing may be used by the second UPF to receive downlink data packet from a router. In an example embodiment, the first CPF may send to a first UPF, a user plane session modification request message comprising a routing modification indication. In an example embodiment, the user plane session modification request message may comprise the IP address of the wireless device. In an example embodiment, the first UPF may send routing information to at least one router. The routing information may comprise the IP address of the wireless device; and/or the address of the second UPF.

In an example embodiment, the data session may comprise at least one data flow. In an example embodiment, the data session may comprise at least one bearer. In an example embodiment, the second CPF may receive from the second UPF, a user plane session response message comprising a data forwarding address of the T-UPF. In an example embodiment, the second CPF may receive from the second UPF, a user plane session response message comprising an uplink T-UPF user plane tunnel address. In an example embodiment, the second CPF may send to a DU of a second base station, an uplink T-UPF user plane tunnel address. In an example embodiment, the second CPF may receive from the DU of the second base station, a downlink second (R)AN-DU user plane tunnel address. In an example embodiment, the second CPF may send to the first CPF, a handover acknowledgement comprising a data forwarding address of the T-UPF.

In an example embodiment, the handover request may further comprise a forwarding tunnel capability, wherein the forwarding tunnel capability may indicate a first UPF supports a data forwarding tunnel between the first UPF and a second UPF. The forwarding tunnel capability may indicate a first UPF supports a direct data forwarding between the first UPF and a second UPF. In an example embodiment, the second CPF may send to the first CPF, a handover acknowledgement comprising a forwarding tunnel indication, wherein the forwarding tunnel indication may indicate a second UPF supports a data forwarding tunnel between the first UPF and a second UPF. The forwarding tunnel indication may indicate a second UPF supports a direct data forwarding between the first UPF and a second UPF. In an example embodiment, the first CPF is a source CPF. In an example embodiment, the first UPF is a source UPF. In an example embodiment, the second CPF is a target CPF. In an example embodiment, the second UPF is a target UPF. In an example embodiment, the first CPF may send to the wireless device, a handover message comprising: the IP address of the wireless device; and/or the parameter.

In an example, a first control plane function (CPF) may receive a measurement report from a wireless device. In an example, based on the measurement report, the first CPF may determine a handover of a data session for the wireless device to a second CPF. In an example, the first CPF may determine reusing an IP address of the wireless device in the second CPF, based on: a configured maintain IP address indication; a configured CPF pool comprising the first CPF and the second CPF; and/or a configured UPF pool comprising the first UPF and the second UPF. In an example, the first CPF may send to the second CPF, a handover request comprising: the IP address of the wireless device and/or the maintain IP address indication. In an example embodiment, the first CPF may modify a routing, wherein the routing may be used by a second UPF to receive downlink data packet from a router. In an example embodiment, the second CPF may send to the second UPF, a user plane session modification request message comprising a routing modification indication. In an example embodiment, the user plane session modification request message may comprise an address of the second UPF and/or the IP address of the wireless device. In an example embodiment, the second UPF may send routing information to at least one router. The routing information may comprise the IP address of the wireless device; and/or the address of the second UPF.

In an example, a second user plane function (UPF) may receive from a second control plane function (CPF), a user plane session establishment request message comprising a user plane rule; wherein the user plane rule may comprise an IP address of the wireless device. In an example, the second UPF may receive from the second CPF, a user plane session modification request message comprising: a routing modification indication and/or the IP address of the wireless device. In an example, the second UPF may send routing information to at least one router. The routing information may comprise the IP address of the wireless device and/or the address of the second UPF. In an example, the second UPF may receive from the at least one router, a data packet comprising the IP address of the wireless device.

In an example, a first control plane function (CPF) may send to a network function, a UE IP address request message for a wireless device, wherein the UE IP address request message may comprise: an identifier of the wireless device; a first CPF identifier; and/or a first UPF identifier. In an example, the first CPF may receive from the network function, a response message comprising: an IP address of the wireless device; a CPF pool identifier; a UPF pool identifier; and/or an IP pool identifier. In an example, the first CPF may send to the second CPF, a handover request comprising: the identifier of the wireless device; the IP address of the wireless device; the CPF pool identifier; the UPF pool identifier; and/or the IP pool identifier.

In an example, a network function may receive from a first control plane function (CPF), a first UE IP address request message for a wireless device, wherein the first UE IP address request message may comprises: an identifier of the wireless device; a first CPF identifier; and/or a first UPF identifier. In an example, based on the first IP address of the wireless device request message, the network function may determine an IP address of the wireless device. In an example, the network function may send the IP address of the wireless device to the first CPF. In an example, the network function may receive from a second CPF, a second UE IP address request message for the wireless device, wherein the second UE IP address request message may comprises: the identifier of the wireless device; a second CPF identifier; and/or a second UPF identifier. In an example, based on a configured CPF pool comprising the first CPF identifier and the second CPF identifier, the network function may determine to reuse the IP address of the wireless device in the second CPF and/or the second UPF. In an example, based on a configured UPF pool comprising the first UPF identifier and the second UPF identifier, the network function may determine to reuse the IP address of the wireless device in the second CPF and/or the second UPF. In an example, the network function may send to the second CPF, the IP address of the wireless device.

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification. Features from various embodiments may be combined to create yet further embodiments.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A control plane function (CPF) comprising:

one or more processors; and memory storing instructions that, when executed by the one or more processors, cause the CPF to perform:

receiving, from a further CPF, a request for a handover for a session of a wireless device, the request for the handover indicating:

an internet protocol (IP) address, of the wireless device, used by a first user plane function (UPF); and to maintain the IP address of the wireless device;

determining, based on the indicating to maintain the IP address, to maintain and/or reuse the IP address of the wireless device, wherein the determining is based on a CPF pool indication indicating that the IP address of the wireless device is used by CPFs in a CPF pool; and sending, to a second UPF, a user plane session request message comprising the IP address.

2. The CPF of claim 1, wherein the request for the handover comprises a parameter indicating to maintain and/or reuse the IP address of the wireless device.

3. The CPF of claim 1, wherein the request for the handover further comprises a CPF pool identifier of the CPF pool.

4. The CPF of claim 1, wherein the CPF pool indication is included in the request for the handover.

5. The CPF of claim 1, wherein the determining is based on a UPF pool indication indicating that the IP address of the wireless device is used by UPFs in a UPF pool.

6. The CPF of claim 5, wherein the UPF pool indication is included in the request for the handover.

7. The CPF of claim 5, wherein the UPF pool indication indicates that the IP address of the wireless device is used by both the first UPF and the second UPF.

8. The CPF of claim 5, wherein the UPF pool indication comprises a UPF pool identifier of the UPF pool.

9. The CPF of claim 1, wherein the determining is based on an IP pool indication indicating that the IP address of the wireless device is in an IP pool.

10. The CPF of claim 9, wherein the IP pool indication is received in the request for the handover.

11. The CPF of claim 1, wherein the user plane session request message comprises a user plane rule for the session.

12. The CPF of claim 1, wherein the instructions, when executed by the one or more processors further cause the CPF to perform:

receiving, from the second UPF, a user plane session response message, wherein the user plane session response message comprises a data forwarding address of the second UPF.

13. The CPF of claim 1, wherein the instructions, when executed by the one or more processors further cause the CPF to perform:

sending, to the further CPF, a handover acknowledgement, wherein the handover acknowledgement comprises a forwarding tunnel indication.

14. A control plane function (CPF) comprising:

one or more processors; and memory storing instructions that, when executed by the one or more processors, cause the CPF to perform:

sending, to a second CPF, a request for a handover for a session of a wireless device, the request for the handover indicating:

an internet protocol (IP) address, of the wireless device, used by a first user plane function (UPF); and to maintain the IP address of the wireless device, wherein the second CPF determines to maintain and/or reuse the IP address of the wireless device, and wherein the determining is based on a CPF pool indication indicating that the IP address of the wireless device is used by CPFs in a CPF pool; and receiving, from the second CPF, a handover acknowledgement, wherein the handover acknowledgement comprises a forwarding tunnel indication.

15. A non-transitory computer-readable medium comprising instructions that, when executed by one or more processors of a second control plane function (CPF), cause the second CPF to perform:

receiving, from a first CPF, a request for a handover for a session of a wireless device, the request for the handover indicating:

an internet protocol (IP) address, of the wireless device, used by a first user plane function (UPF); and to maintain the IP address of the wireless device;

determining, based on the indicating to maintain the IP address, to maintain and/or reuse the IP address of the wireless device, wherein the determining is based on a CPF pool indication indicating that the IP address of the wireless device is used by CPFs in a CPF pool; and sending, to a second UPF, a user plane session request message comprising the IP address.

16. The non-transitory computer-readable medium of claim 15, wherein the request for the handover comprises a parameter indicating to maintain and/or reuse the IP address of the wireless device.

17. The non-transitory computer-readable medium of claim 15, wherein the request for the handover further comprises a CPF pool identifier of the CPF pool.

18. The non-transitory computer-readable medium of claim 17, wherein the CPF pool indication is included in the request for the handover.

19. The non-transitory computer-readable medium of claim 16, wherein the determining is based on a UPF pool indication indicating that the IP address of the wireless device is used by UPFs in a UPF pool.

20. The non-transitory computer-readable medium of claim 19, wherein the UPF pool indication is included in the request for the handover.

* * * * *